US012594539B2

(12) United States Patent
Brown et al.

(10) Patent No.: US 12,594,539 B2

(45) Date of Patent: Apr. 7, 2026

(54) LIQUID DISPERSION COMPOSITIONS, USES AND METHOD OF MAKING THE SAME

(71) Applicant: Chase Corporation, Westwood, MA (US)

(72) Inventors: Steven Edward Brown, Oak Ridge, NC (US); Paul Sevier McClellan, Jr., Hickory, NC (US); Bradlee Watts Gustavesen, Upton, MA (US); Jason Randall, Granite Falls, NC (US)

(73) Assignee: Chase Corporation, Westwood, MA (US)

(*) Notice: Subject to any disclaimer, the term of this patent is extended or adjusted under 35 U.S.C. 154(b) by 0 days.

(21) Appl. No.: 18/793,533

(22) Filed: Aug. 2, 2024

(65) Prior Publication Data

US 2025/0041827 A1 Feb. 6, 2025

Related U.S. Application Data

(60) Provisional application No. 63/647,221, filed on May 14, 2024, provisional application No. 63/575,508, filed on Apr. 5, 2024, provisional application No. 63/559,023, filed on Feb. 28, 2024, provisional application No. 63/534,280, filed on Aug. 23, 2023, provisional application No. 63/530,916, filed on Aug. 4, 2023.

(51) Int. Cl.

| | |
|---|---|
| ***B01J 20/26*** | (2006.01) |
| ***B01J 20/28*** | (2006.01) |
| ***B01J 20/32*** | (2006.01) |

(52) U.S. Cl.

CPC ....... *B01J 20/261* (2013.01); *B01J 20/28026* (2013.01); *B01J 20/3214* (2013.01); *B01J 20/327* (2013.01)

(58) Field of Classification Search

CPC ...................................................... B01J 20/261

See application file for complete search history.

(56) References Cited

U.S. PATENT DOCUMENTS

| | | | |
|---|---|---|---|
| 4,598,119 | A | 7/1986 | Volk |
| 9,149,789 | B2 | 10/2015 | Holt |
| 2009/0151963 | A1 | 6/2009 | Sortwell |
| 2016/0272769 | A1 | 9/2016 | Holt |
| 2021/0129505 | A1 | 5/2021 | Mishra et al. |
| 2021/0130070 | A1 | 5/2021 | Zhu et al. |
| 2021/0130752 | A1 | 5/2021 | Mishra et al. |
| 2021/0380446 | A1 | 12/2021 | Holt |
| 2022/0387227 | A1 | 12/2022 | Kreisel et al. |
| 2023/0096385 | A1 | 3/2023 | Ferracane et al. |
| 2023/0234028 | A1 | 7/2023 | Collias et al. |
| 2023/0363954 | A1 | 11/2023 | Ehrnsperger et al. |

FOREIGN PATENT DOCUMENTS

| | | | | |
|---|---|---|---|---|
| EP | 0726028 | A2 | | 8/1996 |
| KR | 20220021303 | A | * | 2/2022 |
| WO | WO 9640849 | A1 | | 12/1996 |

OTHER PUBLICATIONS

Kim et al. English machine translation of KR 20220021303 A. (Year: 2022).*

International Search Report and Written Opinion in International Appln. No. PCT/US2024/040766, mailed on Jan. 9, 2025, 25 pages.

Invitation to Pay Fees in International Appln. No. PCT/US2024/040766, mailed on Nov. 12, 2024, 20 pages.

Atascientific.com [online], "Basic principles of particle size analysis," 2014, retrieved on Apr. 23, 2024, retrieved from URL<https://www.atascientific.com.au/wp-content/uploads/2017/02/AN020710-Basic-Principles-Particle-Size-Analysis.pdf>, 19 pages.

Brunauer et al., "Adsorption of Gases in Multimolecular Layers," Journal of the American Chemical Society, 1938, 60(2):309-319 (abstract only).

Burgess et al., "Particle Size Analysis: AAPS Workshop Report, Cosponsored by the Food and Drug Administration and the United States Pharmacopeia," AAPS Journal, 2004, 6(3):1-12.

Characterization of Porous Solids and Powders: Surface Area, Pore Size and Density, Particle Technology Series (POTS, vol. 16), 1st ed., 2004, 365 pages (abstract only).

Handbook of Pharmaceutical Excipients, 6th edition Pharmaceutical Press, London, England, 2009, 917 pages (abstract only).

Hansen Solubility Parameters: A User's Handbook, Second Edition, CRC Press, 2007, 546 pages (abstract only).

Hansen-solubility.com [online], "Welcome to the official site of HSP and HSPiP," available on or before Jun. 21, 2023, retrieved on Apr. 23, 2024, retrieved from URL<https://www.hansen-solubility.com/>, 4 pages.

Methods and Application of Particle Size Analysis, Cambridge University Press, 1rst Ed., 368 pages (abstract only).

Modern Superabsorbent Polymer Technology, Wiley, Nov. 1997, 304 pages (abstract only).

Thommes et al., "Physisorption of gases, with special reference to the evaluation of surface area and pore size distribution (IUPAC Technical Report)," Pure and Applied Chemistry, Jul. 2, 2015, 87(9-10):1051-1069.

* cited by examiner

*Primary Examiner* — Peter F Godenschwager

(74) *Attorney, Agent, or Firm* — Fish & Richardson P.C.

(57) ABSTRACT

This disclosure relates to liquid dispersion compositions that are suitable to provide absorbent materials (e.g., an absorbent coating), and methods of preparing the compositions and absorbent materials thereof.

29 Claims, 18 Drawing Sheets

Result

| Size (m/m) | % Volume In | Size (m/m) | % Volume In | Size (m/m) | % Volume In | Size (m/m) | % Volume In | Size (m/m) | % Volume In | Size (m/m) | % Volume In |
|---|---|---|---|---|---|---|---|---|---|---|---|
| 0.0500 | 0.00 | 25.0 | 8.94 | 90.0 | 0.18 | 250 | 0.00 | 450 | 0.00 | 900 | 0.00 |
| 0.100 | 0.00 | 32.0 | 9.38 | 106 | 0.02 | 275 | 0.00 | 500 | 0.00 | 1000 | 0.00 |
| 0.500 | 0.41 | 45.0 | 3.01 | 125 | 0.00 | 300 | 0.00 | 550 | 0.00 | 1200 | 0.00 |
| 1.00 | 37.15 | 53.0 | 2.16 | 150 | 0.00 | 325 | 0.00 | 600 | 0.00 | 1500 | 0.00 |
| 100 | 15.74 | 65.0 | 1.33 | 175 | 0.00 | 350 | 0.00 | 700 | 0.00 | 2000 | 0.00 |
| 150 | 21.05 | 75.0 | 0.62 | 212 | 0.00 | 400 | 0.00 | 800 | 0.00 | 2500 | |

LIQUID DISPERSION COMPOSITIONS, USES AND METHOD OF MAKING THE SAME

CROSS REFERENCE

This application claims priority to U.S. Provisional Application No. 63/647,221, filed May 14, 2024; U.S. Provisional Application No. 63/575,508, filed May 4, 2024; U.S. Provisional Application No. 63/559,023, filed Feb. 28, 2024; U.S. Provisional Application No. 63/534,280, filed Aug. 23, 2023; and U.S. Provisional Application No. 63/530,916, filed Aug. 4, 2023; each of which are incorporated by reference herein in their entireties.

FIELD OF INVENTION

The present disclosure relates to liquid dispersion compositions suitable to provide an absorbent material (e.g., an absorbent coating), uses, and methods of making the same.

BACKGROUND

Superabsorbent materials include a particular group of polymer materials capable of absorbing and holding large quantities of water in a crosslinked three-dimensional hydrogel network, yet they do not dissolve in water. The nature of the functional groups attached to the polymer backbone give rise to the ability of the polymer material to absorb water while crosslinking between polymer chains prevent dissolution of the functional polymers. Hydrogel-forming polymers can be naturally occurring or synthetic material in granular, fibrous, or platelet form.

SUMMARY

In one aspect, described herein are examples of a liquid dispersion composition that can include a granular superabsorbent polymer dispersed in a liquid medium. The granular superabsorbent polymer is present in the composition from about 0.1% to about 95% by weight. The liquid medium includes at least two liquid components, wherein at least one of the liquid components is insoluble with the other liquid components.

In an aspect, the granular superabsorbent polymer includes an acrylate polymer. In an aspect, the acrylate polymer is a homopolymer, copolymer, salt thereof, or mixture thereof. In an aspect, the acrylate polymer includes a salt of acrylic acid, a salt of an acrylic acid acrylamide copolymer, or a combination thereof. In an aspect, the salt is a sodium salt, potassium salt, lithium salt, or ammonium salt. In an aspect, the acrylate polymer includes sodium polyacrylate, a sodium acrylate acrylamide copolymer, or a combination thereof.

In an aspect, the acrylate polymer includes one or more functional groups selected from carboxylic acids, acrylamides, sulfonates, metal salts or combinations thereof. In an aspect, the acrylate polymer has a formula of

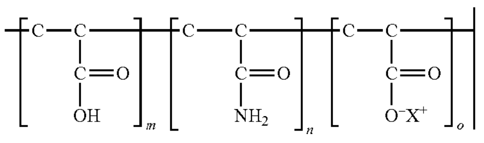

wherein X is a cation, m is a mole fraction of the carboxylic acid, n is a mole fraction of the acrylamide, and o is the mole fraction of the metal salt, whereby the sum of m, n, and o is 100%. In an aspect, X is Na or any combination of like ionic salts. In an aspect, X is Na.

In an aspect, the granular superabsorbent polymer has a maximum particle diameter in a range of about 0.5 microns to about 1,000 microns, about 5 microns to about 250 microns, or about 10 microns to about 250 microns.

In an aspect, the granular superabsorbent polymer has a particle surface area in the range of about 0.05 $m^2/g$ to about 1000 $m^2/g$, about 10 $m^2/g$ to about 800 $m^2/g$, or about 400 $m^2/g$ to about 600 $m^2/g$.

In an aspect, the granular superabsorbent polymer has a particle fractal dimension ($D_f$) in a range of from 1 to 3.

In an aspect, the granular superabsorbent polymer has a $D_v(50)$ particle size in a range of about 1 micron to about 800 microns, about 1 microns to about 500 microns, about 5 microns to about 250 microns, about 5 microns to about 100 microns, or about 5 microns to about 60 microns.

In an aspect, the granular superabsorbent polymer has a $D_v(10)$ of about 1 to about 35 microns, a $D_v(50)$ of about 5 to about 60 microns, and a $D_v(90)$ of about 30 to about 300 microns.

In an aspect, the granular superabsorbent polymer has a $D_v(90)$ to $D_v(10)$ ratio in a range of from 1 to 50, or from 3 to 20.

In an aspect, the granular superabsorbent polymer is prepared by a solution polymerization process or an emulsion polymerization process.

In an aspect, the at least two liquid components each have a viscosity in a range of about 1 cP to about 100,000 cP at 23° C., about 5 cP to about 10,000 cP at 23° C., about 10 cP to about 1,000 cP at 23° C., or about 25 cP to about 800 cP at 23° C.

In an aspect, the insolubility of the at least one liquid component with the other liquid components is determined by Hansen solubility parameters, wherein the relative energy difference (RED) of the at least one liquid component and the other liquid components is equal to or greater than 1. In an aspect, the RED of the at least one liquid component and the other liquid components is greater than 1.

In an aspect, wherein the liquid medium includes a first liquid component and a second liquid component.

In an aspect, the first liquid component is nonpolar and the second liquid component is polar.

In an aspect, the first liquid component includes a silicon-containing liquid, a hydrocarbon liquid, or a fluorocarbon liquid.

In an aspect, the silicon-containing liquid includes a silicone, organo-silicone, silane, siloxane, or organosilane. In an aspect, the first liquid component includes polydimethylsiloxane.

In an aspect, the first liquid component has a viscosity in a range of about 10 cP to about 100,000 cP, or about 400 cP to about 600 cP, at 23° C. In an aspect, the first liquid component has a viscosity in a range of about 10 cP to about 100,000 cP at 100° C.

In an aspect, the hydrocarbon liquid includes functionality selected from a sulfur-containing group, nitrogen-containing group, oxygen-containing group, halogenated functional group, alkane, alkene, alkyne, a metal salt, or a combination thereof. In an aspect, the hydrocarbon liquid is paraffinic oil or polyisobutene. In an aspect, the paraffinic oil includes light paraffin oil, mineral oil, light mineral oil, sulfonated mineral oil, or combinations thereof.

In an aspect, the paraffinic oil includes a mixture of paraffinic oils having viscosities in a range of about 10 cP to about 750 cP at 23° C.

In an aspect, the second liquid component includes a surface active agent, a polyol, an ester, an alkylene glycol, water, an alcohol, or a combination thereof. In an aspect, the second liquid component includes water. In an aspect, the second liquid component includes a polyol. In an aspect, the second liquid component includes propylene glycol. In an aspect, the second liquid component includes water and propylene glycol.

In an aspect, the liquid dispersion composition includes one or more surface active agents.

In an aspect, the second liquid component includes a surface active agent.

In an aspect, the liquid dispersion composition includes at least one surface active agent that is different from the first liquid component and the second liquid component.

In an aspect, the liquid dispersion composition includes at least one surface active agent is insoluble with at least one of the first liquid component and the second liquid component.

In an aspect, the one or more surface active agents are selected from a nonionic surfactant, an ionic surfactant, an amphoteric surfactant, a zwitterion base surfactant, or a combination thereof.

In an aspect, the one or more surface active agents each have a melting point below 100° C.

In an aspect, the one or more surface active agents include a nonionic surfactant.

In an aspect, the one or more surface active agents include a fatty acid ester of polyethoxy sorbitan, a polyethylene alkyl phenyl ether, or a combination thereof. In an aspect, at least one of the one or more surface active agents is a polysorbate.

In an aspect, the one or more surface active agents include polysorbate 80, polysorbate 20, or a combination thereof.

In an aspect, the one or more surface active agents include (x)-sorbitan mono-9-octadecenoate poly(oxy-1,2-ethanediyl), trimethylpentan-2-yl)phenoxy]ethanol, or a combination thereof.

In an aspect, the one or more surface active agents are selected from PEG-8 oleate, polyglyceryl-3-methylglucose distearate, oleth-10, oleth-10/polyoxyl 10 oleyl ether NF, ceteth-10, PEG-8 laurate, cocamide MEA, polysorbate 60 NF, polysorbate 60, polysorbate 80 NF, polysorbate 80, isosteareth-20, PEG-60 almond glycerides, PEG-20 methyl glucose sesquistearate, ceteareth-20, oleth-20, steareth-20, steareth-21, ceteth-20, isoceteth-20, polysorbate 20, or a combination thereof.

In an aspect, the one or more surface active agents include an ionic surfactant.

In an aspect, the one or more surface active agents each have a critical micelle concentration in the range of about 0.001 mM to about 1 mM in pure water.

In an aspect, the one or more surface active agents each have an HLB value in a range of about 10 to about 18, about 12 to 18, or about 13 to about 16.

In an aspect, the liquid dispersion composition further includes one or more additives.

In an aspect, the one or more additives are selected from metal oxides, metals, composites, thermally or electrically conductive material, a wax, a thermoset or thermomelt polymer, adhesive, sealant, film former, plasticizer, resin, oil, acrylate, urethane, cleaner, buffer, fragrance, biocide, fertilizer, anticorrosive, human or animal therapeutics, topicals, a swelling clay, or a combination thereof.

In an aspect, the one or more additives each have a $D_v(50)$ particle size in a range of about 1 micron to about 800 microns and a particle fractal dimension ($D_f$) in a range of 1 to 3.

In an aspect, the metal oxides include silica, alumina, titania, ceria, zirconia, iron oxide, or a combination thereof. In an aspect, the one or more additives include colloidal, precipitated, or fumed silica. In an aspect, the one or more additives include precipitated silica.

In an aspect, the thermally or electrically conductive material includes indium tin oxide, boron nitride, carbon black, aluminum nitride, silicon nitride, or a combination thereof. In an aspect, the thermoset or thermomelt polymer includes polypropylene, polyurethane, polyamide, polyester, polycarbonate, polyacrylate, polyethylene, polyacrylamide, polyimide, copolymers thereof, or a combination thereof. In an aspect, the oil includes linseed oil.

In an aspect, the film former is a water-soluble film former. In an aspect, the water-soluble film former includes cellulose, alginate, gum, pectin, polyvinyl alcohol, or a combination thereof.

In an aspect, the swelling clay includes bentonite.

In an aspect, the one or more additives include polyethylene glycol. In an aspect, the one or more additives include PEG-200, PEG-300, PEG-400, PEG-600, or a combination thereof.

In an aspect, the liquid dispersion composition forms an absorbent gel upon exposure to water. In an aspect, the liquid dispersion composition forms a self-supporting absorbent gel within about 30 seconds of exposure to the water. In an aspect, the liquid dispersion composition forms an absorbent film within about 30 seconds of exposure to the water.

In an aspect, the liquid dispersion composition has a water absorption capacity of at least about 10 grams of water per gram of liquid dispersion composition, at least about 20 grams of water per gram of liquid dispersion composition, or at least about 50 grams of water per gram of liquid dispersion composition.

In an aspect, the liquid dispersion composition forms an oil-in-oil emulsion, suspension, oil-in-water emulsion, water-in-oil emulsion, or a combination thereof. In an aspect, the liquid dispersion composition forms a multiphase emulsion.

In an aspect, the granular superabsorbent polymer is present in the composition from about 0.1% to about 80% by weight, about 0.1% to about 10% by weight, about 1% to about 75% by weight, about 30% to about 70% by weight, about 40% to about 65% by weight, or about 40% to about 50% by weight.

In an aspect, the first liquid component is present in the composition from about 0.1% to about 99% by weight, about 1% to about 10% by weight, about 10% to about 80% by weight, about 20% to about 60% by weight, about 25% to about 45% by weight, or about 50% to about 60% by weight.

In an aspect, the second liquid component is present in the composition from about 0.1% to about 99% by weight, about 1% to about 99% by weight, about 75% to about 99% by weight, about 0.1% to about 10% by weight, or about 0.5% to about 5% by weight.

In an aspect, the second liquid component is present in the composition from about 50% to about 99% by weight.

In an aspect, the at least one surface active agent that is different from the first liquid component or the second liquid component is present in the composition from about 0.01% to about 50% by weight, about 0.1% to about 10% by weight, about 0.1% to about 5% by weight, or about 0.5% to about 2% by weight.

In an aspect, the one or more additives are present in the composition from about 0.01% to about 50% by weight.

In an aspect, the film former is present in the composition from about 0.01% to about 30% by weight.

In an aspect, the liquid dispersion composition includes:

about 5 wt. % to about 99 wt. % of the first liquid component; and about 1 wt. % to about 99 wt. % of the second liquid component.

In an aspect, the liquid dispersion composition further includes about 0.01 wt. % to about 50 wt. % of the at least one surface active agent that is different from the first liquid component or the second liquid component.

In an aspect, the liquid dispersion composition further includes about 0.01 wt. % to about 50 wt. % of the one or more additives.

In an aspect, the liquid dispersion composition includes:

about 30 wt. % to about 95 wt. % of the granular superabsorbent polymer;

about 20 wt. % to about 60 wt. % of the first liquid component, wherein the first liquid component includes a hydrocarbon liquid; and about 0.1 wt. % to about 10 wt. % of the second liquid, wherein the second liquid component includes a surface active agent.

In an aspect, the liquid dispersion composition further includes about 0.1% to about 10 wt. % of the at least one surface active agent that is different from the first liquid component or the second liquid component.

In an aspect, the liquid dispersion composition includes:

about 0.1 wt. % to about 25 wt. % of the granular superabsorbent polymer;

about 1 wt. % to about 10 wt. % of the first liquid component, wherein the first liquid component includes a silicon-containing liquid;

about 75 wt. % to about 99 wt. % of the second liquid, wherein the second liquid component includes water; and about 0.1 wt. % to about 5 wt. % of the at least one surface active agent that is different from the first liquid component or the second liquid component.

In an aspect, the liquid dispersion composition further includes about 0.01 wt. % to about 10 wt. % of the one or more additives.

In an aspect, the liquid dispersion composition includes:

about 5 wt. % to about 75 wt. % of the granular superabsorbent polymer;

about 5 wt. % to about 95 wt. % of the first liquid component;

about 0.5 wt. % to about 95 wt. % of the second liquid component, wherein the second liquid component comprises a polyol; and about 0.5 wt. % to about 20 wt. % of the at least one surface active agent that is different from the first liquid component or the second liquid component.

In an aspect, the liquid dispersion composition includes:

about 0.1 wt. % to about 80 wt. % of the granular superabsorbent polymer;

about 1 wt. % to about 99 wt. % of the first liquid component, wherein the first liquid component comprises a nonpolar liquid component;

about 5 wt. % to about 99 wt. % of the second liquid component, wherein the second liquid component comprises a polar liquid component;

about 0.01 wt. % to about 50 wt. % of the at least one surface active agent that is different from the first liquid component or the second liquid component.

In an aspect, the liquid dispersion composition further includes about 0.01 wt. % to about 50 wt. % of the one or more additives. In an aspect, the liquid dispersion composition further includes about 0.01 wt. % to about 30 wt. % of one or more film formers.

In an aspect, the liquid dispersion composition includes:

about 5 wt. % to about 80 wt. % of the granular superabsorbent polymer, wherein the granular superabsorbent polymer comprises an acrylate polymer;

about 0.01 wt. % to about 1.0 wt. % of the first liquid component;

about 0.5 wt. % to about 90 wt. % of the second liquid component, wherein the second liquid component comprises a polyol; and about 0.2 wt. % to about 20 wt. % of the at least one surface active agent that is different from the first liquid component or the second liquid component.

In an aspect, the liquid dispersion composition includes about 10 wt. % to about 80 wt. %, about 25 wt. % to about 75 wt. %, about 50 wt. % to about 75 wt. %, about 55 wt. % to about 70 wt. %, or about 60 wt. % to about 66 wt. % of the granular superabsorbent polymer. In an aspect, the liquid dispersion composition includes about 58 wt. %, about 60 wt. %, about 63 wt. %, or about 65 wt. % of the granular superabsorbent polymer.

In an aspect, the liquid dispersion composition includes about 0.2 wt. % to about 15 wt. %, about 0.2 wt. % to about 10 wt. %, about 0.2 wt. % to about 5 wt. %, about 0.5 wt. % to about 3 wt. %, about 0.5 wt. % to about 1.5 wt. %, or about 0.8 wt. % to about 1.0 wt. % of the at least one surface active agent.

In an aspect, the at least one surface active agent includes a non-ionic surfactant. In an aspect, the at least one surface active agent includes a polysorbate. In an aspect, the at least one surface active agent includes (x)-sorbitan mono-9-octadecenoate poly(oxy-1,2-ethanediyl).

In an aspect, the first liquid component comprises a hydrocarbon liquid, a silicon-containing liquid, or a combination thereof. In an aspect, the hydrocarbon liquid includes a paraffinic oil. In an aspect, the silicon-containing liquid includes silicone oil.

In an aspect, the liquid dispersion composition includes about 0.1 wt. % to about 10 wt. %, about 0.1 wt. % to about 5 wt. %, or about 0.1 wt. % to about 1 wt. % of the first liquid component.

In an aspect, the second liquid component includes propylene glycol.

In an aspect, the liquid dispersion composition includes about 1 wt. % to about 80 wt. %, about 10 wt. % to about 70 wt. %, about 20 wt. % to about 60 wt. %, about 25 wt. % to about 50 wt. %, about 25 wt. % to about 45 wt. %, or about 32 wt. % to about 40 wt. % of the second liquid component.

In an aspect, the liquid dispersion composition further includes about 0.01 wt. % to about 10 wt. % of the one or more additives. In an aspect, the one or more additives include silica, bentonite, a film former, or a combination thereof.

In an aspect, the liquid dispersion composition includes:

about 60 wt. % to about 66 wt. % of the granular superabsorbent polymer;

about 0.1 wt. % to about 1.0 wt. % of a hydrocarbon liquid or a silicon-containing liquid;

about 32 wt. % to about 40 wt. % propylene glycol; and about 0.8 wt. % to about 1.0 wt. % of the surface active agent.

In an aspect, the liquid dispersion composition further includes from about 0.1 wt. % to about 5 wt. % of one or more additives.

In an aspect, the liquid dispersion composition includes:

about 30 wt. % to about 90 wt. % of the granular superabsorbent polymer;

about 10 wt. % to about 60 wt. % of the first liquid component, wherein the first liquid component includes a nonpolar liquid component;

about 1 wt. % to about 30 wt. % of the second liquid component, wherein the second liquid component includes a surface active agent.

In an aspect, the liquid dispersion composition includes about 40 wt. % to about 80 wt. %, about 50 wt. % to about 70 wt. %, about 55 wt. % to about 65 wt. %, or about 59 wt. % of the granular superabsorbent polymer.

In an aspect, the liquid dispersion composition includes about 15 wt. % to about 55 wt. %, about 20 wt. % to about 50 wt. %, or about 25 wt. % to about 40 wt. % of the first liquid component. In an aspect, the first liquid component includes a paraffinic oil.

In an aspect, the liquid dispersion composition includes about 1 wt. % to about 20 wt. %, about 1 wt. % to about 10 wt. %, or about 1 wt. % to about 5 wt. % of the second liquid component.

In an aspect, the surface active agent is a polysorbate.

In an aspect, the liquid dispersion composition further includes about 0.01 wt. % to about 50 wt. %, about 0.1 wt. % to about 25 wt. %, or about 0.1 wt. % to about 10 wt. % of one or more additives. In an aspect, the one or more additives comprise polyethylene glycol, silica, or a combination thereof.

In an aspect, the liquid dispersion composition has a total solids content from about 20 wt. % to about 70 wt. %. In an aspect, the liquid dispersion composition has a total dissolved solids amount of less than about 400 mg/L.

In an aspect, the liquid dispersion composition has a German Landfill Ordinance Deponieverordnung-DepV (DepV) classification of Deponieklasse 0 (DK 0).

In an aspect, the liquid dispersion composition includes:

about 5 wt. % to about 80 wt. % of a granular superabsorbent polymer, wherein the granular superabsorbent polymer includes an acrylate polymer;

about 0.5 wt. % to about 90 wt. % of a polyol; and about 0.2 wt. % to about 20 wt. % of one or more surface active agents.

In an aspect, at least one of the one or more surface active agents has an HLB value of about 15.

In an aspect, the liquid dispersion composition includes from about 1 wt. % to about 80 wt. %, about 10 wt. % to about 70 wt. %, about 20 wt. % to about 60 wt. %, about 25 wt. % to about 50 wt. %, about 25 wt. % to about 45 wt. %, or about 32 wt. % to about 40 wt. % of the polyol.

In an aspect, the liquid dispersion composition includes from about 0.1 wt. % to about 10 wt. %, about 0.1 wt. % to about 5 wt. %, or about 0.1 wt. % to about 1 wt. % of a hydrocarbon liquid or silicon-containing liquid.

In an aspect, the liquid dispersion composition includes:

about 60 wt. % to about 66 wt. % of the granular superabsorbent polymer;

about 0.1 wt. % to about 1.0 wt. % of a hydrocarbon liquid or a silicon-containing liquid;

about 32 wt. % to about 40 wt. % propylene glycol; and about 0.8 wt. % to about 1.0 wt. % of the one or more surface active agents.

In an aspect, the liquid dispersion composition is enclosed within a container. In an aspect, the container is a bag, pouch, or sachet. In an aspect, the container includes at least one of a nozzle, a tear notch, a tapered region, a concentrate chamber, and a ridged region.

In one aspect, described herein are examples of a method of preparing an absorbent coating including: providing a liquid dispersion composition including a granular superabsorbent polymer dispersed in a liquid medium; and applying the liquid dispersion composition to a substrate. The granular superabsorbent polymer is present in the composition from about 0.1% to about 95% by weight. The liquid medium includes two or more liquid components, wherein at least one of the liquid components is insoluble with the other liquid components.

In an aspect, applying the liquid dispersion composition to the substrate includes dip coating, roll coating, printing, or spraying the liquid dispersion composition onto the substrate.

In an aspect, applying the liquid dispersion composition to the substrate includes dip coating the liquid dispersion composition onto the substrate.

In an aspect, the printing includes printing the liquid dispersion composition onto the substrate using an electronic or thermal printer, a print screen, or a gravure printer.

In an aspect, the spraying includes aerosolizing the liquid dispersion composition.

In an aspect, applying the liquid dispersion composition to a substrate includes co-extruding the liquid dispersion composition with the substrate.

In an aspect, applying the liquid dispersion composition to the substrate includes applying the liquid dispersion composition as a uniform coating.

In an aspect, applying the liquid dispersion composition to the substrate includes applying the liquid dispersion composition as a non-uniform coating. In an aspect, applying the liquid dispersion composition as a non-uniform coating includes applying the liquid dispersion composition in a pattern.

In an aspect, the substrate is a fiber or a polymer film. In an aspect, the fiber is a yarn or a cable. In an aspect, the polymer film is a polypropylene film, a PET film, or an HDPE film. In an aspect, the substrate is an environmental surface. In an aspect, the substrate is polyethylene.

In an aspect, the absorbent coating has a water absorption capacity of at least about 10 grams of water per gram of absorbent coating, at least about 20 grams of water per gram of absorbent coating, or at least about 50 grams of water per gram of absorbent coating.

In an aspect, the liquid dispersion composition has a water absorption capacity of at least about 100 grams of water per gram of liquid dispersion composition, at least about 200 grams of water per gram of liquid dispersion composition, at least about 300 grams of water per gram of liquid dispersion composition, or at least about 350 grams of water per gram of liquid dispersion composition.

In an aspect, the absorbent coating has a slip characteristic value of at least about 1.5 or at least about 2 when applied to a PET film.

In an aspect, the absorbent coating has a slip characteristic value of at least about 2, at least about 3, or at least about 4 when applied to an HDPE film.

In an aspect, the absorbent coating has a viscosity in the range of about 5 cP to about 2,000,000 cP at 40° C.

In an aspect, the absorbent coating has a tan delta (tan $\delta$) value in a range of about 0.1 to about 100.

In one aspect, described herein are examples of an absorbent coating formed by a method described herein.

In one aspect, described herein are examples of a substrate coated with a liquid dispersion composition including a granular superabsorbent polymer dispersed in a liquid medium. The granular superabsorbent polymer is present in the composition from about 0.1% to about 95% by weight. The liquid medium includes two or more liquid components, wherein at least one of the liquid components is insoluble with the other liquid components.

In one aspect, a method of preparing a lubricant includes:

providing a container comprising a liquid dispersion composition disclosed herein; and mixing the liquid dispersion composition with water.

In one aspect, a kit includes one or more containers includes a liquid dispersion composition described herein.

Any two or more of the features described in this specification, including in this summary section, can be combined to form implementations not specifically described herein. The details of one or more implementations are set forth in the accompanying drawings and the description below. Other features and advantages will be apparent from the description and drawings, and from the claims.

DETAILED DESCRIPTION

Figure 1:
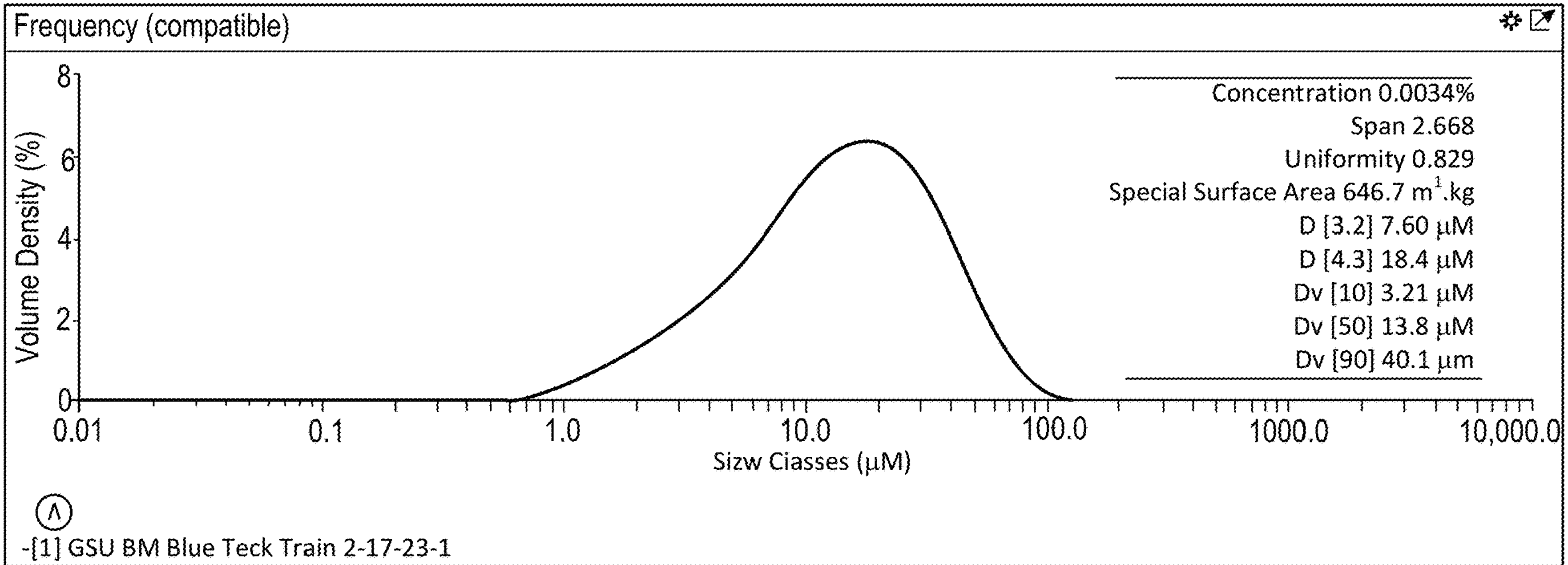
FIG. 1 shows an example particle size distribution of a granular superabsorbent polymer powder.

Synthetic polymers can be synthesized as homopolymers or copolymers with specific functional groups to alter physicochemical characteristics and water absorption properties of the polymers upon crosslinking. The specific physical properties can be tailored through selecting specific crosslinking chemistries and manufacturing processes to control overall quantity of water absorption, ability to swell under pressure, rate of absorption and the like. Examples of superabsorbent polymers (SAP) include polymers formed from acrylic acid, acrylamide, propenyl sulfonate, and metal salts of the same. These types of superabsorbent polymers can absorb up to 1000 times their own weight in water or other aqueous liquids, allowing for broad commercial applications. Such commercial applications include, but are not limited to, medical waste such as blood absorption, wound care such as bandages and negative pressure dressings, patient care such as incontinent pads and other body fluids, and dental applications for absorption of saliva. Still other commercial applications include hot and cold gel packs, packaging such as absorbent pads for meats and produce, pet care, apparel, mining drilling, filtration, wastewater remediation, and agriculture/horticulture, and special effects novelty. In recent years, absorbent materials have been used in more specialized applications beyond primary applications in personal hygiene, diaper products, and general commercial applications. Dry, granular superabsorbent polymers powders are widely used in industrial manufacturing processes. These commercial manufacturing processes require significant infrastructure and processing equipment to convey and handle granular or powdered superabsorbent polymers, wherein the particle size can range from above about 800 microns to below 10 microns. One concern is nascent dust, loose powder, and the associated cost to mitigate these issues. An example application is imparting water absorbent characteristics to tapes, fabrics both woven and non-woven, filaments, yarns, flexible polymeric films and the like by adhering granular superabsorbent polymer material to their surfaces. These functionalized materials can be further incorporated into electric transmission lines, fiber optics cable, or other coaxial cable applications to inhibit water ingress.

There are several significant drawbacks and limitations that exist to using dry granular superabsorbent powders. For example, complex manufacturing processes to handle and apply fine granular superabsorbent polymers, variation in particle size distribution can impact water absorption performance in both speed and quantity, difficulty achieving coating uniformity, and the surface of finished goods is rough and non-smooth leading which can lead to further processing difficulties. Poor adhesion of particulate absorbent material can lead to flaking and dusting. A typical process requires an adhesives/binder to affix particles which can subsequently impede water uptake and efficiency and increase cost. Product design complexity may significantly increase to accommodate a dry granular material to prevent dusting, or loss of water absorption performance. For example, complex product designs such as laminates are used to "sandwich" or make enclosures to hold granular SAP in an effort to contain the powder/particles. This adds unwanted thickness and material costs. Creating patterns, discrete regions, or uniform non-continuous coatings for desirable water absorption/mitigation properties with an absorbent article is not possible using dry granular superabsorbent powders.

Industry has attempted to overcome these issues by forming superabsorbent hydrogel coatings directly on substrate in situ. Specifically, highly concentrated monomeric or polymeric pre-cursor aqueous solutions of polyacrylate, polyacrylamide, sulfonate, etc. are used to coat filaments and yarns. Liquid formations of this type can be applied using known coating techniques and processing equipment (dip coating, knife coating, etc.). Subsequent processing is required to crosslink the polymers by radiative (thermal, UV), chemical, or by other means. Residual water is removed by a post thermal process, effectively creating a dry hydrogel polymer network coating capable of absorbing water or other aqueous liquids. While liquid polymer formulations have found some success, there are limitations to the utility of superabsorbent hydrogel coatings created in this manner. Typically, liquid polymer formulations have significantly high viscosity which can negatively impact coating speed during processing, impede liquid penetration into a tow, potentially poor surface wetting characteristics leading to poor surface coating uniformity and thickness, all of which may negatively impact absorption properties. In general, these types of liquid formulations rely on chemical reactions or other mechanisms to form a functional superabsorbent coating material. These chemical processes can suffer from slow or inefficient reaction kinetics resulting in higher energy costs and undesirable production speeds.

Dry polymer hydrogel coatings on flexible yarns and filaments can be rigid and brittle due to the nature of cross-linked acrylate polymers. This can lead to undesirable flaking or dusting during processing. Some reported attempts to overcome poor coating adhesion and brittleness include creating complex liquid formulations that contain adhesion promotors, plasticizers, and other film formers all of which can negatively impact overall water absorption capacity, coating efficiency, absorption speed, and decrease shelf life of the polymer solution due to undesirable polymer-polymer interactions.

Another application for superabsorbent polymer compositions is environmental remediation applications wherein nascent (free or excess) water constitutes a relatively large component of waste streams (e.g., sludges, sediments, drilling muds, mine tailings, wet coal combustion residuals (CCR), waste water slurries, and other related remediation candidates). Dry granular SAP compositions and composite blends (e.g., SAP with wood flour and/or bentonite additives) are generally used to mitigate the nascent water via absorption of water, wherein suitably treated waste stream materials are prepared for remediation site removal and transported to an approved disposal site. However, dry granular SAP composition and composite blends have practical limitations, especially in urban areas or windy environments, due to possible airborne dust cloud formation during dusting applications, resulting in less efficient usage and higher application amounts needed. Also, dry composite blend compositions can readily suffer from particle size distribution issues such as mixture nonuniformity, material segregation, and blend separation, especially during transportation. For example, vibrations can cause bottom settling of fines and can cause larger particle components to rise toward the top surface.

More recently, granular type superabsorbent polymers have been introduced in the form of liquid dispersions. Granular dispersions offer an alternative to traditional dry, granular superabsorbents and other liquid-based acrylate polymer solutions, and have some advantages in their use. Namely, they generally do not produce fine dust and can be applied in a controlled manner to create water absorbing articles. Specifically, commercially available products such as Defopol MX60 rely on a granular acrylate based superabsorbent dispersed in a plastisol type composition. These types of materials have found some level of utility when used as coatings on internal wire and cable elements, such as yarns, to impart water blocking characteristics to slow or stop the ingress of water. U.S. Pat. No. 9,149,789, U.S. Patent Application No. 20160272769, U.S. Patent Application No. 20210380446, and U.S. Pat. No. 4,598,119 also disclose the mixture of granular superabsorbent material in polyols for use in water absorbing applications. While these compositions can exhibit swelling characteristics (absorption) when exposed to water, they suffer from deficiencies including poor or low absorption capacity, slow absorption rates, and have poor mixture stability. Poor water absorption performance is primarily due to the diffusion of water through the liquid mixture and the nature of the physicochemical properties (e.g., gel bed permeability and surface treatment) of the granular superabsorbent polymers.

The present disclosure addresses these deficiencies and discloses compositions, applications, and methods associated with the utility of the compositions.

The present disclosure relates to liquid dispersion compositions including a dispersion of a granular superabsorbent polymer in a liquid medium. In some implementations, the liquid dispersion composition can form flexible water swellable coatings, compositions, and/or gellants that can impart absorptive functionality. The liquid dispersion compositions can have water blocking properties, water retaining properties, and/or reduce frictional forces between contacting proximal surfaces. In some implementations, the liquid dispersion compositions have low viscous friction (low drag force) lubricating properties.

Provided herein is a liquid dispersion composition comprising a granular superabsorbent polymer dispersed in a liquid medium, wherein the granular superabsorbent polymer is present in the composition from about 0.1% to about 95% by weight; and the liquid medium comprises two or more liquid components, wherein at least one of the liquid components is insoluble with the other liquid components. In some implementations, the at least two liquid components are capable of forming multiple phases that exhibit self-emulsification properties.

The granular superabsorbent polymer can be singular or a plurality of polymers of varying molecular weight, type, functionalities, or physical mixtures thereof. In some implementations, the granular superabsorbent polymer is an ionic polymer at neutral pH. In some implementations, the granular superabsorbent polymer has an absorption of at least 10 g/g in deionized water.

In some implementations, the granular superabsorbent polymer comprises an acrylate polymer. In some implementations, the acrylate polymer is a homopolymer, copolymer, salt thereof, or mixture thereof. In some implementations, the acrylate polymer is anionic, cationic, or zwitterionic. In some implementations, the granular superabsorbent polymer is an anionic polyelectrolyte polymer. In some implementations, the acrylate polymer includes one or more functional groups selected from carboxylic acids, acrylamides, sulfonates, metal salts or combinations thereof.

In some implementations, the acrylate polymer comprises a salt of acrylic acid, a salt of an acrylic acid acrylamide copolymer, or a combination thereof. In some implementations, the salt is a sodium salt, potassium salt, lithium salt, ammonium salt, or any combination thereof. In some implementations, the salt is a sodium salt, potassium salt, lithium salt, or ammonium salt. In some implementations, the acrylate polymer comprises sodium polyacrylate, a sodium acrylate acrylamide copolymer, or a combination thereof.

Examples of superabsorbent polymers include copolymers with the chemical structure shown in Formula 1, where m, n, o denotes mole fraction of each functional group. In Formula 1, m, n, and o can be any numerical value wherein at least any two are greater than 0 and the sum of m, n, and o equal 100%. In Formula 1, X represents a cation. For example, X can be Na, or any combination of like ionic salts.

Formula 1

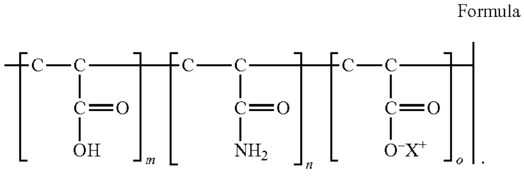

In some implementations, the superabsorbent polymer has the chemical structure shown in Formula 1A.

Formula 1A

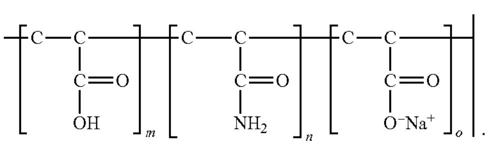

The granular superabsorbent polymer can comprise mixtures of copolymers and homopolymers of similar or differing functionalities, molecular weights, and acid base properties such as pKa. The neutral homopolymers or copolymers can be protonated or deprotonated in the composition using organic or inorganic acids and bases to create ionically charged functional groups. Functional groups can be anionic, cationic, or amphoteric, including Zwitterionic (polybetaines).

In some implementations, the granular superabsorbent polymer is present in the composition from about 0.1% to about 80% by weight, about 0.1% to about 10% by weight, about 0.1% to about 25% by weight, about 1% to about 75% by weight, about 30% to about 70% by weight, about 40% to about 65% by weight, about 43% to about 60% by weight, or about 40% to about 50% by weight. In some implementations, the granular superabsorbent polymer is present in the composition in at least 10% by weight.

In some implementations, the liquid dispersion composition comprises from about 0.1 wt. % to about 80 wt. % of the granular superabsorbent polymer. In some implementations, the liquid dispersion composition comprises from about 5 wt. % to about 80 wt. % of the granular superabsorbent polymer. In some implementations, the liquid dispersion composition comprises about 30 wt. % to about 90 wt. % of the granular superabsorbent polymer. In some implementations, liquid dispersion composition comprises about 10 wt. % to about 80 wt. %, about 25 wt. % to about 75 wt. %, about 50 wt. % to about 75 wt. %, about 55 wt. % to about 70 wt. %, or about 60 wt. % to about 66 wt. % of the granular superabsorbent polymer. In some implementations, the liquid dispersion composition comprises about 40 wt. % to about 80 wt. %, about 50 wt. % to about 70 wt. %, about 55 wt. % to about 65 wt. %, or about 59 wt. % of the granular superabsorbent polymer. In some implementations, liquid dispersion composition comprises about 58 wt. %, about 60 wt. %, about 63 wt. %, or about 65 wt. % of the granular superabsorbent polymer. In some implementations, the liquid dispersion composition comprises about 59 wt. % of the granular superabsorbent polymer. In some implementations, the liquid dispersion composition comprises from about 60 wt. % to about 66 wt. % of the granular superabsorbent polymer. In some implementations, liquid dispersion composition comprises about 60 wt. %, about 63 wt. %, or about 65 wt. % of the granular superabsorbent polymer.

The granular superabsorbent polymer can be quantitatively described by the characteristics of the particle size distribution as determined by measurement techniques that include but are not limited to, laser diffraction, light scattering, microscopy, mechanical sieving, and other standard techniques known in particle characterization.

In some implementations, the granular superabsorbent polymer is prepared by a solution polymerization process or an emulsion polymerization process. In some implementations, the granular superabsorbent polymer is prepared by a solution polymerization process. Granular acrylate powders can be of the type produced by emulsion polymerization or solution polymerization processes known in the art (see, e.g., Modern Superabsorbent Polymer Technology, Buchholz and Graham, Wiley-VCH, 1997), wherein in the particle morphology, chemical composition, and surface modification impart desirable attributes, such as water absorption capacity, water uptake rate (or swelling speed), absorption under load (AUL), centrifuge retention capacity (CRC), and interfacial surface properties.

Various physical dimensions can be used to describe characteristics of the particle size distribution (PSD) of the granular superabsorbent powders. For example, particle size frequency or population can be based on volume fraction, number fraction, mass fraction, or surface area fraction, as non-limiting examples, to describe the characteristics of a particle distribution. In some implementations, physical particle dimensions can be either measured or calculated based on related measurements. For example, surface area can be either measured directly using techniques such as BET analysis (Micromeritics) or calculated based on a geometric model using a determined particle diameter, that can also be subsequently measured or calculated according to relevant theories known in the art (see, e.g., Brunauer, S. et al., Adsorption of Gases in Multimolecular Layers, Journal of the American Chemical Society, 1938, pp. 309-319; Lowell, S. et al., Characterization of Porous Solids and Powders: Surface Area, Pore Size and Density, 1st ed. 2004, Dordrecht, The Netherlands: Springer; Thommes, M. et al., Physisorption of gases, with special reference to the evaluation of surface area and pore size distribution (IUPAC Technical Report), Pure and Applied Chemistry, 2015, pp. 1051-1069). In some implementations, the dimensionality of physical aspics of granular particles can be normalized on a mass basis. In some implementations, interfacial surface properties described by thermodynamics can be useful, such as total surface energy, contributing surface energy elements such as but not limited to, dispersive component (Lifshitz-van der Waals), hydrogen bonding, polar components, and other non-limiting theories such as Good van Oss or other acid-base theories, Owens Wendt, surface free energy, surface tension, and others pertaining to the art. Various techniques exist to evaluate and quantitate surface free energy such as but not limited to, inverse gas phase chromatography (IGC), wicking tensiometry, contact angle measurements, and two dimensional spreading pressure.

Other surface physicochemical properties such as but not limited to Hildebrand solubility parameters and Hansen solubility parameters can be useful to evaluate the interaction of the granular superabsorbent particles in a non-hydrated state with specific formulation components of a non-aqueous dispersion. Other particle dimensions such as morphology can be used in conjunction with particle size metrics and particle chemical composition.

Granular superabsorbent particles can be made or tailored by, but not limited to, grinding, milling, jet milling, air classification milling, sieving, using techniques known in the art. In some implementations, particles can have singular or multi modal particle size distributions that further have unique aspects such as normal or log-normal distributions. These distribution dimensions can be described as a degree of skewness to quantify the asymmetry in the distribution frequency. In some implementations, left or negative skewness is preferred. In some implementations, the degree of skewness and other frequency aspects can be described by the kurtosis ($4^{th}$ moment/standard deviation) or tailedness. For example, in some implementations, distribution that are leptokurtic (positive), mesokurtic, or platykurtic (negative) can have desirable dispersions attributes and can modulate the means or median particle size independently of surface area. In some implementations, particle size distribution characteristics can be determined by blends of distributions, manufacturing process parameters, solid additives, or by other means. In some implementations, distributions can be either single modal, bimodal, or multimodal.

In some implementations, the granular superabsorbent polymer has a maximum particle diameter in a range of about 0.5 microns to about 1,000 microns, about 5 microns to about 500 microns, or about 10 microns to about 250 microns. In some implementations the granular superabsorbent polymer has a maximum particle diameter of below about 1,000 microns, about 500 microns, or about 250 microns. In some implementations, the maximum particle diameter can be measured by light scattering measurement technique (e.g., Malvern Mastersizer equipped with an Aero S powder feed system). In some implementations, the physical dimensions of particles can be determined by means of several different measurement techniques known in the art, such as mechanical sieving or microscopy techniques (e.g., optical, scanning electron microscopy). For example, see Methods and Application of Particle Size Analysis, Ed. James P. M. Syvitski, Cambridge University Press, 2010; Valsangkar, A. J., Principles, methods and applications of particle size analysis, Can. Geotech. J. 29, 1006 (1992); Burgess, J., Duffy, E., Etzler, F., Hickey, A., Particle Size Analysis: AAPS Workshop Report, Cosponsored by the Food and Drug Administration and the United States Pharmacopeia, AAPS Journal 2004; 6 (3) Article 20; Malvern Application Note: AN020710, Basic Principles of Particle Size Analysis, 2014.

In some implementations, the granular superabsorbent polymer has a particle surface area in the range of about 0.05 $m^2/g$ to about 1000 $m^2/g$, about 10 $m^2/g$ to about 800 $m^2/g$, or about 400 $m^2/g$ to about 600 $m^2/g$. Surface area can be calculated based on particle size data on a volume basis. In some implementations, the granular superabsorbent polymer has a particle surface area of about 75 $m^2/g$, about 200 $m^2/g$, or about 700 $m^2/g$. In some implementations, the particle size distributions are log normal with a negative skew and have secondary feature of meso-to-leptokurtic distribution. FIG. 1 illustrates a non-limiting example of a granular superabsorbent polymer (SAP) powder particle size distribution. In some implementations, specific surface of granular materials can be measured, calculated, and reported by methods known in the art. Values reported herein are estimated by measurements made on Malvern Mastersizer 3000 instrumentation. In some implementations, the granular superabsorbent polymer has a specific surface area in the range of about 0.001 $m^2/kg$ to about 2000 $m^2/kg$ as calculated by Malvern Mastersizer 3000 instrumentation software wherein the specific surface area determination is based on an equivalent sphere model and used for comparative purposes.

General quantitative descriptions of the granular SAP powder particle size distribution include, but are not limited to, $D_v(10)$, $D_v(50)$, $D_v(90)$, or any mathematical combination thereof. $D_v$ values can be calculated based on an analysis of the particle size distribution by laser diffraction (e.g., via Malvern Mastersizer system) based on a volume fraction of the particle size. For example, $D_v(10)$ refers to the size of particles wherein 10% of the particles lie below the reported value. In some implementations, the general particle size distribution can be defined in terms of number distributions, mass distributions, volume distributions or any combination thereof.

In some implementations, the fractal dimension ($D_f$) of the granular SAP powder particles is an important parameter. In some implementations, the granular superabsorbent polymer has a particle fractal dimension ($D_f$) in a range of from 1 to 3. The fractal dimension can be determined by methods known in the art that essentially describe the relationship between the particle area and the particle perimeter. For example, $D_f$ can be determined by laser light scattering and calculated based on an aerodynamic size. In some implementations, a useful surrogate or approximation of the fractal dimension can be estimated by D[3,2](the Sauter mean), D[4,3](the De Brouckere mean), surface area, uniformity, or any combination thereof.

In some implementations, the granular superabsorbent polymer has a $D_v(50)$ particle size in a range of about 1 micron to about 900 microns. In some implementations, the granular superabsorbent polymer has a $D_v(50)$ particle size in a range of about 1 micron to about 800 microns, about 1 microns to about 500 microns, about 5 microns to about 250 microns, about 5 microns to about 100 microns, or about 5 microns to about 60 microns. In some implementations, the granular superabsorbent polymer has a $D_v(50)$ particle size below 800 microns and a fractal dimension ($D_f$) in a range of from 1 to 3. In some implementations, granular SAP powders can have a single mode or multimode particle size distribution frequencies wherein in the parameters can be used in individually or in any combination to describe the granular SAP powder.

In some implementations, the granular superabsorbent polymer has a $D_v(10)$ of about 1 to about 35 microns, a $D_v(50)$ of about 5 to about 60 microns, and a $D_v(90)$ of about 30 to about 300 microns. In some implementations, the granular superabsorbent polymer has a $D_v(90)$ to $D_v(10)$ ratio in a range of from 1 to 50, or from 3 to 20.

In some implementations, the nature of the granular SAP powder particles can be described and identified by other quantitative dimensionalities. One example is the surface energy as determined by methods such as, but not limited to, inverse gas phase chromatography (IGC), 2-dimensional spreading pressure, contact angle analysis via wicking rates, acid base properties, wherein applicable theories can be used to predict particle-particle and particle-liquid interactions. These dimensions can be useful to predict the granular SAP powder interaction with liquids, polymers, and other particulate materials described herein.

The compatibility of the at least two liquid components can be estimated by, but not limited to, Hansen solubility parameters (HSP) or determined experimentally. See, e.g., Hansen Solubility Parameters: A User's Handbook, Second Edition, Hansen, Charles M., CRC Press, 2007. As such, the compatibility (e.g., solubility) of liquid components can be determined based a mathematical relationship between the HSP, δD for Dispersion (van der Waals), δP for Polarity (related to dipole moment) and δH for hydrogen bonding, pertaining to each liquid. In some implementations, the at least two liquid components comprise a polar liquid component and a nonpolar liquid component.

The relative energy difference (RED) can be determined for liquid components based on the Hansen solubility parameters. In general, a RED of less than 1 indicates that molecules are soluble, a RED of greater than 1 indicates that molecules are insoluble, and a RED equal to 1 indicates that the molecules are partially soluble. In some implementations, the insolubility of the at least one liquid component with the other liquid components is determined by Hansen solubility parameters, wherein the relative energy difference (RED) of the at least one liquid component and the other liquid components is equal to or greater than 1. In some implementations, the RED of the at least one liquid component and the other liquid component is greater than 1.

Each of the liquid components can have different viscosity or similar viscosity to the other liquid components. In some implementations, at least two liquid components each have a viscosity in a range of about 1 cP to about 100,000 cP at 23° C., about 5 cP to about 10,000 cP at 23° C., about 10 cP to about 1,000 cP at 23° C., or about 25 cP to about 800 cP at 23° C.

In some implementations, the liquid components can comprise a class of materials that undergo phase transitions, for example liquid to solid or solid to liquid, such as waxes or compositions that can be defined by, but not limited to, specific heat, latent heat, melting point, or Kraft temperature. Liquid components can be polar, non-polar, or have characteristics of both. In some implementations, the liquid components comprise liquids that are polymers or oligomers, natural or synthetic, or combinations thereof.

Each liquid component in the liquid medium can independently include one or more liquids. In some implementations, the liquid medium comprises a first liquid component and a second liquid component, wherein the first liquid component is insoluble with the second liquid component. In some implementations, the first liquid component is nonpolar and the second liquid component is polar.

In some implementations, the first liquid component has a viscosity in a range of about 10 cP to about 100,000 cP, or about 400 cP to about 600 cP, at 23° C. In some implementations, the first liquid component has a viscosity in a range of about 10 cP to about 1,000,000 cP at 100° C.

In some implementations, the first liquid component comprises a silicon-containing liquid, a hydrocarbon liquid, a fluorocarbon liquid, or combinations thereof. In some implementations, the first liquid component comprises a silicon-containing liquid, a hydrocarbon liquid, or a fluorocarbon liquid. In some implementations, the first liquid component comprises a hydrocarbon liquid, a silicon-containing liquid, or a combination thereof. In some implementations, the first liquid component comprises a hydrocarbon liquid or a silicon-containing liquid.

In some implementations, the first liquid component comprises a silicon-containing liquid. In some implementations, the silicon-containing liquid comprises a silicone, organo-silicone, silane, siloxane, or organosilane. In some implementations, the silicon-containing liquid includes coupling agents, nitrogen-containing silicones, or surface-active silicones used for aqueous emulsions or compatibilization with hydrocarbons, and other silicon containing groups with desirable physicochemical properties such as, but not limited to, vapor pressure, refractive index, melting point, chemical reactivity. In some implementations, the silicon-containing liquid comprises silicone oil. In some implementations, the first liquid is polydimethylsiloxane.

In some implementations, the first liquid component comprises a hydrocarbon liquid, such as a paraffinic oil, that can have a range of vapor pressures and can include solvents, co-solvents, or anti-solvents. In some implementations, the hydrocarbon liquid comprises functionality selected from a sulfur-containing group, nitrogen-containing group, oxygen-containing group, halogenated functional group, alkane, alkene, alkyne, a metal salt, or a combination thereof to impart desirable physical or chemical properties of the dispersion. The nature and mole fraction of functional moieties contained in the hydrocarbon liquid material can be selected to impart or alter the physicochemical properties associated with, but not limited to, solubility, hydrogen bonding, surface tension and associated thermodynamic properties, vapor pressure, viscosity, density, solubility parameters, freeze point/melting point, osmotic pressure. In some implementations, polyisobutene is used as an alternative to or in addition to paraffinic oils and silicone oils.

In some implementations, the hydrocarbon liquid is paraffinic oil or polyisobutene. In some implementations, the hydrocarbon liquid is paraffinic oil. In some implementations, the paraffinic oil comprises light paraffin oil, mineral oil, light mineral oil, white mineral oil, sulfonated mineral oil, or combinations thereof. In some implementations, the paraffinic oil comprises light paraffin oil, mineral oil, light mineral oil, sulfonated mineral oil, or combinations thereof.

In some implementations, the paraffinic oil viscosity has a range of 30 SUS to 2000 SUS at 40° C. In some implementations, the paraffinic oil is 90SUS, 100SUS, 325SUS, 500SUS or 2,000SUS white mineral oil, or blends thereof. In some implementations, the paraffinic oil is 90SUS, 100SUS, 325SUS, 500SUS or 2,000SUS white mineral oil at 40° C. In some implementations, the hydrocarbon liquid meets or is below the IP346 (Institute of Petroleum publication) or ASTM E 1687 (Modified Ames Test) screening assay test threshold designating dermal carcinogenicity of petroleum oils. In some implementations, the paraffinic oil comprises a mixture of paraffinic oils having viscosities in a range of about 10 cP to about 750 cP at 40° C.

In some implementations, the hydrocarbon liquid is polyisobutene. In some implementations, the polyisobutene has a viscosity in a range of about 10 cp to about 3,000,000 cP at 100° C.

In some implementations, the hydrocarbon liquid contains functionalities that can undergo chemical reactions initiated by radiative means such as, but not limited to, heat, electron beam, UV and other chemical means to induce polymerization, polymer-particle reactions, or to alter the solubility or physicochemical interaction of components in the composition. In some implementations, liquid dispersion compositions and their physicochemical properties can include labile functionalities that could be advantageous to reduce viscosity, polymer particle interactions and polymer-polymer interaction. Modulation of the physical properties in this manner could alter the nature of the dispersion just prior to application in manufacturing process; for example, but not limited to, reduce the viscosity, change the settling behavior of the particles in suspension, alter the surface-active properties, and/or modify the vapor pressure of the compositions. These properties can be temporal and reversible.

In some implementations, the first liquid component is present in the composition from about 0.1% to about 99% by weight, about 1% to about 99% by weight, about 1% to about 10% by weight, about 10% to about 80% by weight, about 20% to about 60% by weight, about 25% to about 45% by weight, or about 50% to about 60% by weight. In some implementations, the first liquid component is present in the composition from about 0.1% to about 99% by weight, about 1% to about 10% by weight, about 10% to about 80% by weight, about 20% to about 60% by weight, about 25% to about 45% by weight, or about 50% to about 60% by weight.

In some implementations, the liquid dispersion composition comprises from about 1 wt. % to about 99 wt. % of the first liquid component. In some implementations, the liquid dispersion composition comprises from about 0.2 wt. % to about 20 wt. %, about 0.2 wt. % to about 10 wt. %, about 0.5 wt. % to about 5 wt. %, or about 0.8 wt. % to about 2 wt. % of the first liquid component. In some implementations, the liquid dispersion composition comprises from about 0.1 wt. % to about 10 wt. %, about 0.1 wt. % to about 5 wt. %, or about 0.1 wt. % to about 1 wt. % of the first liquid component. In some implementations, the liquid dispersion composition comprises from about 0.01 wt. % to about 1.0 wt. % of the first liquid component. In some implementations, the liquid dispersion composition comprises from about 0.05 wt. % to about 1.0 wt. % of the first liquid component.

In some implementations, the liquid dispersion composition comprises about 10 wt. % to about 70 wt. % of the first liquid component. In some implementations, the liquid dispersion composition comprises about 15 wt. % to about 55 wt. %, about 20 wt. % to about 50 wt. %, or about 25 wt. % to about 40 wt. % of the first liquid component.

In some implementations, the liquid components comprise liquids having linear structures, branched structures, other structural arrangements, or combinations thereof. Liquids can be chosen based on their interaction (for example absorption or adsorption) to the surface of the granular superabsorbent materials or applied substrate. In some implementations, thermodynamic properties such, but not limited to, as work of adhesion, work of cohesion, 2-dimensional spreading pressures, or experimentally determined values could be used to identify desirable properties.

In some implementations, the second liquid component comprises a polar liquid. Polar liquids can be selected from molecules that are uncharged, yet have an asymmetric internal distribution of charge, leading to partially positive and partially negative regions. Examples of polar liquids include, but are not limited to, polyols, esters, ethylene glycols, water, alcohols, or any combination thereof. In some implementations, polar liquids include polyols, esters, ethylene glycols, propylene glycol, water, alcohols, or any combination thereof. In some implementations, the second liquid component can be selected based on the dielectric constant or other related physical properties of the polymer or solvent type. These properties can be useful in applications of the disclosed liquid dispersion composition, where high voltage or current is prevalent and insulating or thermal stability properties can be imparted to a coated article.

In some implementations, the second liquid component comprises a surface active agent (e.g., surfactant or adjuvant), a polyol, an ester, an alkylene glycol, water, an alcohol, or a combination thereof. In some implementations, the second liquid component comprises water.

In some implementations, the second liquid component comprises a polyol. In some implementations, the polyol has a molecular weight of less than about 100 g/mol. In some implementations, the second liquid component includes propylene glycol. In some implementations, the second liquid component comprises water and propylene glycol, or other components that have high osmotic pressure.

In some implementations, the second liquid component is present in the composition from about 0.1% to about 99% by weight, about 1% to about 99% by weight, about 5% to about 99% by weight, about 75% to about 99% by weight, about 0.1% to about 10% by weight, or about 0.5% to about 5% by weight. In some implementations, the second liquid component is present in the composition from about 0.1% to about 99% by weight, about 1% to about 99% by weight, about 75% to about 99% by weight, about 0.1% to about 10% by weight, or about 0.5% to about 5% by weight. In some implementations, the second liquid is present in the composition from about 50% to about 99% by weight.

In some implementations, the liquid dispersion composition comprises from about 5 wt. % to about 99 wt. % of the second liquid component. In some implementations, the liquid dispersion composition comprises from about 0.5 wt. % to about 90 wt. % of the second liquid component. In some implementations, the liquid dispersion composition comprises from about 1 wt. % to about 80 wt. %, about 10 wt. % to about 70 wt. %, about 20 wt. % to about 60 wt. %, about 25 wt. % to about 50 wt. %, about 25 wt. % to about 45 wt. %, or about 32 wt. % to about 40 wt. % of the second liquid component. In some implementations, the liquid dispersion composition comprises from about 32 wt. % to about 40 wt. % of the second liquid component.

In some implementations, the liquid dispersion composition comprises about 1 wt. % to about 30 wt. % of the second liquid component. In some implementations, the liquid dispersion composition comprises about 1 wt. % to about 20 wt. %, about 1 wt. % to about 10 wt. %, or about 1 wt. % to about 5 wt. % of the second liquid component.

In some implementations, the liquid dispersion composition comprises one or more surface active agents. Surface active agents can be selected from, but not limited to, nonionic surfactants, ionic surfactants, amphoteric surfactants, zwitterion base surfactants, or based on physical properties such as critical micelle concentration, HLB (HLD); based on structure such as double chained, single chained, naturally or synthetic, silicon based, di-block copolymer, or any combination thereof. In some implementations, these materials can exhibit polar and non-polar characteristics. In some implementations, the surface active agents have a melting point below 100° C. and are considered liquid. In some implementations, the surface active agents have a melting point below 120° C. and are considered waxy surfactants or emulsifiers. In some implementations, the surface active agents are considered nonionic emulsifiers and wetting agents. The surface active agent can be chosen to be soluble or insoluble with at least one of the liquid components of the liquid medium disclosed herein. In some implementations, the surface active agent can constitute one of the liquid components.

In some implementations, the second liquid component is a surface active agent. In some implementations, at least one surface active agent is insoluble with at least one of the liquid components in the liquid medium. In some implementations, at least one surface active agent is insoluble with at least one of the first liquid component and the second liquid component.

In some implementations, the liquid dispersion composition comprises at least one surface active agent that is different from the first liquid component and the second liquid component (i.e., the surface active agent is not the first liquid component or the second liquid component). In some implementations, the at least one surface active agent that is different from the first liquid component or the second liquid component is present in the composition from about 0.01% to about 50% by weight, about 0.1% to about 10% by weight, about 0.1% to about 5% by weight, or about 0.5% to about 2% by weight.

In some implementations, liquid dispersion composition comprises from about 0.01 wt. % to about 50 wt. % of at least one surface active agent. In some implementations, liquid dispersion composition comprises from about 0.2 wt. % to about 20 wt. % of at least one surface active agent. In some implementations, liquid dispersion composition comprises from about 0.2 wt. % to about 15 wt. %, about 0.2 wt. % to about 10 wt. %, about 0.2 wt. % to about 5 wt. %, about 0.5 wt. % to about 3 wt. %, about 0.5 wt. % to about 1.5 wt. %, or about 0.8 wt. % to about 1.0 wt. % of at least one surface active agent. In some implementations, liquid dispersion composition comprises from about 0.8 wt. % to about 1.0 wt. % of at least one surface active agent.

In some implementations, the one or more surface active agents are selected from a nonionic surfactant, an ionic surfactant, an amphoteric surfactant, a zwitterion base surfactant, or a combination thereof. In some implementations, the one or more surface-active agents each have a melting point below 100° C. In some implementations, the one or more surface active agents each have a melting point below 120° C.

In some implementations, the one or more surface active agents comprise a nonionic surfactant. In some implementations, the one or more surface active agents comprise a natural fatty alcohol ethoxylate, a synthetic fatty alcohol ethoxylate, a fatty acid ester of polyethoxy sorbitan, a polyethylene alkyl phenyl ether, or a combination thereof. In some implementations, the one or more surface active agents comprise a fatty acid ester of polyethoxy sorbitan, a polyethylene alkyl phenyl ether, or a combination thereof. In some implementations, at least one of the one or more surface active agents is a polysorbate. In some implementations, the one or more surface active agents comprise (x)-sorbitan mono-9-octadecenoate poly(oxy-1,2-ethanediyl) (i.e., polysorbate 80), trimethylpentan-2-yl)phenoxy]ethanol (i.e., Triton X), or a combination thereof. In some implementations, at least one surface active agent comprises (x)-sorbitan mono-9-octadecenoate poly(oxy-1,2-ethanediyl). In some implementations, the one or more surface active agents comprise polysorbate 80, polysorbate 20, or a combination thereof. In some implementations, the one or more surface active agents comprise polysorbate 20.

In some implementations, the one or more surface active agents are selected from PEG-8 oleate, polyglyceryl-3-methylglucose distearate, oleth-10, oleth-10/polyoxyl 10 oleyl ether NF, ceteth-10, PEG-8 laurate, cocamide MEA, polysorbate 60 NF, polysorbate 60, polysorbate 80 NF, polysorbate 80, isosteareth-20, PEG-60 almond glycerides, PEG-20 methyl glucose sesquistearate, ceteareth-20, oleth-20, steareth-20, steareth-21, ceteth-20, isoceteth-20, polysorbate 20, or a combination thereof.

In some implementations, the one or more surface active agents comprise an ionic surfactant. For example, the ionic surfactant is sodium lauryl sulfate.

In some implementations, the one or more surface active agents each have a critical micelle concentration in the range of about 0.001 mM to about 1 mM in pure water. The critical micelle concentration can be measured according to methods known in the art, for example, a surface-tension method, light-scattering method, electric conductivity method, osmotic pressure method, surface plasmon resonance method, or a fluorometric method. In some implementations, the one or more surface active agents each have a hydrophilic-lipophilic balance (HLB) value in a range of about 10 to about 18, about 12 to 18, or about 13 to about 16. In some implementations, the one or more surface active agents each have an HLB value in a range of about 11 to about 17. The HLB value is a measure of a surfactant's degree of hydrophilicity or lipophilicity, and can be determined by calculating percentages of molecular weights for the hydrophilic and lipophilic portion of the surfactant molecule.

Example HLB values for non-limiting surface active agents are shown in the table below:

| Surfactant | HLB |
|---|---|
| PEG-8 Oleate | 11.6 |
| Polyglyceryl-3 Methyglucose Distearate | 12 |
| Oleth-10 | 12.4 |
| Oleth-10/Polyoxyl 10 Oleyl Ether NF | 12.4 |
| Ceteth-10 | 12.9 |
| PEG-8 Laurate | 13 |
| Cocamide MEA | 13.5 |
| Polysorbate 60 NF | 14.9 |
| Polysorbate 60 | 14.9 |
| Polysorbate 80 | 15 |
| Isosteareth-20 | 15 |
| PEG-60 Almond Glycerides | 15 |
| Polysorbate 80 NF | 15 |
| PEG-20 Methyl Glucose Sesquistearate | 15 |
| Ceteareth-20 | 15.2 |
| Oleth-20 | 15.3 |

-continued

| Surfactant | HLB |
|---|---|
| Steareth-20 | 15.3 |
| Steareth-21 | 15.5 |
| Ceteth-20 | 15.7 |
| Isoceteth-20 | 15.7 |
| Polysorbate 20 | 16.7 |

In some implementations, the liquid dispersion composition further comprises one or more additives. Additives are materials that can be classified by their physicochemical properties and generally are finely divided solid powders. The additives can impart features to the liquid dispersion compositions such as, but not limited to, thermal conductivity, electrical conductivity, or other radiative properties, magnetic/properties, color, enhanced water absorption, prevent or retard SAP particle settling, improve gel strength, control viscosity of the dispersion, promote or augment adhesion, film formation, increase surface area, or any combination thereof. These materials can be selected based on their interaction with the liquid types or SAP particles, or combinations thereof. In some implementations, additives can be chosen to impart specific surface charge on the SAP particles in nonpolar (apolar) liquid media, known as solvent charging. These additives, also known as charge control agents, can have the ability to form a negative or positive charge on the particle surface in nonpolar media. This effect can be useful in steric stabilization of the SAP particles in the liquid medium. In some implementations, additives, or combinations thereof, can be useful in certain application techniques that rely on electrostatic deposition. For example, charge controlled deposition to create patterns, zones or regions on substrates, or the dispersion ability to accept electrostatic charge. Additives can be organic in nature and can be defined by melting point, chemical composition, or other physical aspects. In some implementations, the one or more additives each have a $D_v(50)$ particle size in a range of about 1 micron to about 800 microns and a particle fractal dimension ($D_f$) in a range of 1 to 3.

In some implementations, the one or more additives are selected from metal oxides, metals, composites, a thermally or electrically conductive material, a wax, a thermoset or thermomelt polymer, adhesive, sealant, film former, plasticizer, resin, oil, acrylate, urethane, cleaner, buffer, fragrance, biocide, fertilizer, anticorrosive, human or animal therapeutics, topicals, a swelling clay, or a combination thereof. In some implementations, the one or more additives are selected from metal oxides, metals, composites, a thermally or electrically conductive material, a wax, a thermoset or thermomelt polymer, adhesive, sealant, film former, plasticizer, resin, oil, acrylate, urethane, cleaner, buffer, fragrance, biocide, fertilizer, anticorrosive, human or animal therapeutics, topicals, or a combination thereof.

In some implementations, the metal oxides comprise silica, alumina, titania, ceria, zirconia, iron oxide, or a combination thereof. In some implementations, the metal oxide additives can have a synergistic effect with the granular superabsorbent polymer in that the resulting swollen hydrogels have improved gel strength or speed of absorption. In some implementations, the one or more additives comprise colloidal, precipitated, or fumed silica. In some implementations, the one or more additives comprise colloidal silica. In some implementations, the one or more additives comprise precipitated silica.

In some implementations, the thermally or electrically conductive material comprises indium tin oxide, boron nitride, carbon black, aluminum nitride, silicon nitride, or a combination thereof. In some implementations, the thermally or electrically conductive material can impart desirable properties to coatings (e.g., films) formed by the liquid dispersion compositions described herein. For example, when the electrically or thermally conductive materials are added to the composition to sufficiently form a percolating network within a drawn film. In some implementations, the electrical or thermal properties of the film change when the film is exposed to aqueous liquids or non-aqueous liquids comprising some portion of water. In this case, the percolating network can be disrupted by the mechanical swelling/absorption of the granular SAP powder, leading to a reduction or termination of continuity. Associated properties such as, but not limited to, capacitance, conductivity (thermal or electrical) or other properties related to receiving or transmitting electromagnetic radiation can serve as indication of moisture or water ingress. In some implementations, methods of detection and wireless connectivity can be used to form a moisture sensor using the liquid dispersion compositions described herein.

In some implementations, the one or more additives comprise organic hydrocarbon materials such as waxes and plastics including thermomelt and thermoset polymers, for example but not limited to polypropylene, polyurethanes, polyamides, polyesters, polycarbonates, polyacrylates, adhesives, sealants. In some implementations, the thermoset or thermomelt polymer comprises polypropylene, polyurethane, polyamide, polyester, polycarbonate, polyacrylate, polyethylene, polyacrylamide, polyimide, copolymers thereof, or a combination thereof. These types of additives that can undergo a phase transition can be useful in forming composite films of the granular superabsorbent polymer powders and promoting adhesion to the surface of coated substrates.

In some implementations, the liquid dispersion composition comprises materials that can promote film formation in the application and deposition of dispersions to form continuous films. In some implementations, one or more additives comprise water-dispersible (i.e., polar) or oil-dispersible (i.e., apolar or nonpolar) polymers that include, but not limited to, polyethylene glycols like PEG-200, PEG-300, PEG-400, PEG-600, or a combination thereof. In some implementations, the one or more additives comprise polyethylene glycol. In some implementations, the one or more additives comprise PEG-200, PEG-300, PEG-400, PEG-600, or a combination thereof. In some implementations, the one or more additives comprise polyethylene glycol. In some implementations, the one or more additives comprise PEG-200, PEG-300, PEG-600, or a combination thereof. In some implementations, the one or more additives comprise PEG-200. In some implementations, the one or more additives comprise PEG-300. In some implementations, the one or more additives comprise PEG-400. In some implementations, the one or more additives comprise PEG-600. In some implementations, the one or more additives comprise PEG-300 and PEG-600.

In some implementations, the one or more additives comprise polyethylene glycol, silica, or a combination thereof. In some implementations, the one or more additives comprise polyethylene glycol and silica.

In some implementations, the one or more additives comprise film former, plasticizers, resins, oils, acylates, urethanes, water soluble film formers that include, but not limited to, reactive functional groups that undergo reactions by exposure to air, or atmospheric moisture, surface moisture. In some implementations, the oil comprises linseed oil. In some implementations, the film former is a water-soluble film former. In some implementations, the water-soluble film former (or binder) includes, but is not limited to, poly(2-ethyl-2-oxazoline), for example that has broad solubility in both water and polar organic solvents. In some implementations, the liquid dispersion composition comprises water-soluble materials that promote the deposition of coatings with minimized or reduced dusting and flaking characteristics. In some implementations, the water-soluble film former comprises cellulose, alginate, gum, pectin, polyvinyl alcohol, or a combination thereof.

In some implementations, water soluble films can be formed from the liquid dispersion compositions described herein. In some implementations, high molecular weight polymer/solvent combinations can effectively form a film by solvent evaporation upon deposition of the SAP dispersion. In some implementations, the evaporating (fugitive) solvents can be polar, non-polar, or combinations thereof. In some implementations, the solvent can be a VOC (volatile organic compound) exempt solvent such as acetone, dimethyl carbonate, or methyl acetate as non-limiting examples. In some implementations, additional functional additives comprise cleaners, buffers, fragrances, pesticides, herbicides, fertilizers, and other plant nutrients, anticorrosive, human and animal therapeutics and topicals for sterile applications, or combinations thereof.

In some implementations, the one or more additives include a swelling clay. In some implementations, the swelling clay comprises bentonite. In some implementations, the one or more additives comprise silica, bentonite, a film former, or a combination thereof.

In some implementations, the liquid dispersion composition comprises about 0.01 wt. % to about 50 wt. %, about 0.1 wt. % to about 25 wt. %, or about 0.1 wt. % to about 10 wt. % of the one or more additives.

In some implementations, the one or more additives are present in the composition from about 0.01% to about 50% by weight. In some implementations, the one or more additives are present in the composition from about 0.01% to about 10% by weight. In some implementations, the one or more additives are present in the composition from about 0.01% to about 5% by weight. In some implementations, the film former is present in the composition from about 0.01% to about 30% by weight.

In some implementations, the liquid dispersion composition forms an absorbent gel upon exposure to water. For example, the liquid dispersion composition forms a self-supporting, high absorbing, aqueous gel when the composition is exposed to free water. In some implementations, the liquid dispersion composition forms a self-supporting absorbent gel within about 30 seconds of exposure to the water. In some implementations, the liquid dispersion compositions form an absorbent material (e.g., an absorbing gel) upon exposure to water without heating the liquid dispersion composition.

In some implementations, the liquid dispersion composition forms an oil-in-oil emulsion, suspension, oil-in-water emulsion, water-in-oil emulsion, or a combination thereof. In some implementations, the liquid dispersion composition forms a multiphase emulsion. For example, the liquid dispersion composition forms a double emulsion.

In some implementations, the liquid dispersion composition exhibits rapid phase inversion upon exposure to water. For example, the second liquid component comprises a high HLB surface active agent such as, but not limited to, (x)-sorbitan mono-9-octadecenoate poly(oxy-1,2-ethanediyl), which is not soluble with the first liquid component, such as paraffinic oil. Not wishing to be bound by theory, the mixture of the paraffin and the surface active agent can form a micro-emulsion or emulsion, wherein the granular SAP is associated. In some implementations, different surface active agents, and any combinations thereof, can be selected based on their miscibility with the first liquid component. As a non-limiting example, trimethylpentan-2-yl)phenoxy]ethanol (HLB of about 13.4), polyoxyethylene (20) sorbitan monooleate (HLB of about 15) and polyoxyethylene (20) sorbitan monolaurate (HLB of about 16.7) have distinct and different miscibility (solubility) in hydrocarbon liquids like mineral oil. The micro emulsion can serve a dual purpose in that it helps suspend granular SAP powders and can self-associate with the surface of the granular SAP powder. This is evidenced by the significant reduction in the dispersion of the granular SAP powder in a non-aqueous medium when the surface active agent is introduced. In some implementations, a surface absorption of the surface active agent on the granular SAP powder reduces particle-particle interaction reducing the overall dispersion viscosity. In some implementations, a relationship exists between the surface area of the granular SAP powder and the surface excess concentration of the surface active agent in the liquid medium. As such, and unexpectedly, the self-emulsifying properties of the composition and dispersion properties/characteristics can be independently controlled, such as settling or viscosity. The relative empirical relationship can be used, but not limited to, describe the general nature of the dispersion, as shown in Equation (1).

$$D_p \propto (\Gamma_{sap} P_o A)/[S] + b \qquad \text{Equation (1)}$$

In Equation (1), the dispersion properties ($D_p$), in either pre or post SAP hydrated state, are not limited to viscosity, rheological properties, particle settling rate, water absorption capacity and swell rate, gel characteristics, lubricity or any combination thereof. As such, the dispersion characteristics can be proportional to the total the relative surface excess ($\Gamma$) of the surface active agent(s) scaled by the first liquid component characteristics ($P_o$) and granular SAP powder characteristics (i.e. surface area, particle size, inherent absorption capacity) normalized to the total concentration of the surface active agents [S]. In some implementations, the nature and quantity of additives in the composition can impart characteristics to the dispersion that can be described by b.

In some implementations, the relative surface excess can be described in terms of the quantity of surfactant absorption at the granular SAP powder interface. The absorption interaction can be related to the SAP powder available surface area, the free energy of absorption of a given surface active agent, additive, or liquid and the solubility of the surface active agent, additive, or liquid with the primary dispersion medium. Without wishing to be bound by theory, it is believed that the granular SAP powder particle-particle interaction, or the work of cohesion, is greater than the liquid medium interaction, or the work of adhesion, in the apolar liquid case. The particle-particle interaction can give rise to high viscosity of the dispersion. In some implementations, addition of a surface nonionic active agent that is not miscible with the liquid medium, significantly reduces the viscosity of the dispersion when added under mixing conditions. In some implementations, the nonionic surface active agent preferentially absorbs to the surface of the granular SAP powder, thus reducing the particle-particle interaction. In this case, higher volume fraction of SAP powder can be added to the dispersion yet maintain a similar viscosity to dispersions without the non-ionic surfactant at lower volume fraction of SAP powder.

In some implementations, the liquid dispersion compositions are free of VOCs, formaldehyde, halogenated compounds, or combinations thereof. In some implementations, the liquid dispersion compositions has less than 5 wt. %, less than 1 wt. %, less than 0.1 wt. %, or less than 0.001 wt. % of VOCs, formaldehyde, halogenated compounds, or combinations thereof. In some implementations, the liquid dispersion composition is non-toxic.

In some implementations, the liquid dispersion composition comprises:

about 5 wt. % to about 99 wt. % of the first liquid component; and about 1 wt. % to about 99 wt. % of the second liquid component.

In some implementations, the liquid dispersion composition further comprises about 0.01 wt. % to about 50 wt. % of the at least one surface active agent that is different from the first liquid component or the second liquid component. In some implementations, the liquid dispersion composition further comprises about 0.01 wt. % to about 50 wt. % of the one or more additives.

In some implementations, the liquid dispersion composition comprises:

about 30 wt. % to about 95 wt. % of the granular superabsorbent polymer;

about 20 wt. % to about 60 wt. % of the first liquid component, wherein the first liquid component comprises a hydrocarbon liquid; and about 0.1 wt. % to about 10 wt. % of the second liquid component, wherein the second liquid component comprises a surface active agent.

In some implementations, the liquid dispersion composition comprises:

about 30 wt. % to about 65 wt. % of the granular superabsorbent polymer;

about 20 wt. % to about 60 wt. % of the first liquid component, wherein the first liquid component comprises a hydrocarbon liquid; and about 0.1 wt. % to about 10 wt. % of the second liquid component, wherein the second liquid component comprises a surface active agent.

In some implementations, the liquid dispersion composition further comprises about 0.1% to about 10 wt. % of the at least one surface active agent that is different from the first liquid component or the second liquid component.

In some implementations, the liquid dispersion composition comprises:

about 0.1 wt. % to about 25 wt. % of the granular superabsorbent polymer;

about 1 wt. % to about 10 wt. % of the first liquid component, wherein the first liquid component is a silicon-containing liquid;

about 75 wt. % to about 99 wt. % of the second liquid component, wherein the second liquid component comprises water; and about 0.1 wt. % to about 5 wt. % of the at least one surface active agent that is different from the first liquid component or the second liquid component.

In some implementations, the liquid dispersion composition further comprises about 0.01 wt. % to about 10 wt. % of the one or more additives.

In some implementations, the liquid dispersion composition comprises:

about 5 wt. % to about 75 wt. % of the granular superabsorbent polymer;

about 5 wt. % to about 95 wt. % of the first liquid component;

about 0.5 wt. % to about 95 wt. % of the second liquid component, wherein the second liquid component comprises a polyol; and about 0.5 wt. % to about 20 wt. % of the at least one surface active agent that is different from the first liquid component or the second liquid component.

In some implementations, the polyol is propylene glycol.

In some implementations, the liquid dispersion composition further comprises about 0.01 wt. % to about 10 wt. % of one or more additives.

In some implementations, the liquid dispersion composition comprises:

about 0.1 wt. % to about 80 wt. % of the granular superabsorbent polymer;

about 1 wt. % to about 99 wt. % of the first liquid component, wherein the first liquid component comprises a nonpolar liquid component;

about 5 wt. % to about 99 wt. % of the second liquid component, wherein the second liquid component comprises a polar liquid component;

about 0.01 wt. % to about 50 wt. % of the at least one surface active agent that is different from the first liquid component or the second liquid component. In some implementations, the liquid dispersion composition further comprises about 0.01 wt. % to about 50 wt. % of the one or more additives. In some implementations, the liquid dispersion composition further comprises from about 0.01 wt. % to about 30 wt. % of one or more film formers.

In some implementations, liquid dispersion composition comprises:

about 5 wt. % to about 80 wt. % of the granular superabsorbent polymer, wherein the granular superabsorbent polymer comprises an acrylate polymer;

about 0.01 wt. % to about 1.0 wt. % of the first liquid component;

about 0.5 wt. % to about 90 wt. % of the second liquid component, wherein the second liquid component comprises a polyol; and about 0.2 wt. % to about 20 wt. % of the at least one surface active agent that is different from the first liquid component or the second liquid component. In some implementations, the liquid dispersion composition further comprises from 0.1 wt. % to about 10 wt. % of one or more additives. In some implementations, the one or more additives comprise silica, bentonite, a film former, or a combination thereof.

In some implementations, liquid dispersion composition comprises:

about 5 wt. % to about 80 wt. % of the granular superabsorbent polymer, wherein the granular superabsorbent polymer comprises an acrylate polymer;

about 0.01 wt. % to about 1.0 wt. % of the first liquid component, wherein the first component comprises a hydrocarbon liquid, a silicon-containing liquid, or a combination thereof;

about 0.5 wt. % to about 90 wt. % of the second liquid component, wherein the second liquid component comprises propylene glycol; and about 0.2 wt. % to about 20 wt. % of the at least one surface active agent that is different from the first liquid component or the second liquid component, wherein the surface active agent comprises a non-ionic surfactant. In some implementations, the liquid dispersion composition further comprises from 0.1 wt. % to about 10 wt. % of one or more additives, wherein the one or more additives comprise silica, bentonite, a film former, or a combination thereof.

In some implementations, the liquid dispersion comprises:

about 60 wt. % to about 66 wt. % of the granular superabsorbent polymer, wherein the granular superabsorbent polymer comprises an acrylate polymer;

about 0.1 wt. % to about 1.0 wt. % of a hydrocarbon liquid or a silicon-containing liquid;

about 32 wt. % to about 40 wt. % propylene glycol; and about 0.8 wt. % to about 1.0 wt. % of the surface active agent. In some implementations, the liquid composition further comprises from about 0.1 wt. % to about 5 wt. % of one or more additives.

In some implementations, the liquid dispersion comprises:

about 60 wt. % to about 66 wt. % of the granular superabsorbent polymer, wherein the granular superabsorbent polymer comprises an acrylate polymer;

about 0.1 wt. % to about 1.0 wt. % of a paraffinic oil or silicone oil;

about 32 wt. % to about 40 wt. % propylene glycol; and about 0.8 wt. % to about 1.0 wt. % of the surface active agent, wherein the surface active agent comprises a polysorbate. In some implementations, the liquid composition further comprises from about 0.1 wt. % to about 5 wt. % of one or more additives, wherein the one or more additives comprise silica, bentonite, a film former, or a combination thereof.

In some implementations, the composition has a total solids content from about 20 wt. % to about 70 wt. %. In some implementations, the composition has a total solids content from about 20 wt. % to about 67 wt. %. In some implementations, the composition has a total dissolved solids amount of less than about 400 mg/L.

In some implementations, the liquid dispersion comprises:

about 30 wt. % to about 90 wt. % of the granular superabsorbent polymer;

about 10 wt. % to about 70 wt. % of the first liquid component, wherein the first liquid component comprises a nonpolar liquid component;

about 1 wt. % to about 30 wt. % of the second liquid component, wherein the second liquid component comprises a surface active agent.

In some implementations, the liquid dispersion comprises:

about 50 wt. % to about 70 wt. % of the granular superabsorbent polymer;

about 20 wt. % to about 50 wt. % of the first liquid component, wherein the first liquid component comprises a paraffinic oil;

about 1 wt. % to about 10 wt. % of a surface active agent, wherein the surface active agent comprises a polysorbate. In some implementations, the liquid dispersion composition further comprises about 0.1 wt. % to about 10 wt. % of one or more additives comprising polyethylene glycol, silica, or a combination thereof.

Also provided herein is a liquid dispersion composition comprising:

about 5 wt. % to about 80 wt. % of a granular superabsorbent polymer, wherein the granular superabsorbent polymer comprises an acrylate polymer;

about 0.5 wt. % to about 90 wt. % of a polyol; and about 0.2 wt. % to about 20 wt. % of one or more surface active agents.

Any suitable acrylate-based granular superabsorbent polymer as described herein may be utilized in the composition. In some implementations, the liquid dispersion composition comprises about 10 wt. % to about 80 wt. %, about 25 wt. % to about 75 wt. %, about 50 wt. % to about 75 wt. %, about 55 wt. % to about 70 wt. %, or about 60 wt. % to about 66 wt. % of the granular superabsorbent polymer. In some implementations, the liquid dispersion composition comprises about 58 wt. %, about 60 wt. %, about 63 wt. %, or about 65 wt. % of the granular superabsorbent polymer. In some implementations, the liquid dispersion composition comprises about 60 wt. %, about 63 wt. %, or about 65 wt. % of the granular superabsorbent polymer.

In some implementations, the liquid dispersion composition further comprises a silicon-containing liquid or a hydrocarbon liquid, or a combination thereof. Any suitable silicon-containing liquid or hydrocarbon liquid as described herein may be utilized in the composition. In some implementations, the silicon-containing liquid comprises a silicone, organo-silicone, silane, siloxane, or organosilane. In some implementations, the silicon-containing liquid comprises silicone oil (e.g., polydimethyl siloxane). In some implementations, the hydrocarbon liquid comprises functionality selected from a sulfur-containing group, nitrogen-containing group, oxygen-containing group, halogenated functional group, alkane, alkene, alkyne, a metal salt, or a combination thereof. In some implementations, the hydrocarbon liquid comprises polyisobutene (PIB). In some implementations, the hydrocarbon liquid comprises paraffinic oil. Any suitable paraffinic oil as described herein may be utilized in the composition. In some implementations, polyols, hydrocarbon liquids, silicon-containing liquids, or any combination thereof, may be utilized that establish and effectively tune desired properties of the dispersion compositions such as, for non-limiting examples, certain viscosities, viscosity range, melt-freeze points, water dilution-viscosity range, dispersibility, dispersion speed, ionic strengths, osmotic pressures, and rheological response.

In some implementations, the liquid dispersion composition comprises from about 0.1 wt. % to about 40 wt. %, about 0.1 wt. % to about 30 wt. %, or about 0.1 wt. % to about 20 wt. % of the hydrocarbon liquid or silicon-containing liquid. In some implementations, the liquid dispersion composition comprises from about 0.1 wt. % to about 10 wt. %, about 0.1 wt. % to about 5 wt. %, or about 0.1 wt. % to about 1 wt. % of the hydrocarbon liquid or silicon-containing liquid. In some implementations, the liquid dispersion composition comprises about 0.1 wt. % to about 1 wt. % of the hydrocarbon liquid or silicon-containing liquid.

In some implementations, the polyol comprises a glycol. In some implementations, the liquid dispersion composition comprises from about 1 wt. % to about 80 wt. %, about 10 wt. % to about 70 wt. %, about 20 wt. % to about 60 wt. %, about 25 wt. % to about 50 wt. %, about 25 wt. % to about 45 wt. %, or about 32 wt. % to about 40 wt. % of the polyol. In some implementations, the polyol comprises propylene glycol, glycerol, macrogels (e.g., polyethylene glycol or polypropylene glycol), or any combination of polyols thereof. In some implementations, the polyol comprises propylene glycol.

In some implementations, the liquid dispersion composition comprises about 25 wt. % to about 95 wt. % of the polyol. In some implementations, the liquid dispersion composition comprises about 30 wt. % to about 80 wt. % of the polyol. In some implementations, the liquid dispersion composition comprises about 25 wt. % to about 45 wt. % of the polyol. In some implementations, the liquid dispersion composition comprises about 32 wt. % to about 50 wt. % of the polyol. In some implementations, the liquid dispersion composition comprises about 32 wt. % to about 40 wt. % of the polyol.

Any suitable surface active agents as described herein may be utilized in the composition. In some implementations, the one or more surface active agents comprise a nonionic surfactant. In some implementations, at least one of the one or more surface active agents is a polysorbate. In some implementations, the one or more surface active agents comprise (x)-sorbitan mono-9-octadecenoate poly(oxy-1,2-ethanediyl), trimethylpentan-2-yl)phenoxy]ethanol, or a combination thereof. In some implementations, the one or more surface active agents comprise (x)-sorbitan mono-9-octadecenoate poly(oxy-1,2-ethanediyl).

In some implementations, the one or more surface active agents each have an HLB value in a range of about 10 to about 18, about 12 to 18, or about 13 to about 16. In some implementations, the one or more surface active agents each have an HLB value in a range of about 13 to about 16. In some implementations, at least one of the one or more surface active agents has an HLB value of about 15 to 17. In some implementations, at least one of the one or more surface active agents has an HLB value of about 15.

In some implementations, the liquid dispersion composition comprises from about 0.2 wt. % to about 15 wt. %, about 0.2 wt. % to about 10 wt. %, about 0.2 wt. % to about 5 wt. %, about 0.5 wt. % to about 3 wt. %, about 0.5 wt. % to about 1.5 wt. %, or about 0.8 wt. % to about 1.0 wt. % of one or more surface active agents. In some implementations, the liquid dispersion composition comprises about 0.5 wt. % to about 1.5 wt. % of one or more surface active agents. In some implementations, the liquid dispersion composition comprises about 0.8 wt. % to about 1.0 wt. % of one or more surface active agents.

In some implementations, the liquid dispersion composition further comprises one or more additives. Any suitable additives as described herein may be utilized in the composition. In some implementations, the one or more additives are selected from, but not limited to, any combination of functional additives that establish and effectively tune desired properties of the dispersion compositions such as, for non-limiting examples, certain viscosities, viscosity range, melt-freeze points, water dilution-viscosity range, dispersibility, dispersion speed, ionic strengths, osmotic pressures, rheology (e.g., viscoelastic behavior, tan delta or loss/storage moduli ratio), fluid structure (e.g., viscosity behavior under various shear-stress or shear-rate flow ranges, thixotropic index), or pH.

In some implementations, the one or more additives are selected from, but not limited to, any combination of monovalent, divalent, or higher multi-valent metal (ionic) salts, double salts, or similar metal (ionic) compounds that also establish and effectively tune desired properties of the dispersion compositions such as, for non-limiting examples, certain viscosities, viscosity range, melt-freeze points, water dilution-viscosity range, dispersibility, dispersion speed, ionic strengths, osmotic pressures, rheology (e.g., viscoelastic behavior, tan delta or loss/storage moduli ratio), fluid structure (e.g., viscosity behavior under various shear-stress or shear-rate flow ranges, thixotropic index), or pH.

In some implementations, the one or more additives are selected from metal oxides, metals, composites, a thermally or electrically conductive material, a wax, a thermoset or thermomelt polymer, adhesive, sealant, film former, plasticizer, resin, oil, acrylate, urethane, cleaner, buffer, fragrance, biocide, fertilizer, anticorrosive, human or animal therapeutics, topicals, a swelling clay, or a combination thereof. In some implementations, the one or more additives comprise silica, bentonite, a film former, or a combination thereof.

In some implementations, the liquid dispersion composition comprises from 0.1 wt. % to about 50 wt. % of the one or more additives. In some implementations, the liquid dispersion composition comprises from 0.1 wt. % to about 10 wt. % of the one or more additives. In some implementations, the liquid dispersion composition comprises from 0.1 wt. % to about 5 wt. % of the one or more additives.

In some implementations, the liquid dispersion composition comprises:

about 60 wt. % to about 66 wt. % of the granular superabsorbent polymer;

about 0.1 wt. % to about 1.0 wt. % of the hydrocarbon liquid or a silicon-containing liquid;

about 32 wt. % to about 40 wt. % propylene glycol; and about 0.8 wt. % to about 1.0 wt. % of the one or more surface active agents. In some implementations, the liquid dispersion composition further comprises from about 0.1 wt. % to about 5 wt. % of one or more additives.

In some implementations, the composition has a total solids content from about 20 wt. % to about 70 wt. %. In some implementations, the composition has a total dissolved solids amount of less than about 400 mg/L.

In some implementations, the liquid dispersion compositions described herein form an absorbent material (e.g., an absorbent gel) upon exposure to water. In some implementations, the water is nascent water.

In some implementations, the liquid dispersion composition is coated onto a substrate to form an absorbent coating (e.g., an absorbent film). In some implementations, one or more of the liquids are evaporated from the liquid dispersion composition to form the absorbent coating. In some implementations, the liquid dispersion composition forms an absorbent film within about 30 seconds of exposure to the water (i.e., the liquid dispersion composition forms a film on the substrate, wherein the film absorbs water within about 30 seconds of exposure to the water). In some implementations, the liquid dispersion compositions can impart water absorbent characteristics to a substrate such as functionalized yarns incorporated into electric transmission lines, fiber optics cable, or other coaxial cable applications. For example, water blocking yarns are used as a component in cable construction and are useful to arrest the ingress of water should the outer most protective cladding of the cable become damaged. In some implementations, yarns made of polyester or aramid are common and 1500-1700 Decitex are used as a general industry standard.

In some implementations, an application of the liquid dispersion compositions disclosed herein is imparting absorptive functionality to, but not limited to, polymer films, woven, and non-woven substrates. In some implementations, the liquid dispersion compositions can be applied to a substrate as continuous, non-continuous, uniform, non uniform, or combinations thereof to create patterns, zones or regions, of coatings to impart absorptive functionality. In some implementations, these types of films can be further incorporated into but not limited to, coaxial cables, liquid absorbing liners, or moisture retaining coverings.

In some implementations, the liquid dispersion composition has a water absorption capacity of at least about 10 grams of water per gram of liquid dispersion composition, at least about 20 grams of water per gram of liquid dispersion composition, or at least about 50 grams of water per gram of liquid dispersion composition. In some implementations, the liquid dispersion composition has a water absorption capacity of at least about 150 grams of water per gram of liquid dispersion composition. In some implementations, the liquid dispersion composition has a water absorption capacity of at least about 50 grams of water per gram of liquid dispersion composition, at least about 100 grams of water per gram of liquid dispersion composition, at least about 200 grams of water per gram of liquid dispersion composition, at least about 300 grams of water per gram of liquid dispersion composition, or at least about 350 grams of water per gram of liquid dispersion composition. In some implementations, the liquid dispersion composition has a water absorption capacity of at least about 100 grams of water per gram of liquid dispersion composition, at least about 200 grams of water per gram of liquid dispersion composition, at least about 300 grams of water per gram of liquid dispersion composition, or at least about 350 grams of water per gram of liquid dispersion composition. In some implementations, the liquid dispersion composition has a water absorption capacity of about 400 grams of water per gram of liquid dispersion composition.

Also provided herein is a method of preparing an absorbent coating (i.e., an absorptive coating) comprising providing a liquid dispersion composition disclosed herein, and applying the liquid dispersion composition to a substrate.

In some implementations, applying the liquid dispersion composition to a substrate comprises dip coating, roll coating, printing, or spraying the liquid dispersion composition onto the substrate. In some implementations, applying the liquid dispersion composition to a substrate comprises dip coating the liquid dispersion composition onto the substrate. In some implementations, the printing comprises printing the liquid dispersion composition onto the substrate using an electronic or thermal jet printer, a print screen, or a gravure printer. In some implementations, the spraying comprises aerosolizing the liquid dispersion composition. In some implementations, wherein applying the liquid dispersion composition to a substrate comprises co-extruding the liquid dispersion composition with the substrate.

In some implementations, applying the liquid dispersion composition to the substrate comprises applying the liquid dispersion composition as a uniform coating. In some implementations, the composition is applied to a substrate to form a uniform, continuous coating. As used herein, “continuous coating” refers to a coating that is essentially non-segmented and does not have discrete areas or regions of non-coated substrate. In some implementations, the composition is applied to a substrate to form a uniform, non-continuous coating. As used herein, “non-continuous coating” refers to a coating that has discrete coated and uncoated regions of the substrate.

In some implementations, applying the liquid dispersion composition to the substrate comprises applying the liquid dispersion composition as a non-uniform coating. In some implementations, the composition is applied to a partial region of a substrate or in a pattern on the substrate. In some implementations, applying the liquid dispersion composition as a non-uniform coating comprises applying the liquid dispersion composition in a pattern. In some implementations, the pattern comprises uniform or uniform dithered patterns, stripes, strips, geometric shapes, logos, lettering, numbers, images, other arrangements, combinations thereof, or other patterns of printing to create discrete function regions of a coated substrate. In some implementations, applying the composition in a particular zone, region, or pattern on the substrate, provides absorbent properties to a portion of a surface of a substrate, while allowing other regions of the surface of the substrate to remain non-absorbent.

In some implementations, the substrate is a non-absorptive material. In some implementations, applying the liquid dispersion composition to a non-absorptive material to form an absorbent coating on the substrate imparts absorptive properties to a non-absorptive substrate material. In some implementations, the absorbent coating swells when exposed to water and forms a gel on the substrate.

In some implementations, the composition is applied to one surface of the substrate. In some implementations, the composition is applied to two or more surfaces of a substrate.

In some implementations, the substrate is a fiber or a polymer film. In some implementations, the fiber is a yarn or a cable. In some implementations, the polymer film is a polypropylene film, a polyester (e.g., PET) film, or a polyethylene film. In some implementations, the polymer film is a polypropylene film, a PET film, or an HDPE film. In some implementations, the substrate is polyethylene. In some implementations, the substrate is HDPE or LDPE.

In some implementations, the substrate is an environmental surface. For example, the substrate is a ground site suitable to receive a coating.

In some implementations, the substrate is paper. In some implementations, the substrate is rice paper.

In some implementations, the absorbent coating has a water absorption capacity of at least about 10 grams of water per gram of absorbent coating, at least about 20 grams of water per gram of absorbent coating, or at least about 50 grams of water per gram of absorbent coating. In some implementations, the absorbent coating has a water absorption capacity of at least about 150 grams of water per gram of absorbent coating.

In some implementations, the absorbent coating dispersed in water has an average slip characteristic value from five consecutive sliding tests of at least about 1.5 or at least about 2 when applied to a polyester (e.g., PET) film. In some implementations, the absorbent coating has a slip characteristic value of at least about 1.5 or at least about 2 when applied to a PET film. In some implementations, the absorbent coating has an average slip characteristic value from five consecutive sliding tests of at least about 2, at least about 3, or at least about 4 when applied to a polyethylene (e.g., HDPE) film. In some implementations, the absorbent coating has a slip characteristic value of at least about 2, at least about 3, or at least about 4 when applied to an HDPE film. In some implementations, the absorbent coating dispersed in water has an effective torque force range of about 5 micro N-m to about 750 micro N-m over a velocity range of about 0.01 radians/second to about 1 radians/second with a 1.2 mm thick by 40 mm diameter disc sample geometry.

In some implementations, the absorbent coating has a viscosity in the range of about 5 cP to about 2,000,000 cP at 40° C.

In some implementations, the absorbent coating has a tan delta (tan δ) value in a range of about 0.1 to about 100. The tan delta (tan δ) value refers to the ratio of the elasticity modulus (G') and the viscous modulus (G") and is defined as: G"/G'. The tan δ value can be measured using a shear rheometer. The tan delta (tan δ) value is the ratio of the loss modulus to the storage modulus.

In some implementations, the absorbent coating is flexible. For example, the absorbent coating does not delaminate upon flexure. In some implementations, the absorbent coating does not flake and/or is not friable when the coated substrate, such as a coated yarn, is bent or drawn over a stationary smooth rod with a set pressure.

Also provided herein is an absorbent coating formed by a method disclosed herein.

Also provided herein is a substrate coated with a liquid dispersion composition disclosed herein.

The disclosure also includes liquid dispersion compositions enclosed within a container. In some implementations, the container is a water soluble container, a water permeable container, a water dispersible container, a container that is impervious to water, or a combination thereof. In some implementations, the container is a tote, drum, pail, bottle, bag, pouch, or satchet. In some implementations, the container is a bag, pouch, or satchet. In some implementations, the container is a spray bottle. In some implementations, the container is a packet or a pod. In some implementations, the liquid dispersion composition is enclosed within one or more containers.

In some implementations, the container is constructed of an appropriate flexible polymeric or foil laminate material and sealed such that the contents are self-contained. In some implementations, the container is sealed with the liquid dispersion composition comprised within. In some implementations, the liquid dispersion composition does not include water.

In some implementations, the liquid dispersion composition provides a water dispersible lubricant concentrate wherein subsequent incorporation into water allows self-emulsification into a lubricious hydrogel material with low viscous drag properties suitable for reducing the interfacial friction of proximal surfaces.

Figure 13:
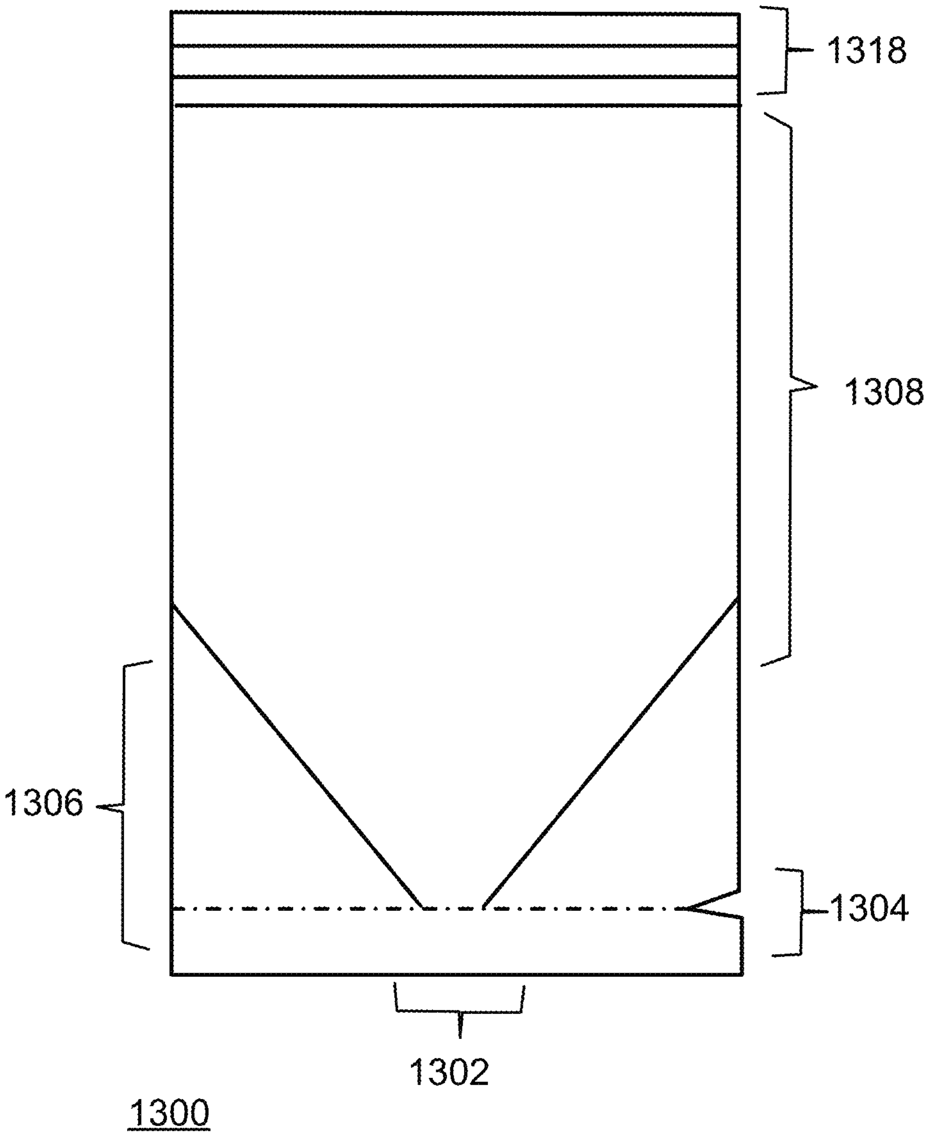
FIG. 13 depicts an Example container 100 suitable to contain a liquid dispersion composition disclosed herein.

In some implementations, the container has features that facilitate the use of the liquid dispersion composition contained within. FIG. 13 shows example features of a non-limiting example container 1300. In some implementations, the container has at least one of a nozzle 1302, tear notch 1304, tapered region 1306, concentrate chamber 1308, and a ridged region 1310. In some implementations, the container comprises a nozzle 1302. The nozzle 1302 can be located on any perimeter section of the container. In some implementations, the nozzle 1302 is a formed shaped nozzle opening at one end such that the composition undergoes shear mixing when the contents are expressed. In some implementations, an edge or a corner of a container can be cut in such a way to form the nozzle. In some implementations, the container comprises a tear notch 1304 to facilitate opening the container. In some implementations, the container comprises a tapered region 1306 to facilitate mixing of the contents. In some implementations, the container comprises one or more concentrate chambers 1308. In some implementations, the concentrate chambers are arranged such that the contents undergo mixing upon expressing the contents. In some implementations, the container comprises a ridged region 1310 that facilitates a grip to accommodate handling during expression of the contents.

In some implementations, the container comprises a gusset or a pleat at one end to form a self-supporting configuration that allows the container to stand in an upright position. In some implementations, the container comprises a resealable feature to preserve unused contents of the container.

Also provided herein is a method of preparing a water dispersible lubricant concentrate comprising placing a liquid dispersion composition disclosed herein within a container.

Also provided herein is a method of preparing a lubricant comprising:

providing a container comprising a liquid dispersion composition disclosed herein; and mixing the liquid dispersion composition with water.

In some implementations, the method includes filling a suitable vessel with about 0.2 liters to about 10 gallons of water, e.g., about 2 gallons of water. In some implementations, the method includes filling a suitable vessel with about 1 to about 10 gallons of water, e.g., about 4 gallons of water. In some implementations, the method further comprises opening the container, expressing the liquid dispersion composition into the water, and stirring to form a homogenous solution. In some implementations, the method can be modified to accommodate a specific quantity of water or installation application. In some implementations, the method comprises placing the container between an open slotted region of a slotted implement, and moving the slotted implement toward the nozzle to facilitate expression and subsequent mixing of the contents.

The present disclosure also includes kits useful, for example, in the formation of a lubricant, which include one or more containers comprising a liquid dispersion composition described herein. Instructions, either as inserts or labels, indicating quantities of the components, guidelines for mixing the components, and/or guidelines for forming the lubricant can also be included in the kit. In some implementations, the kit optionally comprises a stirring implement. In some implementation, the kit optionally comprises a slotted implement that is suitable to facilitate expression and subsequent mixing of the contents. In some implementations, the slotted implement is at least the width of the container. In some implementations, the kit comprises at least one of the instructions, the stirring implement, and the slotted implement.

In some implementations, the lubricant is useful for lubrication of telecommunication, data, or power cables, for example, during installation by pneumatic (air-assisted) or mechanical (pulling or pushing) means within microduct, innerduct, and conduit structures. In some implementations, the liquid dispersion composition dispersed in water as a lubricous material is IEEE 1210-compatible with various telecommunication, data, and power cable jacketing compounds. In some implementations, the liquid dispersion composition dispersed in water as a lubricous material is ICEA-S-93-compatible with various LSZH cable jacketing compounds. In some implementations, the kit reduces the need to transport large volumes of liquid lubricants to an installation site, allowing field technicians to make the necessary lubricant quantities using site-sourced water. Furthermore, the degree of lubricity and the viscosity of the lubricant can be adjusted by controlling the quantity of the composition incorporated into the water to accommodate a range of installation requirements, allowing the user to adjust the lubricant formed from the composition to achieve desired physical properties.

The present disclosure also includes kits useful, for example, in the formation of an absorbent material. For example, a kit including the liquid dispersion composition in a container (e.g., a spray bottle).

The liquid dispersion compositions and absorbent coatings described herein can have many different applications. Non-limiting examples of these applications are included herein.

In some implementations, the liquid dispersion compositions are used for sensors and methods for determining water ingress or exposure. For example, liquid dispersion compositions disclosed herein can be arranged or applied to essentially form an antenna wherein the composition is applied as a coating such that a transmitted signal at a specific frequency is received based on a given length, geometry or other arrangement of the applied coating, essentially creating an RFID tag. Once the arranged coating absorbs moisture or water, the antenna no longer receives or absorbs the transmitted signal because of the swelling phenomenon. In this manner, ingress can be detected in sealed or closed areas that are not accessible for visual inspection. In some implementations, the compositions can be formulated to have conductivity or capacitance attributes. These attributes can be monitored and measured to detect a change upon exposure to moisture or aqueous liquids.

In some implementations, the liquid dispersion compositions are used for phase change thermal management. In some implementations, the unique physical characteristics of the hydrocolloid gel formed by the granular SAP powder in conjunction with the oil-in-water emulsion formed by the surface active agents and other identified functional additives, have both aqueous and hydrocarbon thermal characteristics. Therefore, a single composition can have plurality of thermal properties to emulate complex multicomponent mixtures or packing to achieve prolonged thermal protection in food shipment, medical supply shipment, and other temperature-sensitive shipping applications. In some implementations, the liquid dispersion compositions can be tailored to achieve desired thermal phase transition ranges. These compositions can have single or cascading phase change properties associated with a multiphase, stable composition.

In some implementations, the liquid dispersion compositions are useful for environmental remediation applications. For example, environmental remediation applications wherein nascent (free or excess) water constitutes a significant component of waste streams like sludges, sediments, drilling muds, mine tailings, wet CCR residuals, waste water slurries, and other related remediation candidates. In some implementations, the liquid dispersion compositions are used for environmental waste remediation for ash ponds, or similar remediation sites.

In some implementations, the composition suitable for environmental remediation applications comprises a granular acrylate-based superabsorbent polymer (SAP) dispersed with a suitable surface active agent (e.g., surfactant) in a liquid medium comprising glycol, wherein the total solids content ranges from about 20 weight percent to about 70 weight percent. Liquid dispersion compositions when exposed to environmental water can provide an efficient absorption of the nascent (excess or free) water associated with waste remediation sites. In some implementations, the liquid dispersion compositions can absorb up to about 400 grams of pure water per gram of composition. The water absorption per gram of the liquid granular SAP dispersion composition, which can depend on the liquid medium and surfactant selected to disperse the granular SAP, can absorb a prescribed amount of nascent (excess or free) water at a prescribed addition (or dosing) rate. In some implementations, the composition can effectively mitigate free water at about 0.2 to about 2 weight percent (prescribed) addition rate range in a surrogate environmental soil mixture made with organic topsoil containing nascent (free or excess) water content.

In some implementations, the liquid dispersion composition has minimal environmental impact. In some implementations, the liquid dispersion composition has a German Landfill Ordinance Deponieverordnung-DepV (DepV) classification of Deponieklasse 0 (DK 0). DKO is the most-favorable landfill classification (i.e., satisfies German Class 0 landfill allocation criteria). In some implementations, the liquid medium has a low viscosity that allows high loading with granular SAPs, is compatible with suitable (e.g., high HLB) surfactants, and can have low environmental impact. In some implementations, liquid dispersion compositions comprising propylene glycol have rheological flow properties that are compatible with existing broadcast liquid application techniques and other large area delivery methods for absorption of nascent water as liquid dispersion compositions overcome existing dry granular use barriers like dust cloud formation.

In some implementations, the liquid dispersion composition is suitable for use as a pre-treatment for environmental remediation applications whereby a subsequent treatment with existing solidifiers known in the art (e.g., pozzolanic and/or cementitious materials) can be implemented to improve chemical, physical, or mechanical stability. For example, the liquid dispersion composition can be suitable for use as a pre-treatment for environmental remediation applications when the SAP-based water swelled gel strength alone is not adequate for acceptance of a treated waste stream at a particular solid waste designated landfill.

In some implementations, the liquid dispersion composition is evaluated by a standard US EPA test such as the Paint Filter Liquids Test SW-846 test method 9095B. The paint filter liquids test methodology can be used as an initial screening measurement of the composition's efficacy and efficiency for transportation to a compliant landfill for disposal. For liquid dispersion compositions at various addition amounts (dosage) mixed with water-wet soil samples, the SW-846 Test Method 9095B: Paint Filter Liquids Test methodology can be used to determine if the mixed sample contains any remaining free (excess) liquid.

In some implementations, a predetermined amount of material is placed in a paint filter. If any portion of the material passes through and drops from the filter within the 5-minute test duration time period, the material is deemed to contain free liquid. This test methodology can be used to establish the addition amount (additive or dosage level) of the liquid dispersion compositions needed to absorb nascent liquid from water-wet laboratory soil samples.

The US EPA 9095B Paint Filter Liquids Test method was promulgated to be used to detect the presence of free liquids in a representative sample of waste to determine compliance with 40 CFR 264.314 and 265.314. The 9095B method is an SW-846 Method-Defined Parameter (MDP), meaning that it may not be modified when used for Resource Conservation and Recovery Act (RCRA) testing governing waste management.

In some implementations, oil—oil miscibility with the liquid dispersion composition and the spilled non aqueous material, such as diesel or fuel oil, and subsequent water addition could self-emulsify the spilled oil into a stable gel suitable for collection and prevent surface migration.

In some implementations, the liquid dispersion compositions are applied to a substrate to form self-lubricating films and coatings that can be activated by adding or applying aqueous solutions to activate the liquid dispersion composition on coated substrates, such as tapes, yarns, films, non wovens, fabrics, and other substrates that are continuous or non-continuous such filaments, fibers, particulates.

In some implementations, the liquid dispersion compositions are applied to yarns to prepare water blocking yarns.

In some implementations, the liquid dispersion compositions are used for water-swellable ink, paint, or coatings for security applications including fire retardants. In some implementations, silicon-based liquid dispersion compositions are used for these applications.

In some implementations, the liquid dispersion compositions are used for water-swellable tapes.

In some implementations, packets or pods (e.g., PVA packets or pods) comprising non-aqueous liquid dispersion compositions can be useful to create a self-contained gel when mixed with an aqueous solution. For example, for gel packs, slosh control, or other gelation of free water applications.

In some implementations, the liquid dispersion compositions are used as fragrance additives.

In some implementations, the liquid dispersion compositions are used for controlled delivery of functional oils such as fragrances, insect control, or other pest management as a time release composition. In some implementations, the liquid dispersion composition can be phase inverted to liberate functional additives when exposed to water-based liquids. This feature can have applications to mitigate and/or signal foul odors associated with exudates or transudates (i.e., bodily fluids). For example, when the liquid dispersion composition is coated on a puppy pad, gelation and fragrance release can result upon exposure to urine. In some implementations, the liquid dispersion composition can mitigate the vapor pressure and migration of the functional additives, such that a controlled release is achieved.

In some implementations, the liquid dispersion compositions are used as a sprayable gel. For example, a container comprises a liquid dispersion composition disclosed herein wherein the container is equipped with an aspirator. As such, a water stream and the liquid dispersion composition can be mixed to instantly form a sprayable water-based gel. These compositions can have high adhesion and cling to vertical surfaces. In some implementations, the surface active agent can include EPA compliant surfactant and adjuvants.

In some implementations, the liquid dispersion compositions are used as a sprayable antifreeze composition for agricultural applications, turf, ornamental or other arbor applications. In some implementations, the liquid dispersion compositions are suitable for EPA and environmental compliant requirements.

In some implementations, the liquid dispersion compositions are used for flood control materials (e.g., flood barriers).

In some implementations, the liquid dispersion compositions are used for applications related to drilling oil and gas collection as a drilling fluid. In some implementations, the liquid dispersion compositions are used in mining applications, such as lubricity for drilling. In some implementations, the liquid dispersion compositions are used for spoils from tunneling or drilling.

In some implementations, the liquid dispersion compositions are used for processing aids or as a lubricant for cables. In some implementations, the liquid dispersion compositions are used as an environmentally compliant grease or lubricant suitable for green applications and outdoor environments for commercial, recreational, or other industrial applications where frictional forces are problematic (for example, conveyers, slides, transfer surface and tubes).

In some implementations, the liquid dispersion compositions are used for a surface water blocking coating for strand-filled cables. In some implementations, the liquid dispersion compositions are used for Strandfill (i.e., a substance applied between conductor layers) compound additives.

In some implementations, the liquid dispersion compositions are used in industrial and commercial applications for water mitigation/absorption or moisture retention. The absorbent coatings can be incorporated into other structures such as laminates, composites, or other assemblies. For example, an absorptive liner or coating on the interior of a trash bag or industrial waste receptacle liner. In some implementations, the liquid dispersion compositions are used in consumer kitchen materials such as trash bags. In some implementations, the liquid dispersion compositions are used in industrial trash bags or related materials (e.g., for restaurants, stadiums, airlines). In some implementations, the liquid dispersion compositions are used in industrial applications such as concrete curing blankets. In some implementations, the liquid dispersion compositions are used in medical applications as a moisture mitigation barrier (e.g., in wound dressing applications).

In some implementations, the liquid dispersion compositions are used in litter materials for animals (e.g., puppy pads, litter boxes, bedding materials for farm animals). In some implementations, the liquid dispersion compositions are used for liners for animal stalls.

In some implementations, the liquid dispersion compositions are used for medical materials. In some implementations, the liquid dispersion compositions are used for medical trays. In some implementations, the liquid dispersion compositions are used for medical fluids or waste materials (e.g., hospital waste bags, red bag waste, solidification of solid fluids). In some implementations, the liquid dispersion compositions are used for medical devices (e.g., negative wound pressure). In some implementations, the liquid dispersion compositions are used for wound care (e.g., bandages). In some implementations, the liquid dispersion compositions are used for spray bottles for bedpans. In some implementations, the liquid dispersion compositions are used for gurney pads, medical liners, or bed materials. In some implementations, the liquid dispersion compositions are used for medical drapes. In some implementations, the liquid dispersion compositions are used for ostomy bags. In some implementations, the liquid dispersion compositions are used for pretreated exudate canisters. In some implementations, the liquid dispersion compositions are used for pretreated bedpans. In some implementations, the liquid dispersion compositions are useful for biohazard boxes (e.g., for used syringes).

In some implementations, the liquid dispersion compositions are used for incontinence materials (e.g., diapers). In some implementations, the liquid dispersion compositions are used for baby diapers.

In some implementations, the liquid dispersion compositions are used for sanitary napkins.

In some implementations, the liquid dispersion compositions are used for portable toilet materials (e.g., pretreated liners).

In some implementations, the liquid dispersion compositions are used as condensate collectors. For example, in fuel tanks or filters. In some implementations, the liquid dispersion compositions are used for water removal in underground fuel tanks (e.g., gas stations).

In some implementations, the liquid dispersion compositions are used for piping leak prevention.

In some implementations, the liquid dispersion compositions are used as liquid carriers or as a liquid extraction mechanism. For example, the liquid dispersion composition can be utilized to absorb liquid, transport the liquid, and then extract the liquid.

In some implementations, the liquid dispersion compositions are used as drying agent. For example, as a quick dry alternative on a baseball field. In some implementations the liquid dispersion compositions are used as a desiccant or a moisture scavenger.

In some implementations, the liquid dispersion compositions are used as a water retention agent for horticulture applications (e.g., liners for planting pots).

In some implementations, the liquid dispersion compositions are used as a concrete additive. In some implementations, the liquid dispersion composition can slow down the cure of the concrete to increase the compressive strength. In some implementations, the liquid dispersion compositions are used for capturing and polishing spoils from concrete for easy disposal (e.g., in industrial flooring). In some implementations, the liquid dispersion compositions are used for water swellable sealant for joining concrete sectionals.

In some implementations, the liquid dispersion compositions are used for apparel (e.g., odor control for athletic apparel).

In some implementations, the liquid dispersion compositions are used for waterproofing primer pretreatments for surfaces.

In some implementations, the liquid dispersion compositions are used for building materials. In some implementations, the liquid dispersion compositions are used for waterproofing membranes (e.g., for building envelope/roofing).

In some implementations, the liquid dispersion compositions are used for humidity control (e.g., in greenhouses).

As used herein, and unless otherwise specified, the term "about," when used in connection with a numeric value or range of values is to indicate that the value or range of values may deviate to an extent deemed reasonable to one of ordinary skill in the art. In general, the term "about" is used herein to modify a numerical value above and below the stated value by a variance of 5% unless otherwise specified. It is well known that instrument variation and other factors can affect the numerical values. The term "about" is to accommodate these variations.

EMBODIMENTS

Embodiment 1. A liquid dispersion composition comprising a granular superabsorbent polymer dispersed in a liquid medium, wherein:

- the granular superabsorbent polymer is present in the composition from about 0.1% to about 95% by weight; and
- the liquid medium comprises at least two liquid components, wherein at least one of the liquid components is insoluble with the other liquid components.

Embodiment 2. The liquid dispersion composition of embodiment 1, wherein the granular superabsorbent polymer comprises an acrylate polymer.

Embodiment 3. The liquid dispersion composition of embodiment 2, wherein the acrylate polymer is a homopolymer, copolymer, salt thereof, or mixture thereof.

Embodiment 4. The liquid dispersion composition of embodiment 2 or 3, wherein the acrylate polymer comprises a salt of acrylic acid, a salt of an acrylic acid acrylamide copolymer, or a combination thereof.

Embodiment 5. The liquid dispersion composition of embodiment 4, wherein the salt is a sodium salt, potassium salt, lithium salt, or ammonium salt.

Embodiment 6. The liquid dispersion composition of any one of embodiments 2-5, wherein the acrylate polymer comprises sodium polyacrylate, a sodium acrylate acrylamide copolymer, or a combination thereof.

Embodiment 7. The liquid dispersion composition of any one of embodiments 2-6, wherein the acrylate polymer includes one or more functional groups selected from carboxylic acids, acrylamides, sulfonates, metal salts or combinations thereof.

Embodiment 8. The liquid dispersion composition of any one of embodiments 2-7, wherein the acrylate polymer has a formula of

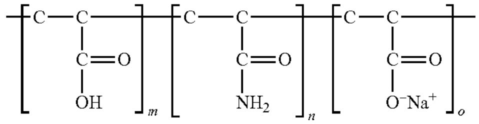

wherein m is a mole fraction of the carboxylic acid, n is a mole fraction of the acrylamide, and n is the mole fraction of the metal salt, whereby the sum of m, n, and o is 100%.

Embodiment 9. The liquid dispersion composition of any one of embodiment 1-8, wherein the granular superabsorbent polymer has a maximum particle diameter in a range of about 0.5 microns to about 1,000 microns, about 5 microns to about 250 microns, or about 10 microns to about 250 microns.

Embodiment 10. The liquid dispersion composition of any one of embodiments 1-9, wherein the granular superabsorbent polymer has a particle surface area in the range of about 0.05 $m^2/g$ to about 1000 $m^2/g$, about 10 $m^2/g$ to about 800 $m^2/g$, or about 400 $m^2/g$ to about 600 $m^2/g$.

Embodiment 11. The liquid dispersion composition of any one of embodiment 1-10, wherein the granular superabsorbent polymer has a particle fractal dimension ($D_f$) in a range of from 1 to 3.

Embodiment 12. The liquid dispersion composition of any one of embodiments 1-11, wherein the granular superabsorbent polymer has a $D_v(50)$ particle size in a range of about 1 micron to about 800 microns, about 1 microns to about 500 microns, about 5 microns to about 250 microns, about 5 microns to about 100 microns, or about 5 microns to about 60 microns.

Embodiment 13. The liquid dispersion composition of any one of embodiments 1-12, wherein the granular superabsorbent polymer has a $D_v(10)$ of about 1 to about 35 microns, a $D_v(50)$ of about 5 to about 60 microns, and a $D_v(90)$ of about 30 to about 300 microns.

Embodiment 14. The liquid dispersion composition of any one of embodiments 1-13, wherein the granular superabsorbent polymer has a $D_v(90)$ to $D_v(10)$ ratio in a range of from 1 to 50, or from 3 to 20.

Embodiment 15. The liquid dispersion composition of any one of embodiments 1-14, wherein the granular superabsorbent polymer is prepared by a solution polymerization process or an emulsion polymerization process.

Embodiment 16. The liquid dispersion composition of any one of embodiments 1-15, wherein the at least two liquid components each have a viscosity in a range of about 1 cP to about 100,000 cP at 23° C., about 5 cP to about 10,000 cP at 23° C., about 10 cP to about 1,000 cP at 23° C., or about 25 cP to about 800 cP at 23° C.

Embodiment 17. The liquid dispersion composition of any one of embodiment 1-16, wherein the insolubility of the at least one liquid component with the other liquid components is determined by Hansen solubility parameters, wherein the relative energy difference (RED) of the at least one liquid component and the other liquid components is equal to or greater than 1.

Embodiment 18. The liquid dispersion composition of embodiment 17 wherein the RED of the at least one liquid component and the other liquid components is greater than 1.

Embodiment 19. The liquid dispersion composition of any one of embodiment 1-18, wherein the liquid medium comprises a first liquid component and a second liquid component.

Embodiment 20. The liquid dispersion composition of embodiment 19, wherein the first liquid component is non-polar and the second liquid component is polar.

Embodiment 21. The liquid dispersion composition of embodiment 19 or 20, wherein the first liquid component comprises a silicon-containing liquid, a hydrocarbon liquid, or a fluorocarbon liquid.

Embodiment 22. The liquid dispersion composition of embodiment 21, wherein the silicon-containing liquid comprises a silicone, organo-silicone, silane, siloxane, or organosilane.

Embodiment 23. The liquid dispersion composition of any one of embodiments 19-22, wherein the first liquid component comprises polydimethylsiloxane.

Embodiment 24. The liquid dispersion composition of any one of embodiments 19-23, wherein the first liquid component has a viscosity in a range of about 10 cP to about 100,000 cP, or about 400 cP to about 600 cP, at 23° C.

Embodiment 25. The liquid dispersion composition of any one of embodiments 19-24, wherein the first liquid component has a viscosity in a range of about 10 cP to about 100,000 cP at 100° C.

Embodiment 26. The liquid dispersion composition of embodiment 21, wherein the hydrocarbon liquid comprises functionality selected from a sulfur-containing group, nitrogen-containing group, oxygen-containing group, halogenated functional group, alkane, alkene, alkyne, a metal salt, or a combination thereof.

Embodiment 27. The liquid dispersion composition of embodiment 21 or 26, wherein the hydrocarbon liquid is paraffinic oil or polyisobutene.

Embodiment 28. The liquid dispersion composition of embodiment 27, wherein the paraffinic oil comprises light paraffin oil, mineral oil, light mineral oil, sulfonated mineral oil, or combinations thereof.

Embodiment 29. The liquid dispersion composition of embodiment 27 or 28, wherein the paraffinic oil comprises a mixture of paraffinic oils having viscosities in a range of about 10 cP to about 750 cP at 23° C.

Embodiment 30. The liquid dispersion composition of any one of embodiments 19-29, wherein the second liquid component comprises a surface active agent, a polyol, an ester, an alkylene glycol, water, an alcohol, or a combination thereof.

Embodiment 31. The liquid dispersion composition of any one of embodiments 19-30, wherein the second liquid component comprises water.

Embodiment 32. The liquid dispersion composition of any one of embodiments 19-31, wherein the second liquid component comprises a polyol.

Embodiment 33. The liquid dispersion composition of any one of embodiments 19-32, wherein the second liquid component comprises propylene glycol.

Embodiment 34. The liquid dispersion composition of any one of embodiments 19-33, wherein the second liquid component comprises water and propylene glycol.

Embodiment 35. The liquid dispersion composition of any one of embodiments 1-34, wherein the liquid dispersion composition comprises one or more surface active agents.

Embodiment 36. The liquid dispersion composition of any one of embodiments 19-35, wherein the second liquid component comprises a surface active agent.

Embodiment 37. The liquid dispersion composition of any one of embodiments 19-36, comprising at least one surface active agent that is different from the first liquid component and the second liquid component.

Embodiment 38. The liquid dispersion composition of any one of embodiments 19-37, wherein at least one surface active agent is insoluble with at least one of the first liquid component and the second liquid component.

Embodiment 39. The liquid dispersion composition of any one of embodiments 35-38, wherein the one or more surface active agents are selected from a nonionic surfactant, an ionic surfactant, an amphoteric surfactant, a zwitterion base surfactant, or a combination thereof.

Embodiment 40. The liquid dispersion composition of any one of embodiments 35-39, wherein the one or more surface active agents each have a melting point below 100° C.

Embodiment 41. The liquid dispersion composition of any one of embodiments 35-40, wherein the one or more surface active agents comprise a nonionic surfactant.

Embodiment 42. The liquid dispersion composition of any one of embodiments 35-41, wherein the one or more surface active agents comprise a fatty acid ester of polyethoxy sorbitan, a polyethylene alkyl phenyl ether, or a combination thereof.

Embodiment 43. The liquid dispersion composition of any one of embodiments 35-42, wherein at least one of the one or more surface active agents is a polysorbate.

Embodiment 44. The liquid dispersion composition of any one of embodiments 35-43, wherein the one or more surface active agents comprise polysorbate 80, polysorbate 20, or a combination thereof.

Embodiment 45. The liquid dispersion composition of any one of embodiments 35-43, wherein the one or more surface active agents comprise (x)-sorbitan mono-9-octadecenoate poly(oxy-1,2-ethanediyl), trimethylpentan-2-yl) phenoxy]ethanol, or a combination thereof.

Embodiment 46. The liquid dispersion composition of any one of embodiments 35-42, wherein the one or more surface active agents are selected from PEG-8 oleate, polyglyceryl-3-methylglucose distearate, oleth-10, oleth-10/polyoxyl 10 oleyl ether NF, ceteth-10, PEG-8 laurate, cocamide MEA, polysorbate 60 NF, polysorbate 60, polysorbate 80 NF, polysorbate 80, isosteareth-20, PEG-60 almond glycerides, PEG-20 methyl glucose sesquistearate, ceteareth-20, oleth-20, steareth-20, steareth-21, ceteth-20, isoceteth-20, polysorbate 20, or a combination thereof.

Embodiment 47. The liquid dispersion composition of any one of embodiments 35-46, wherein the one or more surface active agents comprise an ionic surfactant.

Embodiment 48. The liquid dispersion composition of any one of embodiments 35-47, wherein the one or more surface active agents each have a critical micelle concentration in the range of about 0.001 mM to about 1 mM in pure water.

Embodiment 49. The liquid dispersion composition of any one of embodiments 35-48, wherein the one or more surface active agents each have an HLB value in a range of about 10 to about 18, about 12 to 18, or about 13 to about 16.

Embodiment 50. The liquid dispersion composition of any one of embodiments 1-49, further comprising one or more additives.

Embodiment 51. The liquid dispersion composition of embodiment 50, wherein the one or more additives are selected from metal oxides, metals, composites, a thermally or electrically conductive material, a wax, a thermoset or thermomelt polymer, adhesive, sealant, film former, plasticizer, resin, oil, acrylate, urethane, cleaner, buffer, fragrance, biocide, fertilizer, anticorrosive, human or animal therapeutics, topicals, a swelling clay, or a combination thereof.

Embodiment 52. The liquid dispersion composition of embodiment 50 or 51, wherein the one or more additives each have a $D_v(50)$ particle size in a range of about 1 micron to about 800 microns and a particle fractal dimension ($D_f$) in a range of 1 to 3.

Embodiment 53. The liquid dispersion composition of embodiment 51, wherein the metal oxides comprise silica, alumina, titania, ceria, zirconia, iron oxide, or a combination thereof.

Embodiment 54. The liquid dispersion composition of any one of embodiments 50-53, wherein the one or more additives comprise colloidal, precipitated, or fumed silica.

Embodiment 55. The liquid dispersion composition of any one of embodiments 50-54, wherein the one or more additives comprise precipitated silica.

Embodiment 56. The liquid dispersion composition of embodiment 51, wherein the thermally or electrically conductive material comprises indium tin oxide, boron nitride, carbon black, aluminum nitride, silicon nitride, or a combination thereof.

Embodiment 57. The liquid dispersion composition of embodiment 51, wherein the thermoset or thermomelt polymer comprises polypropylene, polyurethane, polyamide, polyester, polycarbonate, polyacrylate, polyethylene, polyacrylamide, polyimide, copolymers thereof, or a combination thereof.

Embodiment 58. The liquid dispersion composition of embodiment 51, wherein the oil comprises linseed oil.

Embodiment 59. The liquid dispersion composition of embodiment 51, wherein the film former is a water-soluble film former.

Embodiment 60. The liquid dispersion composition of embodiment 59, wherein the water-soluble film former comprises cellulose, alginate, gum, pectin, polyvinyl alcohol, or a combination thereof.

Embodiment 61. The liquid dispersion composition of embodiment 51, wherein the swelling clay comprises bentonite.

Embodiment 62. The liquid dispersion composition of any one of embodiments 50-61, wherein the one or more additives comprise polyethylene glycol.

Embodiment 63. The liquid dispersion composition of any one of embodiments 50-62, wherein the one or more additives comprise PEG-200, PEG-300, PEG-400, PEG-600, or a combination thereof.

Embodiment 64. The liquid dispersion composition of any one of embodiments 1-63, wherein the liquid dispersion composition forms an absorbent gel upon exposure to water.

Embodiment 65. The liquid dispersion composition of embodiment 64, wherein the liquid dispersion composition forms a self-supporting absorbent gel within about 30 seconds of exposure to the water.

Embodiment 66. The liquid dispersion composition of any one of embodiments 1-65, wherein the liquid dispersion composition forms an absorbent film within about 30 seconds of exposure to water.

Embodiment 67. The liquid dispersion composition of any one of embodiments 1-66, wherein the liquid dispersion composition has a water absorption capacity of at least about 10 grams of water per gram of liquid dispersion composition, at least about 20 grams of water per gram of liquid dispersion composition, or at least about 50 grams of water per gram of liquid dispersion composition.

Embodiment 68. The liquid dispersion composition of any one of embodiments 1-67, wherein the liquid dispersion composition has a water absorption capacity of at least about 100 grams of water per gram of liquid dispersion composition, at least about 200 grams of water per gram of liquid dispersion composition, at least about 300 grams of water per gram of liquid dispersion composition, or at least about 350 grams of water per gram of liquid dispersion composition.

Embodiment 69. The liquid dispersion composition of any one of embodiments 1-68, wherein the liquid dispersion composition forms an oil-in-oil emulsion, suspension, oil-in-water emulsion, water-in-oil emulsion, or a combination thereof.

Embodiment 70. The liquid dispersion composition of embodiment 69, wherein the liquid dispersion composition forms a multiphase emulsion.

Embodiment 71. The liquid dispersion composition of any one of embodiments 1-70, wherein the granular superabsorbent polymer is present in the composition from about 0.1% to about 80% by weight, about 0.1% to about 10% by weight, about 1% to about 75% by weight, about 30% to about 70% by weight, about 40% to about 65% by weight, or about 40% to about 50% by weight.

Embodiment 72. The liquid dispersion composition of any one of embodiments 19-71, wherein the first liquid component is present in the composition from about 0.1% to about 99% by weight, about 1% to about 99% by weight, about 1% to about 10% by weight, about 10% to about 80% by weight, about 20% to about 60% by weight, about 25% to about 45% by weight, or about 50% to about 60% by weight.

Embodiment 73. The liquid dispersion composition of any one of embodiments 19-72, wherein the second liquid component is present in the composition from about 0.1% to about 99% by weight, about 1% to about 99% by weight, about 5% to about 99% by weight, about 75% to about 99% by weight, about 0.1% to about 10% by weight, or about 0.5% to about 5% by weight.

Embodiment 74. The liquid dispersion composition of any one of embodiments 19-73, wherein the second liquid component is present in the composition from about 50% to about 99% by weight.

Embodiment 75. The liquid dispersion composition of any one of embodiments 37-74, wherein the at least one surface active agent that is different from the first liquid component or the second liquid component is present in the composition from about 0.01% to about 50% by weight, about 0.1% to about 10% by weight, about 0.1% to about 5% by weight, or about 0.5% to about 2% by weight.

Embodiment 76. The liquid dispersion composition of any one of embodiments 50-75, wherein the one or more additives are present in the composition from about 0.01% to about 50% by weight.

Embodiment 77. The liquid dispersion composition of any one of embodiments 51-76, wherein the film former is present in the composition from about 0.01% to about 30% by weight.

Embodiment 78. The liquid dispersion composition of any one of embodiments 19-77, comprising:

about 5 wt. % to about 99 wt. % of the first liquid component; and about 1 wt. % to about 99 wt. % of the second liquid component.

Embodiment 79. The liquid dispersion composition of any one of embodiments 37-78, further comprising about 0.01 wt. % to about 50 wt. % of the at least one surface active agent that is different from the first liquid component or the second liquid component.

Embodiment 80. The composition of any one of embodiments 50-79, further comprising about 0.01 wt. % to about 50 wt. % of the one or more additives.

Embodiment 81. The liquid dispersion composition of any one of embodiments 19-80, comprising:

about 30 wt. % to about 95 wt. % of the granular superabsorbent polymer;

about 20 wt. % to about 60 wt. % of the first liquid component, wherein the first liquid component comprises a hydrocarbon liquid; and about 0.1 wt. % to about 10 wt. % of the second liquid, wherein the second liquid component comprises a surface active agent.

Embodiment 82. The liquid dispersion composition of embodiment 81, further comprising about 0.1% to about 10 wt. % of the at least one surface active agent that is different from the first liquid component or the second liquid component.

Embodiment 83. The liquid dispersion composition of any one of embodiments 37-82, comprising:

about 0.1 wt. % to about 25 wt. % of the granular superabsorbent polymer;

about 1 wt. % to about 10 wt. % of the first liquid component, wherein the first liquid component comprises a silicon-containing liquid;

about 75 wt. % to about 99 wt. % of the second liquid, wherein the second liquid component comprises water; and about 0.1 wt. % to about 5 wt. % of the at least one surface active agent that is different from the first liquid component or the second liquid component.

Embodiment 84. The liquid dispersion composition of embodiment 83, further comprising about 0.01 wt. % to about 10 wt. % of the one or more additives.

Embodiment 85. The liquid dispersion composition of any one of embodiments 19-84, comprising:

about 0.1 wt. % to about 80 wt. % of the granular superabsorbent polymer;

about 1 wt. % to about 99 wt. % of the first liquid component, wherein the first liquid component comprises a nonpolar liquid component;

about 5 wt. % to about 99 wt. % of the second liquid component, wherein the second liquid component comprises a polar liquid component;

about 0.01 wt. % to about 50 wt. % of the at least one surface active agent that is different from the first liquid component or the second liquid component.

Embodiment 86. The liquid dispersion composition of embodiment 85, further comprising about 0.01 wt. % to about 50 wt. % of the one or more additives.

Embodiment 87. The liquid dispersion composition of embodiment 85 or 86, further comprising from about 0.01 wt. % to about 30 wt. % of one or more film formers.

Embodiment 88. The liquid dispersion composition of any one of embodiments 85-87, comprising:

about 5 wt. % to about 80 wt. % of the granular superabsorbent polymer, wherein the granular superabsorbent polymer comprises an acrylate polymer;

about 0.01 wt. % to about 1.0 wt. % of the first liquid component;

about 0.5 wt. % to about 90 wt. % of the second liquid component, wherein the second liquid component comprises a polyol; and about 0.2 wt. % to about 20 wt. % of the at least one surface active agent that is different from the first liquid component or the second liquid component.

Embodiment 89. The liquid dispersion composition of any one of embodiments 85-88, comprising about 10 wt. % to about 80 wt. %, about 25 wt. % to about 75 wt. %, about 50 wt. % to about 75 wt. %, about 55 wt. % to about 70 wt. %, or about 60 wt. % to about 66 wt. % of the granular superabsorbent polymer.

Embodiment 90. The liquid dispersion composition of any one of embodiments 85-89, comprising about 58 wt. %, about 60 wt. %, about 63 wt. %, or about 65 wt. % of the granular superabsorbent polymer.

Embodiment 91. The liquid dispersion composition of any one of embodiments 85-90, comprising from about 0.2 wt. % to about 15 wt. %, about 0.2 wt. % to about 10 wt. %, about 0.2 wt. % to about 5 wt. %, about 0.5 wt. % to about 3 wt. %, about 0.5 wt. % to about 1.5 wt. %, or about 0.8 wt. % to about 1.0 wt. % of the at least one surface active agent.

Embodiment 92. The liquid dispersion composition of any one of embodiments 85-91, wherein the at least one surface active agent comprises a non-ionic surfactant.

Embodiment 93. The liquid dispersion composition of any one of embodiment 85-92, wherein the at least one surface active agent comprises a polysorbate.

Embodiment 94. The liquid dispersion composition of any one of embodiments 85-93, wherein the at least one surface active agent comprises (x)-sorbitan mono-9-octadecenoate poly(oxy-1,2-ethanediyl).

Embodiment 95. The liquid dispersion composition of any one of embodiments 85-94, wherein the first liquid component comprises a hydrocarbon liquid, a silicon-containing liquid, or a combination thereof.

Embodiment 96. The liquid dispersion composition of embodiment 95, wherein the hydrocarbon liquid comprises a paraffinic oil.

Embodiment 97. The liquid dispersion composition of embodiment 95, wherein the silicon-containing liquid comprises silicone oil.

Embodiment 98. The liquid dispersion composition of any one of embodiments 85-97, comprising from about 0.1 wt. % to about 10 wt. %, about 0.1 wt. % to about 5 wt. %, or about 0.1 wt. % to about 1 wt. % of the first liquid component.

Embodiment 99. The liquid dispersion composition of any one of embodiments 85-98, wherein the second liquid comprises propylene glycol.

Embodiment 100. The liquid dispersion composition of any one of embodiments 85-99, comprising from about 1 wt. % to about 80 wt. %, about 10 wt. % to about 70 wt. %, about 20 wt. % to about 60 wt. %, about 25 wt. % to about 50 wt. %, about 25 wt. % to about 45 wt. %, or about 32 wt. % to about 40 wt. % of the second liquid component.

Embodiment 101. The liquid dispersion composition of any one of embodiments 85-100, further comprising from 0.1 wt. % to about 10 wt. % of one or more additives.

Embodiment 102. The liquid dispersion composition of embodiment 86 or 101, wherein the one or more additives comprise silica, bentonite, a film former, or a combination thereof.

Embodiment 103. The liquid dispersion composition of any one of embodiments 85-102, comprising:

about 60 wt. % to about 66 wt. % of the granular superabsorbent polymer;

about 0.1 wt. % to about 1.0 wt. % of a hydrocarbon liquid or a silicon-containing liquid;

about 32 wt. % to about 40 wt. % propylene glycol; and about 0.8 wt. % to about 1.0 wt. % of the surface active agent.

Embodiment 104. The liquid composition of embodiment 103, further comprising from about 0.1 wt. % to about 5 wt. % of one or more additives.

Embodiment 105. The liquid dispersion composition of any one of embodiments 19-77, comprising:

about 30 wt. % to about 90 wt. % of the granular superabsorbent polymer;

about 10 wt. % to about 60 wt. % of the first liquid component, wherein the first liquid component comprises a nonpolar liquid component;

about 1 wt. % to about 30 wt. % of the second liquid component, wherein the second liquid component comprises a surface active agent.

Embodiment 106. The liquid dispersion composition of embodiment 105, comprising about 40 wt. % to about 80 wt. %, about 50 wt. % to about 70 wt. %, about 55 wt. % to about 65 wt. %, or about 59 wt. % of the granular superabsorbent polymer.

Embodiment 107. The liquid dispersion composition of embodiment 105 or 106, comprising about 15 wt. % to about 55 wt. %, about 20 wt. % to about 50 wt. %, or about 25 wt. % to about 40 wt. % of the first liquid component.

Embodiment 108. The liquid dispersion composition of any one of embodiments 105-107, wherein the first liquid component comprises a paraffinic oil.

Embodiment 109. The liquid dispersion composition of any one of embodiments 105-108, comprising about 1 wt. % to about 20 wt. %, about 1 wt. % to about 10 wt. %, or about 1 wt. % to about 5 wt. % of the second liquid component.

Embodiment 110. The liquid dispersion composition of any one of embodiments 105-109, wherein the surface active agent is a polysorbate.

Embodiment 111. The liquid dispersion composition of any one of embodiments 105-110, further comprising about 0.01 wt. % to about 50 wt. %, about 0.1 wt. % to about 25 wt. %, or about 0.1 wt. % to about 10 wt. % of one or more additives.

Embodiment 112. The liquid dispersion composition of embodiment 111, wherein the one or more additives comprise polyethylene glycol, silica, or a combination thereof.

Embodiment 113. The liquid dispersion composition of any one of embodiments 1-112, wherein the composition has a total solids content from about 20 wt. % to about 70 wt. %.

Embodiment 114. The liquid dispersion composition of any one of embodiment 1-113, wherein the composition has a total dissolved solids amount of less than about 400 mg/L.

Embodiment 115. The liquid dispersion composition of any one of embodiments 1-114, wherein the composition has a German Landfill Ordinance Deponieverordnung-DepV (DepV) classification of Deponieklasse 0 (DK 0).

Embodiment 116. A liquid dispersion composition comprising:

about 5 wt. % to about 80 wt. % of a granular superabsorbent polymer, wherein the granular superabsorbent polymer comprises an acrylate polymer;

about 0.5 wt. % to about 90 wt. % of a polyol; and about 0.2 wt. % to about 20 wt. % of one or more surface active agents.

Embodiment 117. The liquid dispersion composition of embodiment 116, wherein the acrylate polymer is a homopolymer, copolymer, salt thereof, or mixture thereof.

Embodiment 118. The liquid dispersion composition of embodiment 116 or 117, wherein the acrylate polymer comprises a salt of acrylic acid, a salt of an acrylic acid acrylamide copolymer, or a combination thereof.

Embodiment 119. The liquid dispersion composition of embodiment 118, wherein the salt is a sodium salt, potassium salt, lithium salt, or ammonium salt.

Embodiment 120. The liquid dispersion composition of any one of embodiments 116-119, wherein the acrylate polymer comprises sodium polyacrylate, a sodium acrylate acrylamide copolymer, or a combination thereof.

Embodiment 121. The liquid dispersion composition of any one of embodiments 116-120, wherein the acrylate polymer includes one or more functional groups selected from carboxylic acids, acrylamides, sulfonates, metal salts or combinations thereof.

Embodiment 122. The liquid dispersion composition of any one of embodiments 116-121, wherein the acrylate polymer has a formula of

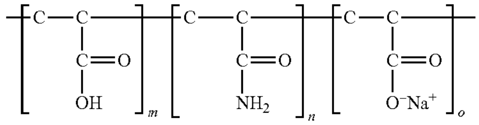

wherein m is a mole fraction of the carboxylic acid, n is a mole fraction of the acrylamide, and n is the mole fraction of the metal salt, whereby the sum of m, n, and o is 100%.

Embodiment 123. The liquid dispersion composition of any one of embodiments 116-122, further comprising a silicon-containing liquid, a hydrocarbon liquid, or a combination thereof.

Embodiment 124. The liquid dispersion composition of embodiment 123, wherein the silicon-containing liquid comprises a silicone, organo-silicone, silane, siloxane, or organosilane.

Embodiment 125. The liquid dispersion composition of embodiment 123 or 124, wherein the silicon-containing liquid comprises silicone oil.

Embodiment 126. The liquid dispersion composition of embodiment 123, wherein the hydrocarbon liquid comprises functionality selected from a sulfur-containing group, nitrogen-containing group, oxygen-containing group, halogenated functional group, alkane, alkene, alkyne, a metal salt, or a combination thereof.

Embodiment 127. The liquid dispersion composition of embodiment 123 or 126, wherein the hydrocarbon liquid comprises paraffinic oil.

Embodiment 128. The liquid dispersion composition of any one of embodiments 116-127, wherein the polyol comprises propylene glycol.

Embodiment 129. The liquid dispersion composition of any one of embodiments Embodiment 116-128, wherein the one or more surface active agents comprise a nonionic surfactant.

Embodiment 130. The liquid dispersion composition of any one of embodiments 116-129, wherein at least one of the one or more surface active agents is a polysorbate.

Embodiment 131. The liquid dispersion composition of any one of embodiments 116-130, wherein the one or more surface active agents comprise (x)-sorbitan mono-9-octadecenoate poly(oxy-1,2-ethanediyl), trimethylpentan-2-yl) phenoxy]ethanol, or a combination thereof.

Embodiment 132. The liquid dispersion composition of any one of embodiments 116-131, wherein the one or more surface active agents comprise (x)-sorbitan mono-9-octadecenoate poly(oxy-1,2-ethanediyl).

Embodiment 133. The liquid dispersion composition of any one of embodiments 116-132, wherein the one or more surface active agents each have an HLB value in a range of about 10 to about 18, about 12 to 18, or about 13 to about 16.

Embodiment 134. The liquid dispersion composition of any one of embodiment 116-133, wherein at least one of the one or more surface active agents has an HLB value of about 15.

Embodiment 135. The liquid dispersion composition of any one of embodiments 116-134, further comprising one or more additives.

Embodiment 136. The liquid dispersion composition of embodiment 135, wherein the one or more additives are selected from metal oxides, metals, composites, a thermally or electrically conductive material, a wax, a thermoset or thermomelt polymer, adhesive, sealant, film former, plasticizer, resin, oil, acrylate, urethane, cleaner, buffer, fragrance, biocide, fertilizer, anticorrosive, human or animal therapeutics, topicals, a swelling clay, or a combination thereof.

Embodiment 137. The liquid dispersion composition of embodiment 136, wherein the swelling clay comprises bentonite.

Embodiment 138. The liquid dispersion composition of any one of embodiments 135-137, wherein the one or more additives comprise silica, bentonite, a film former, or a combination thereof.

Embodiment 139. The liquid dispersion composition of any one of embodiments 116-138, wherein the liquid dispersion composition forms an absorbent gel upon exposure to water.

Embodiment 140. The liquid dispersion composition of any one of embodiments 116-139, wherein the liquid dispersion composition has a water absorption capacity of at least about 50 grams of water per gram of liquid dispersion composition, at least about 100 grams of water per gram of liquid dispersion composition, at least about 200 grams of water per gram of liquid dispersion composition, at least about 300 grams of water per gram of liquid dispersion composition, or at least about 350 grams of water per gram of liquid dispersion composition.

Embodiment 141. The liquid dispersion composition of any one of embodiments 116-140, wherein the liquid dispersion composition forms an oil-in-oil emulsion, suspension, oil-in-water emulsion, water-in-oil emulsion, or a combination thereof.

Embodiment 142. The liquid dispersion composition of any one of embodiments 116-141, comprising about 10 wt. % to about 80 wt. %, about 25 wt. % to about 75 wt. %, about 50 wt. % to about 75 wt. %, about 55 wt. % to about 70 wt. %, or about 60 wt. % to about 66 wt. % of the granular superabsorbent polymer.

Embodiment 143. The liquid dispersion composition of any one of embodiments 116-142, comprising about 58 wt. %, about 60 wt. %, about 63 wt. %, or about 65 wt. % of the granular superabsorbent polymer.

Embodiment 144. The liquid dispersion composition of any one of embodiments 116-143, comprising from about 0.2 wt. % to about 15 wt. %, about 0.2 wt. % to about 10 wt. %, about 0.2 wt. % to about 5 wt. %, about 0.5 wt. % to about 3 wt. %, about 0.5 wt. % to about 1.5 wt. %, or about 0.8 wt. % to about 1.0 wt. % of one or more surface active agents.

Embodiment 145. The liquid dispersion composition of any one of embodiments 116-144, comprising from about 1 wt. % to about 80 wt. %, about 10 wt. % to about 70 wt. %, about 20 wt. % to about 60 wt. %, about 25 wt. % to about 50 wt. %, about 25 wt. % to about 45 wt. %, or about 32 wt. % to about 40 wt. % of the polyol.

Embodiment 146. The liquid dispersion composition of any one of embodiments 116-145, comprising from about 0.1 wt. % to about 10 wt. %, about 0.1 wt. % to about 5 wt. %, or about 0.1 wt. % to about 1 wt. % of the hydrocarbon liquid or silicon-containing liquid.

Embodiment 147. The liquid dispersion composition of any one of embodiments 135-146, comprising from 0.1 wt. % to about 10 wt. % of the one or more additives.

Embodiment 148. The liquid dispersion composition of any one of embodiments 123-147, comprising:

about 60 wt. % to about 66 wt. % of the granular superabsorbent polymer;

about 0.1 wt. % to about 1.0 wt. % of the hydrocarbon liquid or a silicon-containing liquid;

about 32 wt. % to about 40 wt. % propylene glycol; and about 0.8 wt. % to about 1.0 wt. % of the one or more surface active agents.

Embodiment 149. The liquid composition of embodiment 148, further comprising from about 0.1 wt. % to about 5 wt. % of one or more additives.

Embodiment 150. The liquid dispersion composition of any one of embodiments 116-149, wherein the composition has a total solids content from about 20 wt. % to about 70 wt. %.

Embodiment 151. The liquid dispersion composition of any one of embodiment 116-150, wherein the composition has a total dissolved solids amount of less than about 400 mg/L.

Embodiment 152. The liquid dispersion composition of any one of embodiments 116-151, wherein the composition has a German Landfill Ordinance Deponieverordnung-DepV (DepV) classification of Deponieklasse 0 (DK 0).

Embodiment 153. A method of preparing an absorbent coating comprising:

providing a liquid dispersion composition comprising a granular superabsorbent polymer dispersed in a liquid medium, wherein:

the granular superabsorbent polymer is present in the composition from about 0.1% to about 95% by weight; and the liquid medium comprises two or more liquid components, wherein at least one of the liquid components is insoluble with the other liquid components; and applying the liquid dispersion composition to a substrate.

Embodiment 154. The method of embodiment 153, wherein applying the liquid dispersion composition to the substrate comprises dip coating, roll coating, printing, or spraying the liquid dispersion composition onto the substrate.

Embodiment 155. The method of embodiment 153, wherein applying the liquid dispersion composition to the substrate comprises dip coating the liquid dispersion composition onto the substrate.

Embodiment 156. The method of embodiment 154, wherein the printing comprises printing the liquid dispersion composition onto the substrate using an electronic or thermal printer, a print screen, or a gravure printer.

Embodiment 157. The method of embodiment 154, wherein the spraying comprises aerosolizing the liquid dispersion composition.

Embodiment 158. The method of embodiment 153, wherein applying the liquid dispersion composition to a substrate comprises co-extruding the liquid dispersion composition with the substrate.

Embodiment 159. The method of any one of embodiments 153-158, wherein applying the liquid dispersion composition to the substrate comprises applying the liquid dispersion composition as a uniform coating.

Embodiment 160. The method of any one of embodiments 153-158, wherein applying the liquid dispersion composition to the substrate comprises applying the liquid dispersion composition as a non-uniform coating Embodiment 161. The method of embodiment 160, wherein applying the liquid dispersion composition as a non-uniform coating comprises applying the liquid dispersion composition in a pattern.

Embodiment 162. The method of any one of embodiments 153-161, wherein the substrate is a fiber or a polymer film.

Embodiment 163. The method of embodiment 162, wherein the fiber is a yarn or a cable.

Embodiment 164. The method of embodiment 162, wherein the polymer film is a polypropylene film, a PET film, or an HDPE film.

Embodiment 165. The method of any one of embodiments 153-162, wherein the substrate is an environmental surface.

Embodiment 166. The method of any one of embodiments 153-162, wherein the substrate is polyethylene.

Embodiment 167. The method of any one of embodiments 153-166, wherein the absorbent coating has a water absorption capacity of at least about 10 grams of water per gram of absorbent coating, at least about 20 grams of water per gram of absorbent coating, or at least about 50 grams of water per gram of absorbent coating.

Embodiment 168. The method of any one of embodiments 153-167, wherein the absorbent coating has a slip characteristic value of at least about 1.5 or at least about 2 when applied to a PET film.

Embodiment 169. The method of any one of embodiments 153-168, wherein the absorbent coating has a slip characteristic value of at least about 2, at least about 3, or at least about 4 when applied to an HDPE film.

Embodiment 170. The method of any one of embodiments 153-169, wherein the absorbent coating has a viscosity in the range of about 5 cP to about 2,000,000 cP at 40° C.

Embodiment 171. The method of any one of embodiments 153-170, wherein the absorbent coating has a tan delta (tan δ) value in a range of about 0.1 to about 100.

Embodiment 172. An absorbent coating formed by the method of any one of embodiments 153-171.

Embodiment 173. A substrate coated with a liquid dispersion composition comprising a granular superabsorbent polymer dispersed in a liquid medium, wherein:

- the granular superabsorbent polymer is present in the composition from about 0.1% to about 95% by weight; and
- the liquid medium comprises two or more liquid components, wherein at least one of the liquid components is insoluble with the other liquid components.

Embodiment 174. The liquid dispersion composition of any one of embodiments 37-77, comprising:

- about 5 wt. % to about 75 wt. % of the granular superabsorbent polymer;
- about 5 wt. % to about 95 wt. % of the first liquid component;
- about 0.5 wt. % to about 95 wt. % of the second liquid component, wherein the second liquid component comprises a polyol; and
- about 0.5 wt. % to about 20 wt. % of the at least one surface active agent that is different from the first liquid component or the second liquid component.

Embodiment 175. The liquid dispersion composition of any one of embodiments 1-152 and 174, wherein the liquid dispersion composition is enclosed within a container.

Embodiment 176. The liquid dispersion composition of embodiment 175, wherein the container is a bag, pouch, or sachet.

Embodiment 177. The liquid dispersion composition of embodiment 175 or 176, wherein the container comprises at least one of a nozzle, a tear notch, a tapered region, a concentrate chamber, and a ridged region.

Embodiment 178. A method of preparing a lubricant comprising:

- providing a container comprising the liquid dispersion composition of any one of embodiments 1-152 and 174; and
- mixing the liquid dispersion composition with water.

Embodiment 179. A kit comprising one or more containers comprising the liquid dispersion composition of any one of embodiments 1-152 and 174.

EXAMPLES

Example 1: Self-Supporting Gel Formed from Liquid Dispersion Composition 1

Liquid dispersion composition 1 included 54 weight percent 100SUS paraffinic oil; 44 weight percent granular SAP powder having a $D_v$ (10), $D_v$ (50), and $D_v$(90) of about 15, 40, 90 microns respectively and produced by a solution polymerization process; 1 weight percent (x)-sorbitan mono-9-octadecenoate poly(oxy-1,2-ethanediyl) having a critical micelle concentration of about 0.012 mM (16 ppm) in pure water, a HLB value of about 15, a cloud point of about 66° C. and insoluble with paraffinic oils; and 1 weight percent 2-[4-(2,4,4-trimethylpentan-2-yl)phenoxy]ethanol having a critical micelle concentration of about 0.755 mM (190 ppm) in pure water, a HLB value of about 13.4, a cloud point of about 65° C. and soluble with paraffinic oils.

Dispersions from liquid dispersion composition 1 were made in the following manner as a non-limiting general example: 180 grams of 100 SUS oil was placed in a 500 ml plastic beaker and subsequently mixed under high shear with a 2-inch Cowles blade rotating at 500 RPM. 145 grams of granular SAP powder was added incrementally while increasing the mixer speed to about 2200 RPM. The dispersion was allowed to mix for 10 minutes. Approximately 3.3 grams of (x)-sorbitan mono-9-octadecenoate poly(oxy-1,2-ethanediyl) and 3.3 grams of 2-[4-(2,4,4-trimethylpentan-2-yl) phenoxy]ethanol was added to the dispersion. The dispersion was allowed to mix for an additional 10 minutes under high shear. The resulting composition made a stable dispersion with minimal settling after 2 hours, and essentially no additional settling under prolonged storage.

Figure 2:
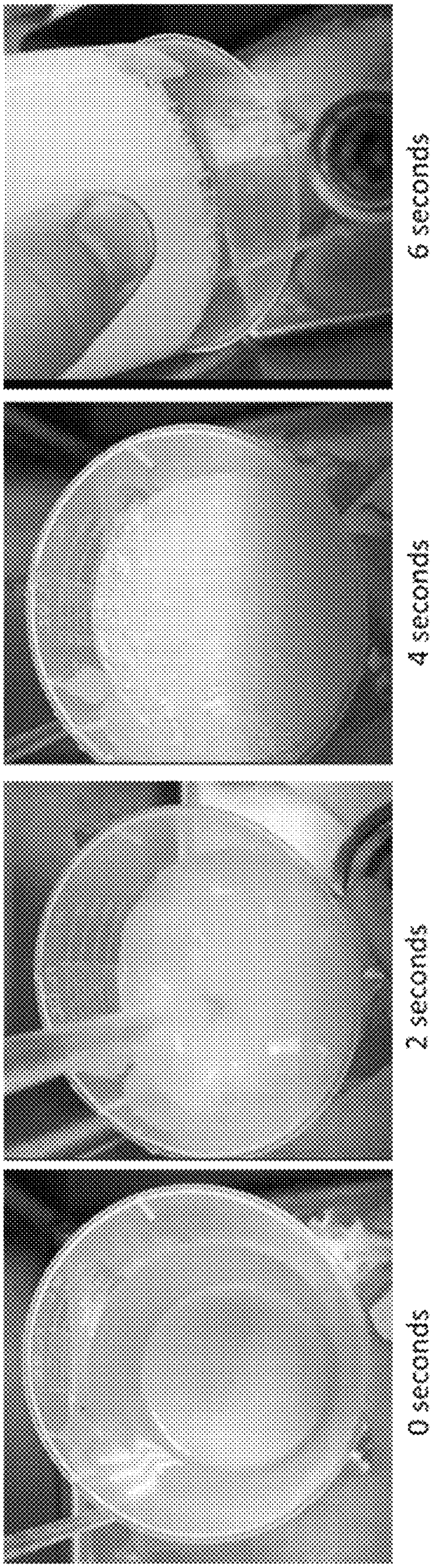
FIG. 2 shows time lapse photos of example liquid dispersion composition 1 gelling upon exposure to free tap water.

FIG. 2 illustrates the unexpected rapid gelation behavior of the composition when exposed to free water over a time sequence. Surprisingly, about 15-20 grams of the composition in the 500 ml plastic beaker gelled upon exposure to approximately 450 grams of tap water within about 5 seconds. The nature of gel is illustrated at the 6 second time point from the free water addition, showing the non-flowing nature of the gelled composition.

Example 2: Liquid Dispersion Compositions 2A-2C

Liquid dispersion compositions 2A-2C were prepared in a similar manner to produce liquid dispersion compositions wherein the granular SAP powder was present in an amount of about 43 to 63 weight percent of the formulation. The variation in the formulations were used to determine the impact of the viscosity of the paraffinic oil on the properties of the dispersion. A Silverson homogenizer was used to make the dispersions. Granular SAP powder was used for each trial condition and consisted of a $D_v(10)$, $D_v(50)$, and $D_v(90)$ of about 3.5 microns, 15 microns, and 40 microns respectively. The approximate surface area ranged between about 450 to 550 $m^2/g$. The granular SAP used was formed by an emulsion polymerization process.

The dispersions were made according to the following general process. About 200 grams of paraffinic oil was added to a 500 ml plastic beak and placed on the Silverson mixer equipped with a homogenization head. The mixer was set at about 50% power. About 204 grams of granular SAP were added incrementally to the paraffinic oil. The dispersion was allowed to mix for approximately 10 minutes and subsequently about 20 grams of light paraffin oil was added. After 5 additional minutes of mixing, about 12 grams of sulfonated mineral oil, about 24 grams of 2-[4-(2,4,4-trimethylpentan-2-yl) phenoxy]ethanol, and about 6 grams of (x)-sorbitan mono-9-octadecenoate poly(oxy-1,2-ethanediyl) were added. The dispersion mixed for an additional 10 minutes under high shear (100% power). Samples made in this manner had a viscosity that ranged from about 800 cp to a thick non flowing paste according to examples 2A, 2B, and 2C in Table 1.

TABLE 1

Formulations of liquid dispersion compositions 2A-2C having different granular SAP powder solids content.

| Component | 2A) Wt % (43% solids) | 2B) Wt % (53% solids) | 2C) Wt % (60% solids) |
|---|---|---|---|
| Paraffinic oil | 42.9 | 33.3 | 26.2 |
| Granular SAP | 43.8 | 53.3 | 60.4 |
| Sulfonated mineral oil | 5.2 | 5.2 | 5.2 |
| Light paraffin oil | 2.6 | 2.6 | 2.6 |
| 2-[4-(2,4,4-trimethylpentan-2-yl) phenoxy]ethanol | 4.3 | 4.3 | 4.3 |
| (x)-sorbitan mono-9-octadecenoate poly(oxy-1,2-ethanediyl) | 1.3 | 1.3 | 1.3 |

Example 3: Absorbent Coatings on Polyester Yarns Formed from Example Liquid Dispersion Compositions 3C-3G and Comparative Example Compositions 3A and 3B Various paraffinic oils of differing viscosity were used in the Example liquid dispersion composition 2A (43 weight percent solids) formulation to determine the impact on the dispersion and absorption properties. Light mineral oil, 90 SUS, 100SUS, 325SUS, 600SUS, Hydrobrite 550, and Hydrobrite 1000 having viscosities of about 36 cP, 40 cP, 48 cP, 142 cP, 280 cP, 260 cP, and 552 cP respectively as measured using a Brookfield viscometer set at 100 rpm and equipped with a #4 spindle (room temp). In some implementations, oils with differing viscosities can be mixed to achieve a particular composite viscosity and may represent a broad molecular weight distribution of hydrocarbon polymers or oligomers.

Polyester yarn (about 1700 Dtex) was used as a test substrate to evaluate the liquid dispersion compositions. One-meter-long yarn samples were coated using a dip coating method wherein the yarn was subsequently passed through a slotted silicon squeegee to remove excess material. Target weights were about 39-45 weight percent. The 1-meter-long coated samples were placed in a 500 ml baker containing 450 ml of deionized water. Individual yarn samples were allowed to soak for 5, 10, and 20 minutes. Once the soak time was completed, the yarn samples were slowly removed from the deionized water such that the absorbed coating did not slough off. Samples were placed in a weigh dish and the post absorption weight was recorded. The results of the absorption trials are tabulated in Table 2. Coated samples had a dry feel post application with no observable coating, essentially having the look and feel of the uncoated yarn. Absorption characteristics were compared to a benchmark product, Defopol MX 60, coated on the same polyester yarn type.

TABLE 2

Comparative absorption performance of liquid dispersion compositions 3C-3G using various paraffinic oils wherein the coatings of the composition on 1700Dtex polyester yarn are essentially the same.

| Light paraffin (3D) | 5 min. | 10 min. | 20 min. | 325SUS Paraffin (3E) | 5 min | 10 min | 20 min |
|---|---|---|---|---|---|---|---|
| Yarn wt. (g) | 0.1602 | 0.1621 | 0.1604 | Yarn wt. (g) | 0.1646 | 0.1641 | 0.1647 |
| Post coating wt. (g) | 0.3002 | 0.3028 | 0.2971 | Post coating wt. (g) | 0.2994 | 0.3023 | 0.2990 |

TABLE 2-continued

| | | | | | | | |
|---|---|---|---|---|---|---|---|
| Post soak wt. (g) | 17.916 | 19.3052 | 22.1482 | Post soak wt. (g) | 17.8185 | 22.3573 | 21.4469 |
| Coat wt. (g) | 0.1400 | 0.1407 | 0.1367 | Coat wt. (g) | 0.1348 | 0.1382 | 0.1343 |
| % coating | 45.6 | 46.5 | 46.0 | % coating | 45.0 | 45.7 | 44.9 |
| Absorption g/g | 55.93 | 62.67 | 73.55 | Absorption g/g | 58.51 | 72.96 | 70.73 |
| Coating Efficiency g/g | 119.9 | 135.1 | 159.9 | Coating Efficiency g/g | 130.0 | 159.59 | 157.47 |
| Average wt % coating & STDEV | 46.4 ± 0.3 | | | Average wt. % coating & STDEV | 45.2 ± 0.4 | | |
| 600SUS paraffin (3C) | 5 min. | 10 min. | 20 min. | 550 Paraffin (3F) | 5 min | 10 min | 20 min |
| Yarn wt. (g) | 0.1680 | 0.1681 | 0.1656 | Yarn wt. (g) | 0.1622 | 0.1604 | 0.1609 |
| Post coating wt. (g) | 0.2999 | 0.3018 | 0.2997 | Post coating wt. (g) | 0.2977 | 0.2944 | 0.3018 |
| Post soak wt. (g) | 16.7192 | 19.5728 | 17.6563 | Post soak wt. (g) | 17.7155 | 19.2561 | 25.2657 |
| Coat wt. (g) | 0.1319 | 0.1337 | 0.1341 | Coat wt. (g) | 0.1355 | 0.1340 | 0.1409 |
| % coating | 44.0 | 44.3 | 44.7 | % coating | 45.5 | 45.5 | 46.7 |
| Absorption g/g | 54.75 | 63.85 | 57.91 | Absorption g/g | 58.51 | 64.41 | 82.72 |
| Coating Efficiency g/g | 124.48 | 144.14 | 129.43 | Coating Efficiency g/g | 128.54 | 141.51 | 177.17 |
| Average wt % coating & STDEV | 44.3 ± 0.4 | | | Average wt. % coating & STDEV | 45.9 ± 0.7 | | |

| 1000 paraffin (3G) | 5 min. | 10 min. | 20 min. |
|---|---|---|---|
| Yarn wt. (g) | 0.1630 | 0.1630 | 0.1647 |
| Post coating wt. (g) | 0.2990 | 0.3012 | 0.3005 |
| Post soak wt. (g) | 17.6654 | 21.0023 | 24.2728 |
| Coat wt. (g) | 0.1360 | 0.1382 | 0.1358 |
| % coating | | | |
| Absorption g/g | 58.08 | 68.73 | 79.77 |
| Coating Efficiency g/g | 127.69 | 149.79 | 176.53 |
| Average wt % coating & STDEV | 45.5 ± 0.3 | | |

Figure 3A:
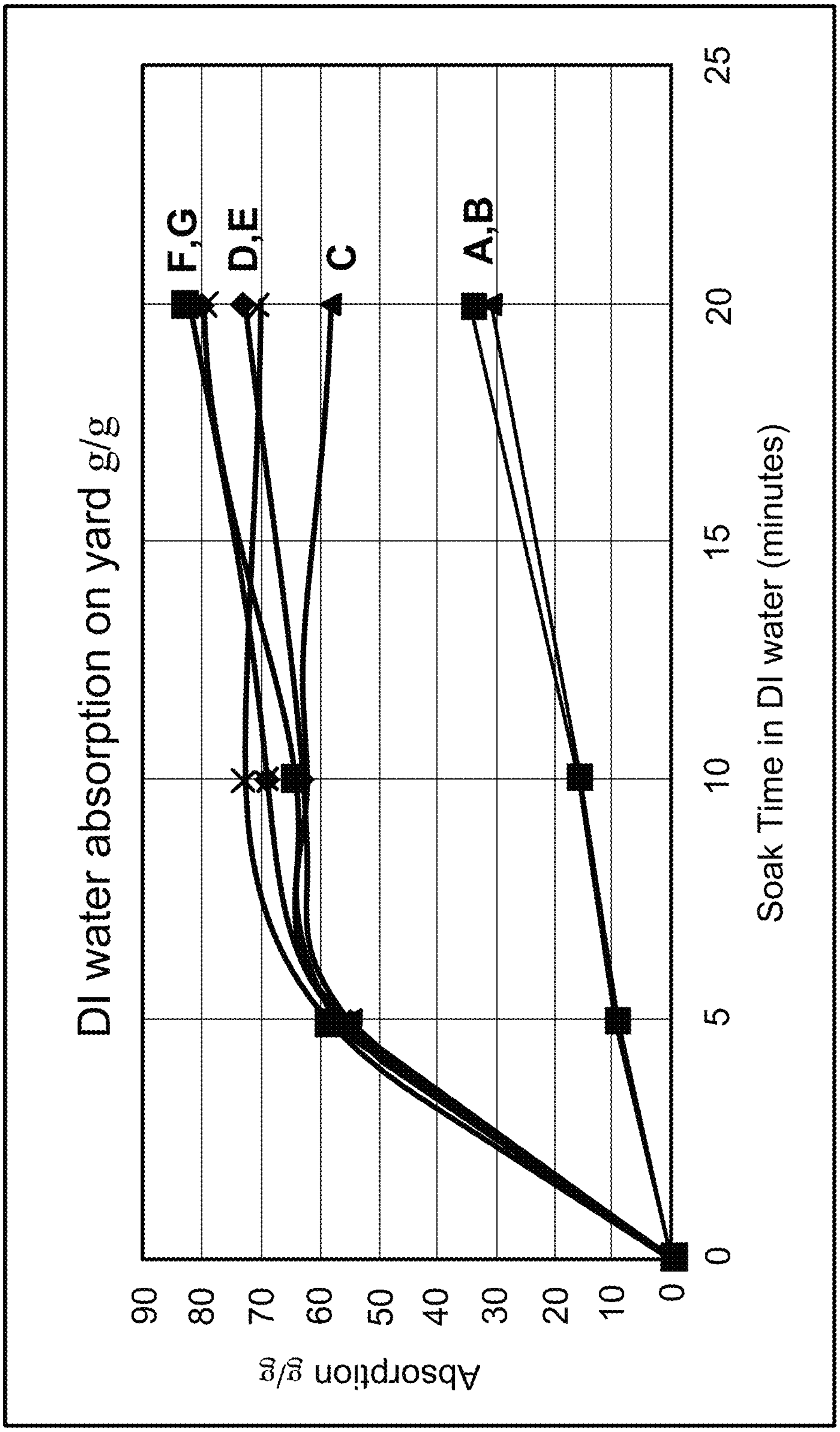
FIG. 3A is a graph showing water absorption on yarn (g water absorbed/g coating on yarn) over soak time for example liquid dispersion compositions 3C-3G and comparative examples 3A and 3B.
Figure 3B:
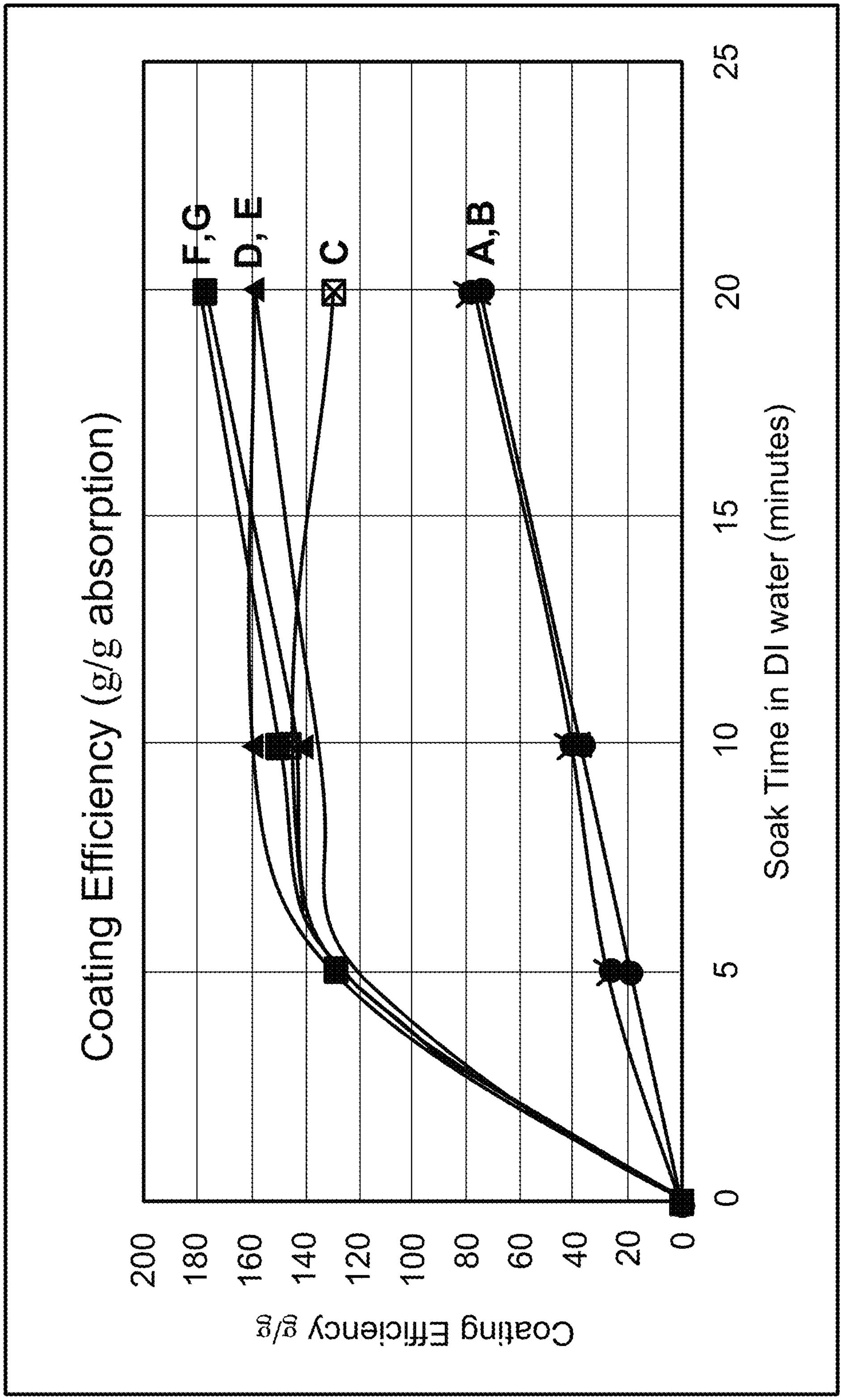
FIG. 3B is a graph showing coating efficiency (g water/g coating on yarn) over soak time for example liquid dispersion compositions 3C-3G and comparative examples 3A and 3B.

Table 3 provides the coating levels and the absorption performance of the polyester yarn coated with the Defopol MX 60 for two independent coating trials. The comparative trials results are shown in the graph of FIG. 3A and FIG. 3B, demonstrating the superior performance over the benchmark composition.

TABLE 3

Absorption performance of polyester yarn coated with Defopol MX60 subsequently soaked in deionized water for 5, 10, and 20 minutes.

| Trial 1 (3A) | 5 min. | 10 min. | 20 min. | Trial 2 (3B) | 5 min | 10 min | 20 min |
|---|---|---|---|---|---|---|---|
| Yarn wt. (g) | 0.1641 | 0.1644 | 0.1641 | Yarn wt. (g) | 0.1648 | 0.1672 | 0.1677 |
| Post coating wt. (g) | 0.2578 | 0.2728 | 0.2711 | Post coating wt. (g) | 0.3080 | 0.2910 | 0.3084 |
| Post soak wt. (g) | 2.8228 | 4.6167 | 8.6537 | Post soak wt. (g) | 3.1465 | 4.8781 | 10.7827 |
| Coat wt. (g) | 0.0937 | 0.1084 | 0.1070 | Coat wt. (g) | 0.1432 | 0.1238 | 0.1407 |
| % coating | 36.3 | 39.7 | 39.5 | % coating | 46.5 | 42.5 | 45.6 |
| Absorption g/g | 9.95 | 15.92 | 30.92 | Absorption g/g | 9.22 | 15.76 | 33.96 |
| Coating Efficiency g/g | 27.37 | 40.1 | 78.3 | Coating Efficiency g/g | 19.8 | 37.1 | 74.4 |
| Average wt % coating & STDEV | 38.6 ± 1.9 | | | Average wt. % coating & STDEV | 44.9 ± 2.1 | | |

In some implementations, the viscosity of the liquid dispersion composition can be controlled by varying the nature of the paraffinic oil, the content of the insoluble surface active agent, and the particle size distribution of the granular SAP powder, without impacting the absorption properties, such as speed of absorption and overall capacity.

Liquid dispersion compositions 3C-3G show similar absorption characteristics in deionized water over the 20-minute soak test as shown in FIGS. 3A and 3B. The graphs illustrate the general absorption trends in terms of soak time in deionized water. FIG. 3A gives the absorption units in terms of gram water absorbed per gram of yarn, while FIG. 3B gives the absorption units in terms of grams water per grams coating on the yarn. This can be useful to determine the efficiency of the coating composition with respect to the known absorption properties of the granulated SAP powder. Surprisingly, there was no dependence on the nature of the paraffinic oil with respect to absorption rate illustrating the further utility of the liquid dispersion compositions disclosed herein. Within the first 5-minute time point, compositions and yarn samples 3C-3F essentially achieved about 65-70 g/g absorption on the yarn. At longer soak times, a slight variation in absorption is observed due to the swollen gel migrating from the yarn surface. This phenomenon is especially relevant for composition 3C. At the 20-minute time period, compositions 3F and 3G show an absorption of about 80 g/g on the yarn as illustrated in FIG. 3A.

Comparatively, the absorption performance of polyester yarn coated with the liquid dispersion compositions disclosed herein show about a 10-12 fold increase over the commercial benchmark product (comparative examples 3A and 3B) at the 5 minute time period. The data indicate that about 80% of total observed absorption capacity is achieved within that time, demonstrating the rapid absorption characteristics of the compositions. Conversely, the commercial benchmark composition appears to absorb relatively slowly and linearly over the duration of the evaluation. To that end, the liquid dispersion compositions disclosed herein have desirable speed of absorption and capacity over the benchmark product.

FIG. 3B further illustrates the utility of the liquid dispersion compositions disclosed herein wherein the efficiency of the absorptive coating is shown over the duration of the evaluation. The absorption efficiency of the composition can be evaluated by normalizing the quantity of water absorbed with respect to the weight percent of the granular SAP powder in the formulation. Specifically, the granular SAP powder has an inherent absorption of about 450 g/g in deionized water. The liquid dispersion compositions disclosed herein can achieve about 175-180 g/g on the yarn, reflecting the granular SAP powder absorption in the composition of about 410 g/g or about 90% as tested. Surprisingly, the nature of the paraffinic oil did not impact the overall efficiency, further illustrating the unique nature of the liquid dispersion compositions disclosed herein. In some implementations, the overall absorption capacity of the composition can be increased or modulated based on the inherent absorptive nature of the granular SAP powder and its content in the formulation.

Figure 4B:
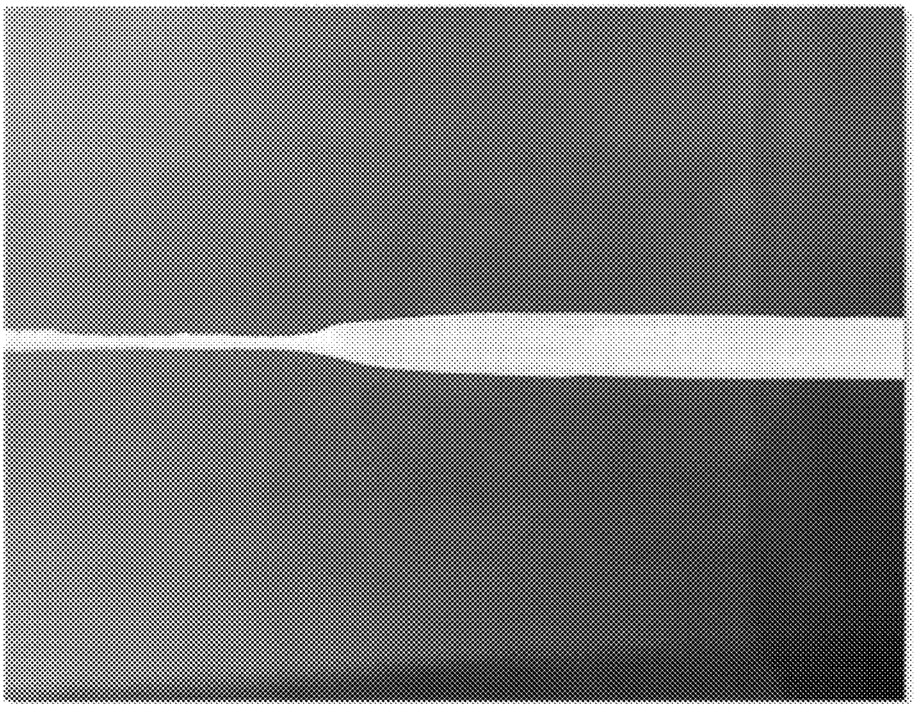
FIG. 4B is an image showing the cohesive gel structure of the absorptive coating on the 1700 Dtex polyester yarn removed from the deionized water and affixed in a vertical hanging position.
Figure 4A:
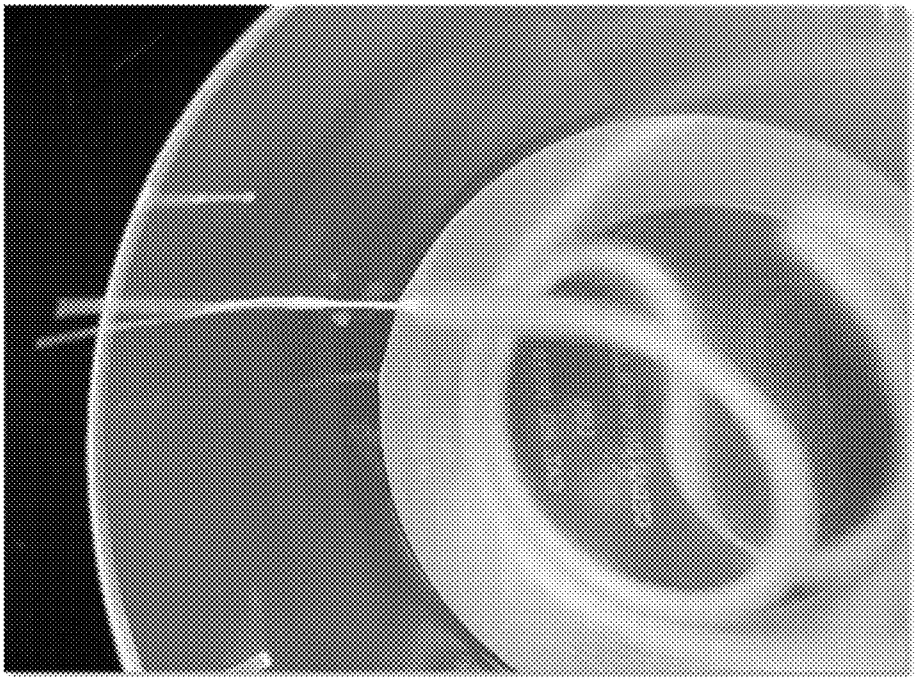
FIG. 4A is an image showing the nature of the absorptive coating on 1700 Dtex polyester yarn (about 44 weight %) in deionized water after about a 20 minute exposure period.

FIGS. 4A and 4B illustrate the physical nature of swollen absorptive coatings on 1700 DTex polyester yarn after extended soak time (about 20 minutes) in deionized water and the associated gel characteristics of the coatings on the yarn once removed from the deionized water. The resulting gel structure from the water-exposed compositions are self-supporting and have good relative adhesion to the 1700 Dtex polyester yarn. Without wishing to be bound by theory, it is believed that the gel composition is effectively a phase inverted aqueous oil-in-water emulsion that has acceptable mechanical properties and adhesion to form the uniform, continuous coating, suitable for water blocking applications.

Example 4: Liquid Dispersion Compositions 4D and 4E

Example 4 illustrates the utility of additives such as colloidal silica having a mean particle size of about 7 microns and a granular SAP powder that has been produced by a solution polymerization process. Table 4 provides non limiting examples of compositions using 230SUS paraffin oil as denoted by Composition 4D and Composition 4E wherein Composition 4E contains about 1 weight percent colloidal silica and an overall lower surface active component formulation as compared to Composition 4D.

TABLE 4

Formulations of compositions 4D and 4E

| Composition 4D | | Composition 4E | |
|---|---|---|---|
| Component | Weight Percent | Component | Weight Percent |
| 230 SUS paraffin oil | 43.3 | 230 SUS paraffin oil | 53.9 |
| Granular SAP powder | 43.3 | Granular SAP powder | 44.1 |
| 2-[4-(2,4,4-trimethylpentan-2-y1) phenoxy]ethanol | 5.2 | Colloidal Silica | 1.0 |
| (x)-sorbitan mono-9-octadecenoate poly(oxy-1,2-ethanediyl) | 1.3 | (x)-sorbitan mono-9-octadecenoate poly(oxy-1,2-ethanediyl) | 1.0 |
| Light paraffin oil | 4.3 | | |
| Sulfonated mineral oil | 2.6 | | |

The compositions were used to coat 1500 Dtex polyester yarn in a similar manner described in other Examples herein. The results of the deionized water absorption test are shown in Table 5 wherein treated yarns were soaked for 1 and 5 minutes and analyzed in a similar manner to the previously described method.

TABLE 5

Comparison of formulations 4D and 4E that use solution polymerized granular SAP powder and functional additives to further improve absorption characteristics.

| Composition 4D | 1 min. | 5 min. | Composition 4E | 1 min | 5 min |
|---|---|---|---|---|---|
| Yarn wt. (g) | 0.1703 | 0.1688 | Yarn wt. (g) | 0.1681 | 0.1706 |
| Post coating wt. (g) | 0.3080 | 0.2801 | Post coating wt. (g) | 0.3051 | 0.3067 |
| Post soak wt. (g) | 5.8467 | 7.6760 | Post soak wt. (g) | 12.2323 | 10.7692 |
| Coat wt. (g) | 0.1377 | 0.1113 | Coat wt. (g) | 0.1370 | 0.1361 |
| % coating | 44.7 | 39.7 | % coating | 44.9 | 44.4 |
| Absorption g/g | 18.0 | 26.4 | Absorption g/g | 39.1 | 34.1 |
| Coating Efficiency g/g | 40.2 | 66.5 | Coating Efficiency g/g | 87.1 | 76.9 |

Surprisingly, while the granular SAP powder and the paraffinic oil are the same materials in each formulation, coatings made from Composition 4E demonstrated superior absorption characteristics than coating made from Composition 4D, yet all samples had essentially the same coating level. Composition 4D absorbed about 18 g/g and 26.4 g/g deionized water at 1- and 5-minutes soak times respectively, while Composition 4E absorbed about 39.1 g/g and 34.1 g/g deionized water during the same soak times. Within the first minute of absorption Composition 4E showed about 217 percent increase in absorption over Composition D. At the 5-minute time point, the gel layer on the yarn treated with Composition 4D began to expand off of the yarn surface, ultimately resulting in a reduction in overall absorption due to the loss of gel coating in during the soak period. High absorbing coatings can exhibit such behavior and methods known in the art can be used to further evaluate “free gel” that has inadvertently migrated from the yarn surface.

The superior performance of Composition 4E over Composition 4D further illustrates the utility of additives such as, but not limited to, colloidal silica. Not wishing to be bound by theory, the colloidal silica is believed to sufficiently improve the water absorption and inhibit the common phenomenon of gel blocking known to occur in some SAP films. This is further illustrated by comparing the coating Efficiency from films formed by compositions 4D and 4E wherein the granular SAP powder approaches the maximum absorption of about 350 to 400 g/g in deionized water. Composition 4E achieves about 50% of the maximum absorption of the granular SAP powder, while Composition 4D only achieves about 23% of the maximum absorption at the 1-minute soak duration.

Example 5: Films Formed from Liquid Dispersion Compositions on Polyester and Polypropylene Substrates Liquid dispersion compositions with various granular SAP powder particle size distributions, shown in Table 6, were found to be useful in forming films on polyester and polypropylene substrates. Typically, this film can range in thickness from about 0.10 mil to about 3.0 mil and can be used in many industrial and commercial applications for water mitigation/absorption or moisture retention. These films may be further incorporated into other structures such as laminates, composites, or other assemblies. For example, an absorptive liner or coating on the interior of a trash bag or industrial waste receptacle liner.

TABLE 6

| General characteristics of granular SAP powders (GSAPP) for monomodal particle size distributions as determined by Malvern Mastersizer particle size instrumentation. | | | | |
|---|---|---|---|---|
| TYPE | Dv(10) | Dv(50) | Dv(90) | Surface Area $m^2/kg$ |
| GSAPP 1 | 27.4 | 46.3 | 76.4 | 115.4 |
| GSAPP 2 | 11.5 | 37.8 | 71.4 | 266.6 |
| GSAPP 3 | 2.95 | 13.3 | 36.7 | 690.5 |

Figure 5:
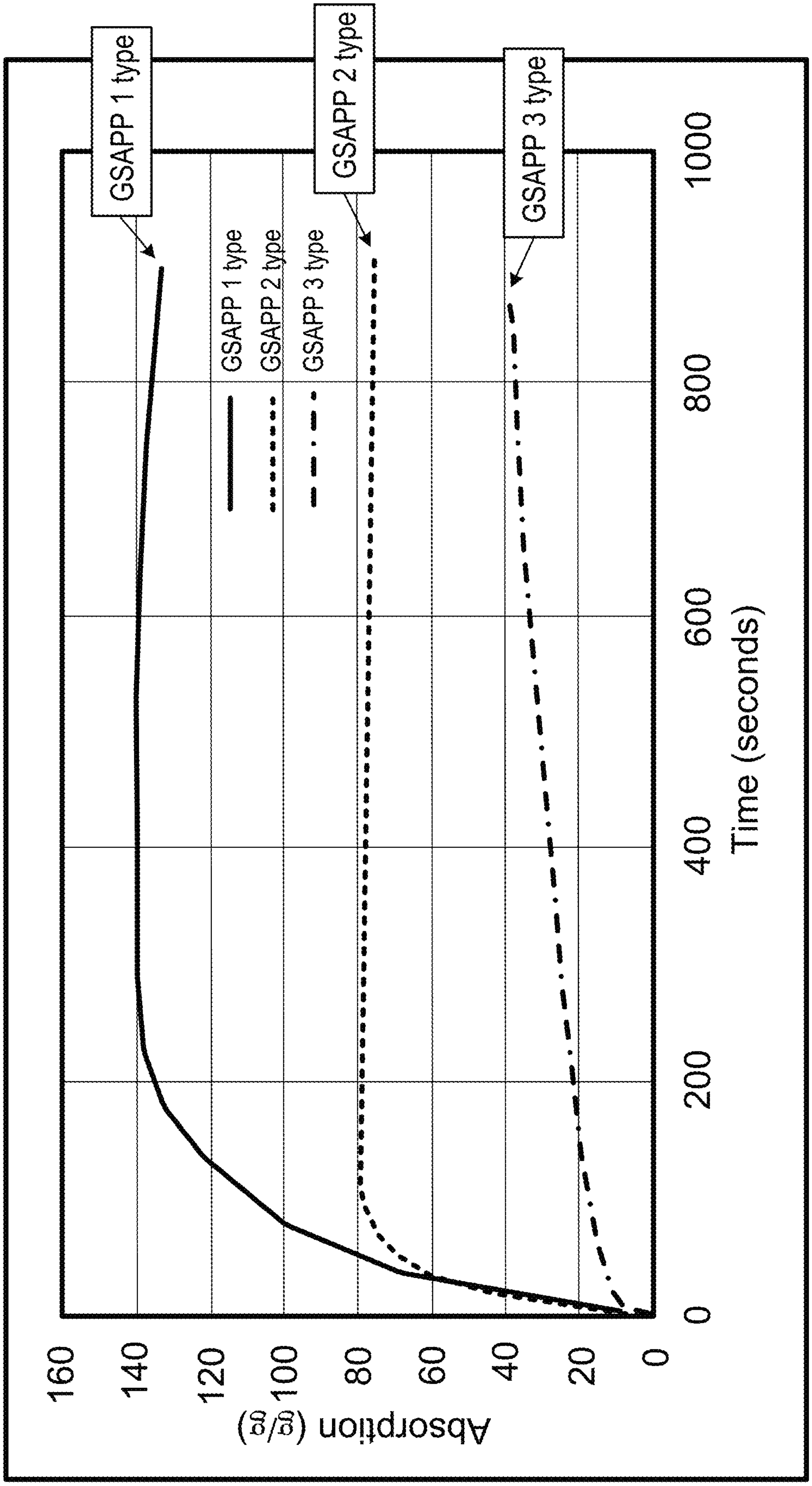
FIG. 5 is a graph showing swell cup test results and the absorption profile of compositions made with a granular powder having different particle size characteristics. Compositions were coated on a polyester substrate and evaluated in deionized water as a function of time.

The different distributions were produced by means known in the manufacturing art (e.g., grinding, milling, sieving, classification, blending) and essentially used solution polymerized granular SAP material. Compositions containing GSAPP1, GSAPP2, and GSAPP3 were made using the following general formulation: about 49 weight percent GSAPP, about 49 weight percent paraffin oil, about 1 weight percent surface active agent, and about 1 weight percent colloidal silica. Compositions were made as previously described and subsequently evaluated in the following general manner to determine the absorption capacity and swell speed of thin films made from the compositions. An approximate 18-inch by 20-inch polyester film sheet of approximately 2 mil thickness was coated with the composition using a draw bar such that a uniform coating was achieved. An approximately 80 mm diameter circular sample was cut from the sheet wherein about 0.2-0.3 g of the compositions was contained on the circular polyester substrate. The sample was placed in an 81 mm diameter reservoir container equipped with an 80 mm plunger sufficient to cover the surface area of the coated sample polyester film. The plunger was connected to a digital micrometer wherein the displacement measurements could be made and recorded over time using a computer interface and data logger. Deionized water was carefully added to the reservoir and the subsequent swell behavior monitored over a period of about 15 minutes. The height displacement was proportional to the absorption of the deionized water by the film. The data was further translated into grams of water absorbed per gram of composition based on the geometry and known film weight in the sample. The absorption characteristics of thin film made from the liquid dispersion compositions disclosed herein can be evaluated and quantitated as a function of time. In this manner, the relative impact of formulation, additives, and nature of the granular SAP powder could be evaluated and approximated. FIG. 5 shows the relative absorption performance of similar compositions containing different PSD granular SAP powders over essentially identical test conditions.

It has been found that certain particle size distribution characteristics are associated with an increased absorption and swell properties for thin films made from the compositions disclosed herein. For example, GSAPP 1 type granular SAP particles have superior absorption characteristics over GSAPP 2 and GSAPP2 has superior absorption characteristics over GSAPP 3 type granular SAP particles in the disclosed compositions. GSAPP1, GSAPP2, and GSAPP3 have a maximum absorption of about 141 g/g, 80 g/g, and 40 g/g respectively, however the relative granular SAP powder is essentially the same for all compositions. It appears that the absorption process has substantially ceased after about 15 minutes as essentially no change in absorption at extended evaluation times is observed. In some implementations, a relationship exists between the maximum absorbed quantity of water, the rate of absorption, and the film characteristics such as but not limited to thickness, uniformity, and composition. The overall effective efficiency can be compared between GSAPP1, GSAPP2, and GSAPP3 based on the inherent absorption of the granular SAP material of about 425 g/g. GSAPP1 achieves about 65% while GSAPP2 and GSAPP3 achieve about 39% and 18% respectively. In some implementations, further increase in absorption can be achieved by, but not limited to, incorporating additives, modification of the composition, changing the chemical nature of the granular SAP powder, or any combination thereof.

The relationship between the maximum absorption characteristics of thin films formed from the compositions and the particle size distribution characteristics can be realized. Particle size distribution and their frequencies can be in terms of number, volume, mass, surface area or combinations thereof, to describe different aspects of the granular SAP powders. A predictive mathematical relationship can be envisioned based on the particle size distribution characteristics such as but not limited to, D(10), D(50), D(90), surface area, fractal dimension, modality, and other distribution characteristics described herein.

Example 6: Liquid Dispersion Compositions Prepared from Granular Superabsorbent Polymer (SAP) Powders Having Varied Particle Size Distributions Table 7 provides general metrics for a series of granular SAP powder particle size characteristics, as a non-limiting example, and the subsequent absorption characteristics of compositions containing those granular SAP powders as determined by the swell cup test. All compositions use the same formulation and have 49 weight percent granular SAP powder.

TABLE 7

| General particle size distribution elements associated with granular SAP powders useful in the compositions disclosed herein. | | | | | | | | |
|---|---|---|---|---|---|---|---|---|
| SAP sample | $D_v(10)$ | $D_v(50)$ | $D_v(90)$ | Surface Area $m^2/g$ | $D_v(10)/D_v(90)$ | $D_v(90)-D_v(10)$ $D_v(50)$ | D[3, 2], D[4, 3] | Max Abs g/g |
| 1 | 27.4 | 46.3 | 76.4 | 115 | 2.793 | 1.061 | 43.3, 50.3 | 141 |
| 2 | 10 | 30 | 57 | 285.3 | 5.700 | 1.567 | 17.2, 32.1 | 81 |
| 3 | 14 | 48 | 102 | 203.9 | 7.286 | 1.833 | 24.1, 53.9 | 79.4 |

TABLE 7-continued

General particle size distribution elements associated with granular SAP powders useful in the compositions disclosed herein.

| SAP sample | $D_v(10)$ | $D_v(50)$ | $D_v(90)$ | Surface Area $m^2/g$ | $D_v(10)/D_v(90)$ | $D_v(90)$-$D_v(10)$ $D_v(50)$ | D[3, 2], D[4, 3] | Max Abs g/g |
|---|---|---|---|---|---|---|---|---|
| 4 | 11.5 | 37.8 | 71.7 | 240.2 | 6.235 | 1.593 | 20.5, 40.3 | 76 |
| 5 | 2.95 | 13.3 | 36.7 | 691 | 12.424 | 2.534 | 7.1, 17.1 | 38 |

Surprisingly, samples 1 and 3 have essentially the same Dv(50) of 46.3 micron and 48 microns respectively, yet the maximum absorption of compositions, evaluated by methods described herein, have 141 g/g and 79.4 g/g respectively. This suggests that the average particle size is not sufficient to determine absorption capacity.

Figure 6:
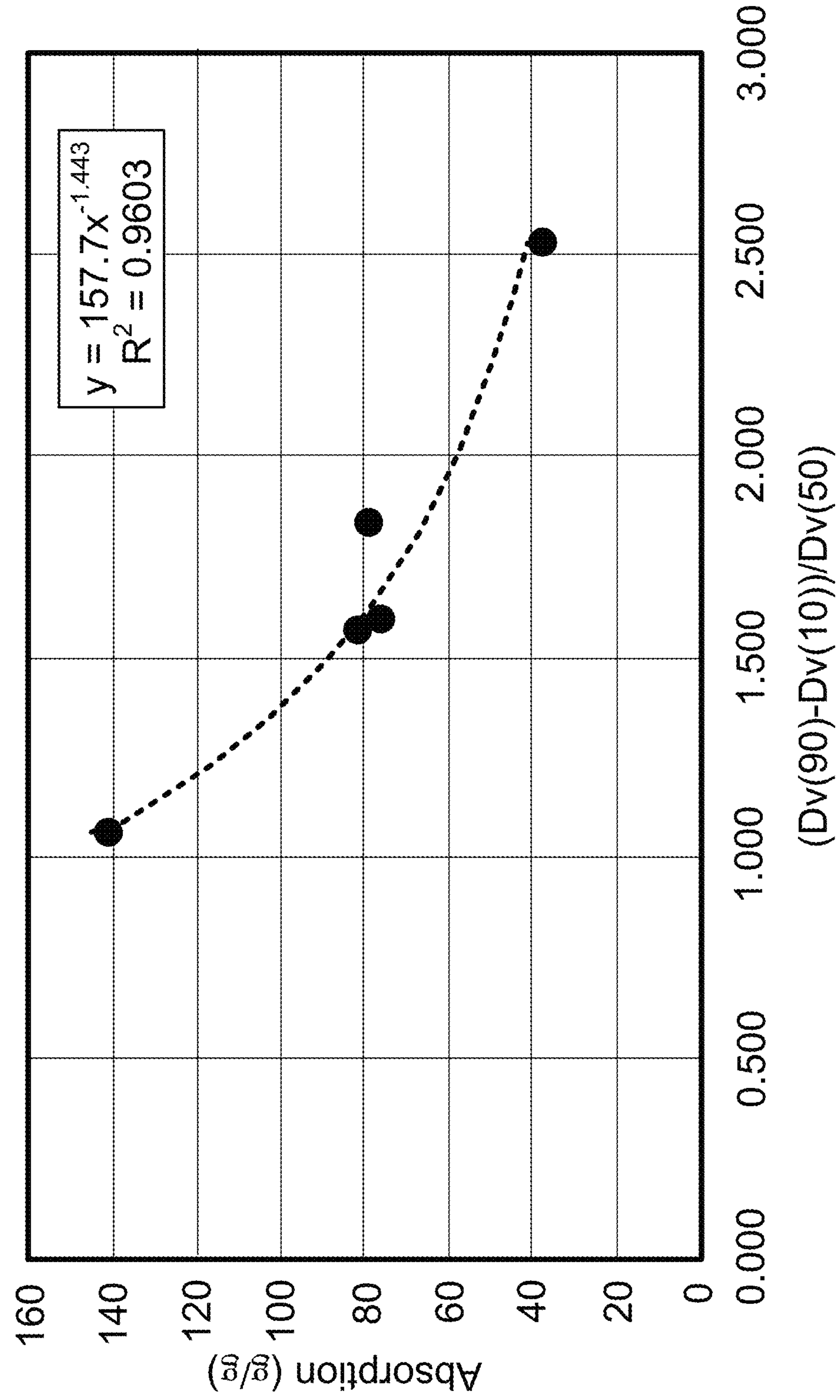
FIG. 6 is a graph depicting the general relationship between the maximum absorption of liquid dispersion compositions disclosed herein in deionized water and the granular SAP powder particle size distribution span.

As a non-limiting example, a mathematical relationship between various granular SAP powder particle size metrics, such as the Dv(10), Dv(50), Dv(90), can be determined to predict the maximum absorption properties of the composition. For example, the particle size distribution metric of (D(90)–D(10))/D(50)) (span) can be useful to define granular SAP powders having maximum absorption capacities. FIG. 6 illustrates a non-limiting example of a predictive mathematical relationship to identify implementations having high absorption capacities.

A general trend has been discovered wherein in some implementations, for a given composition and modality of the granular SAP powder, span values of about 2.5 are preferred whereas span values of about 1.5 are preferred and span values of less than 1.5 are most preferred to maximize the absorptive properties of the compositions. As such, a relationship between span and absorption has been found and described by the following Equation (2) which follows a powder law.

$$\text{Absorption} = 157.7\left(D_v(90) - D_v(10)/D_v(50)\right)^{-1.443} \quad \text{Equation (2)}$$

Wherein the constant (157.7) is proportional to the inherent nature of the granular SAP powder absorption in deionized water as incorporated into compositions disclosed herein. In some implementations, a master curve can describe the dispersion properties including the absorptive characteristics that incorporates mathematical relationships described by Equation (1) and Equation (2).

Figure 7:
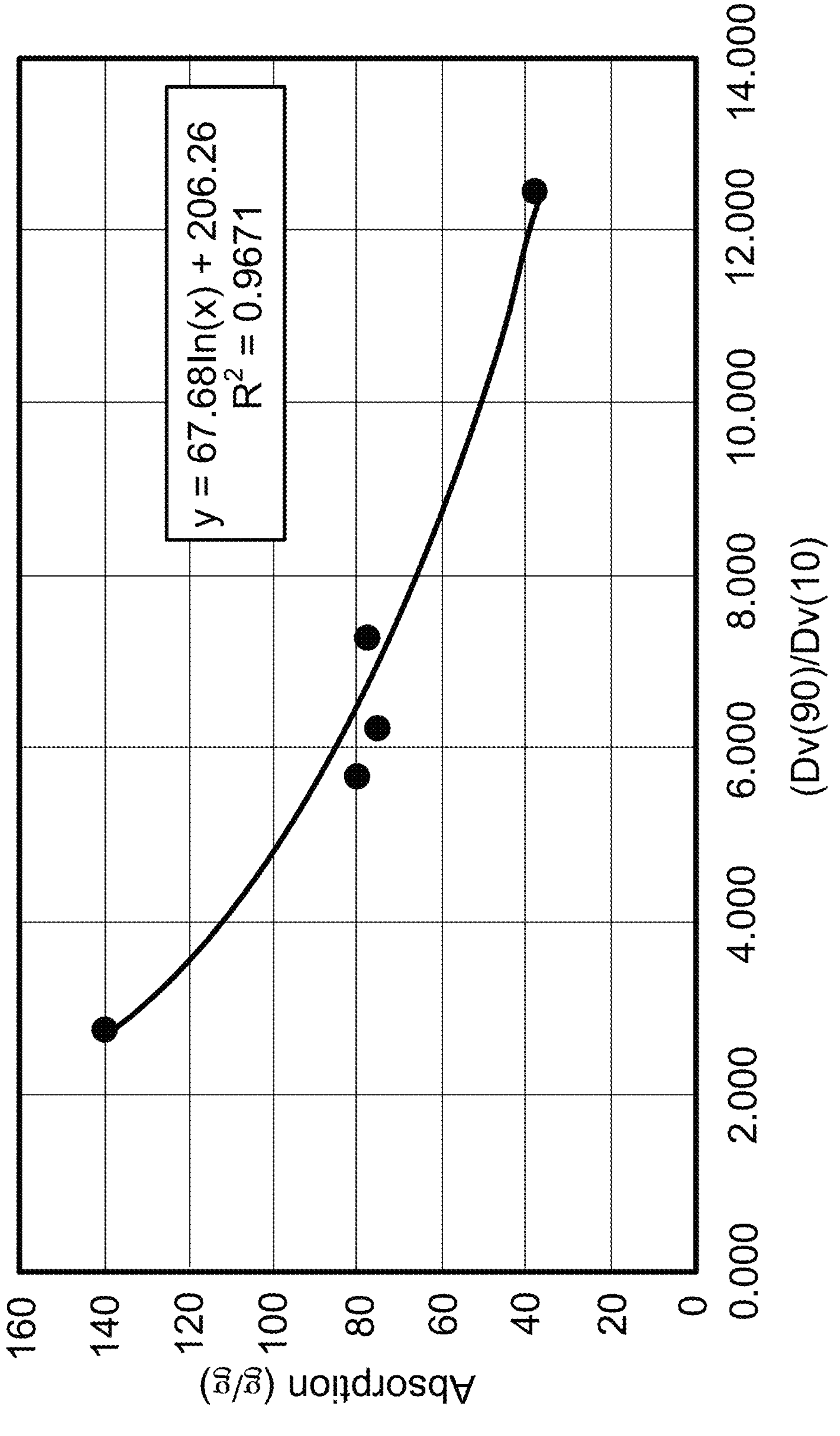
FIG. 7 is a graph depicting the general relationship between the maximum absorption of liquid dispersion compositions disclosed herein in deionized water and the granular SAP powder particle D(90)/D(10) ratio.

A non-limiting example of a granular SAP powder specification is D(90)/D(10) wherein the maximum absorption of the compositions can be defined is shown in FIG. 7. The maximum absorption can be related to the D(90)/D(10) by Equation (3):

$$\text{Abs} = -67.68\text{Ln}\left(D(90)/D(10)\right) + 206.26 \quad \text{Equation (3)}$$

wherein the constant (206.26) in terms of g/g can be related to the inherent absorption characteristics of a given granular SAP powder. For Equation 3, the physical meaning of the constant is proportional and predictive of the specific SAP absorption in deionized water. For example, the granular SAP powder has a relative absorption in deionized water of about 425 g/g to 450 g/g. The compositions evaluated as denoted in Table 7 have a relative 49 weight percent concentration of granular SAP powder of the same type. As such, the constant value of 206.26 in Equation 3 relates to the inherent absorptive characteristics normalized to the weight percent composition of the granular SAP powder in the formulation. The predicted absorptive value of the granular SAP power is estimated at 421 g/g (206.26/0.49 wt % granular SAP powder) which is about 93 to 99% of the inherent value. This further demonstrates the surprising efficiency of the composition as the maximum absorption of the granular SAP powder is achieved without impediment.

Without wishing to be bound by theory, it is believed that the coefficient and their magnitude can be related to the characteristics of the granular SAP powder, the physicochemical nature of the composition, and the properties of the coatings or films made from the composition. In this case, the absorption g/g can be predicted by the Equation 3 specifications. For example, granular SAP powders having a maximum absorption g/g can have a D(90)/D(10) below about 7 and a minimum of about 1. In some implementations, the relationship between the granular SAP powder and the maximum absorption can be different from that of Equation 3 and determined for different compositions, SAP types, and properties of the dispersion. Dimensions such as D[3,2) and D[4,3] can be useful and further incorporated into predictive mathematical relationships.

Example 7: Liquid Dispersion Compositions Applied to Non-Woven Materials

Liquid dispersion compositions including 49 weight percent granular SAP powder having a D(90)/D(10) value of about 2.5, a (D(90)–D(10))/D(50) value of about 1.2 and D[3,2], D[4,3] of about 40 microns and 50 microns respectively, 49 weight percent 100sus paraffin oil, 1 weight percent colloidal silica, and 1 weight percent (x)-sorbitan mono-9-octadecenoate poly(oxy-1,2-ethanediyl) surface active agent were found to be useful for forming water absorbing coatings on polymer films and non-woven materials. In some implementations, these compositions can form moisture retaining layers for use in industrial applications such as concrete curing blankets, and medical applications as a moisture mitigation barrier in wound dressing applications.

Figure 8A:
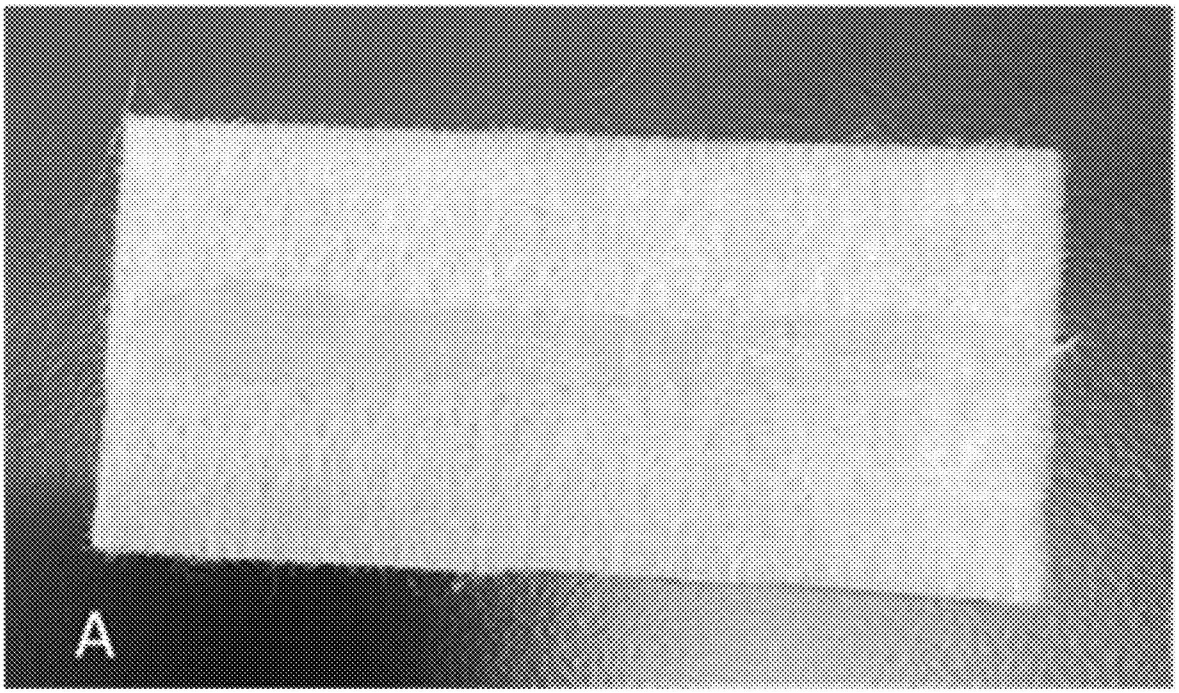
FIG. 8A is an image showing an approximately 1.5 inch by 3 inch non-woven material with an example liquid dispersion composition applied as a functional absorptive strip.
Figure 8B:
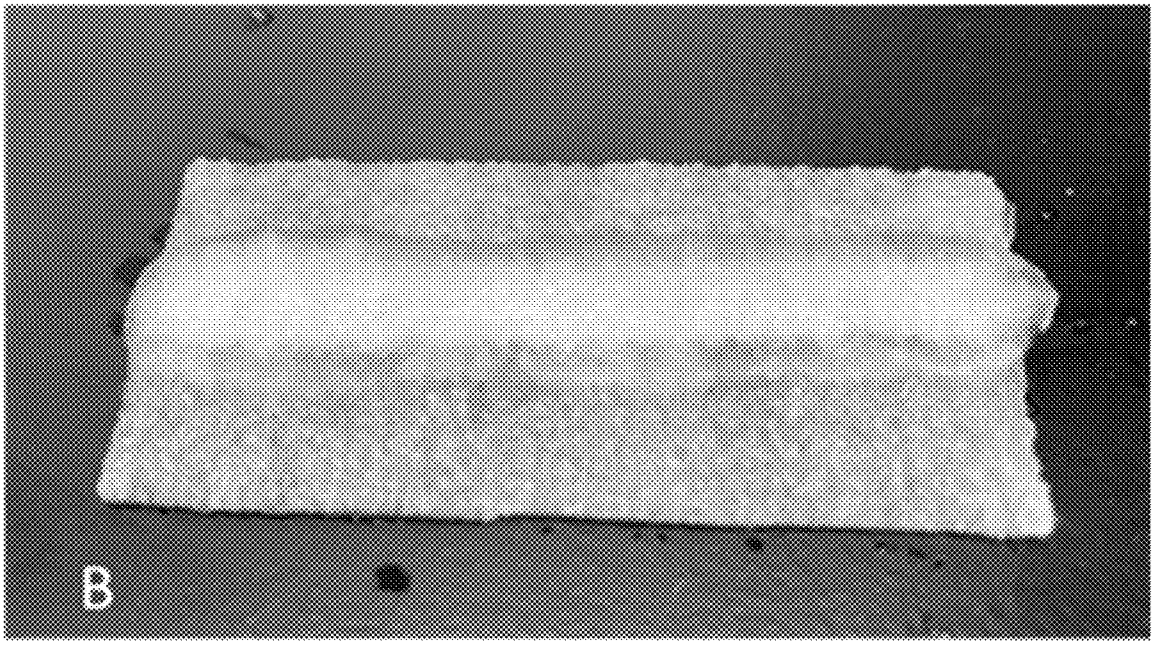
FIG. 8B is an image depicting the nature of the absorptive strip post exposure to water immersion for about 30-45 seconds.

FIGS. 8A and 8B illustrate the absorptive properties of the composition applied to a non-woven material suitable for wound dressing applications. Approximately 0.7 grams of the was applied to an about 1.5 inch by 3-inch of about 80-60 gsm non-woven material suitable for wound dressing applications. The images show the utility of the liquid dispersion compositions disclosed herein as a moisture swellable layer or zone that can absorb (wick) water from uncoated regions of the non-woven. FIG. 8A demonstrates the compositions disclosed herein can be applied by dip coating, spray coating, printing, and other techniques to create patterns, zones, or regions that can absorb water. These application techniques can be used to create patterns that are continuous and uniform, non-continuous and non-uniform, or any combination thereof on the surface of the substrate. Specifically, in FIG. 8A an absorptive strip has been created on the surface of the non-woven substrate. FIG. 8B illustrates the nature of the coated region post exposure to tap water after an immersion time of about 30 to 45 seconds. The image demonstrates the ability to create an absorptive zone that has about 180 g/g absorption capacity as a non-limiting example. In some implementations, the liquid dispersion compositions disclosed herein can be used to create functional tapes, laminates, and other composites materials to impart absorptive properties.

Example 8: Liquid Dispersion Compositions Applied to Polymer Films

Figure 9A:
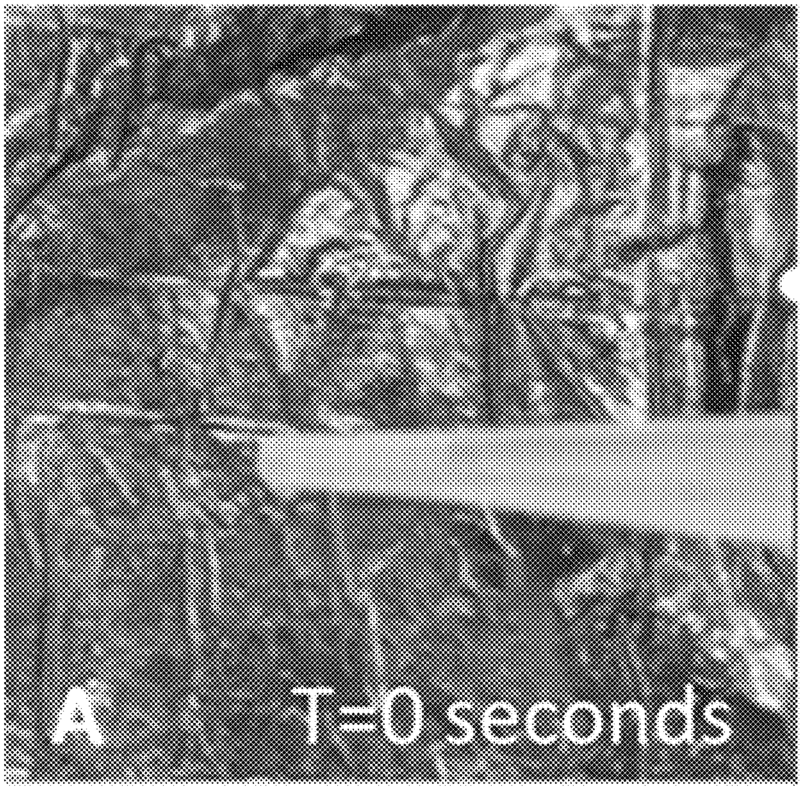
FIG. 9A is an image of a thin film 8A formed by an example liquid dispersion composition (about 10-20 mg/in$^2$) on a polypropylene substrate.
Figure 9B:
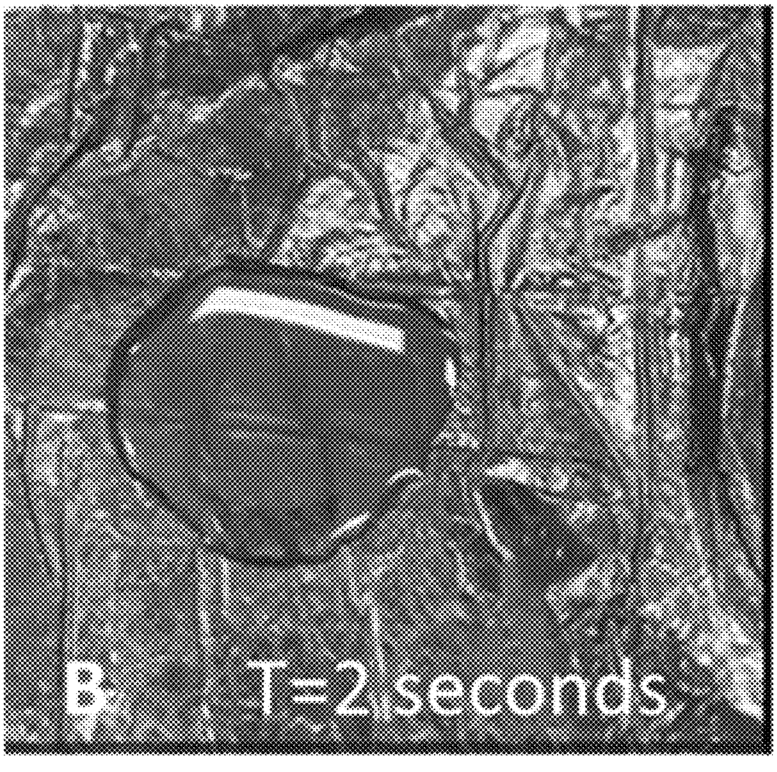
FIG. 9B is an image depicting the thin film 8A at a time of 2 seconds after tap water was added.
Figure 9C:
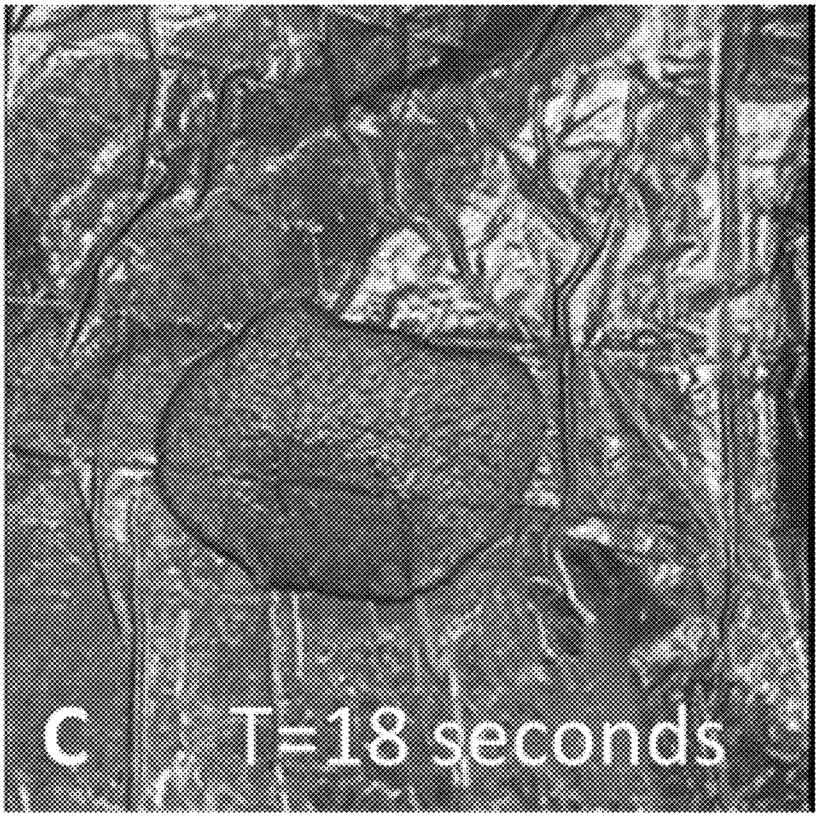
FIG. 9C is an image depicting a swollen hydrogel formed from the thin film 8A at a time of about 18 seconds after tap water was added.

Another implementation incorporates liquid dispersion compositions disclosed herein as a coating on polymer films such as, but not limited to, polyolefin films such as polyethylene and polypropylene to create an absorptive coating. These coatings can be useful to absorb free aqueous base liquids associated with refuse and other household, industrial, or commercial waste. These coatings can be useful in trash can liners, recycling and other refuse contains. As such, the coating prevents free aqueous base liquids from inadvertent spills or leaks from lined receptacles or upon transporting receptacles and bags. FIGS. 9A-9C show the utility and application of the liquid dispersion compositions disclosed herein when used as a thin film coating on polyolefin refuse liners.

As a non-limiting example, about 10-20 mg per square inch of the composition described in Example 7 is coated on a polyolefin film to form example thin film 8A. Surprisingly, a nontransferable film 8A is created by the composition wherein the surface active agents are capable of providing not only a phase inverting phenomenon of the paraffin-based dispersion when exposed to water, but also impart good film forming properties. Without wishing to be bound by theory, it is believed that the paraffin-based oil can migrate along the polyolefin surface, while the granular SAP powder, and the non-oil soluble surface active agents, and additives are in sufficient proportion to form a stationary, nontransferable film. This further demonstrates the utility of the liquid dispersion compositions disclosed herein wherein the surface active agent is not soluble in the paraffin liquid, has preferential absorption with the granular SAP powder surface, capable of forming an emulsion in the paraffinic oil, and rapidly phase inverting the composition when exposed to water. FIGS. 9A-9C illustrate the time lapse absorption behavior of the thin film coating 8A formed from the compositions disclosed herein, wherein FIG. 9A, T=0 seconds, shows the imperceptible coating of about 10-20 mg/in$^2$. FIG. 9B shows approximately 5-10 ml of tap water added to the coated polyolefin film at two seconds. FIG. 9C shows the swollen absorptive coating, forming a hydrogel, after about 18 seconds demonstrating the rapid absorption and immobilization of free aqueous based liquids.

Example 9: Liquid Dispersion Compositions Including Water in the Liquid Medium Other example liquid dispersion compositions have formulations wherein one of the liquids is water. These compositions surprisingly demonstrate good physicochemical properties. Specifically, these compositions have a high degree of lubricity and the ability to reduce friction between proximal surfaces. Non-limiting examples are given below in Table 8A wherein water comprises about 50-99 weight percent of the total composition. One example uses a non-hydrocarbon oil such as, but not limited to, polydimethylsiloxane (PDMS) having a viscosity of 495 cP as the primary vehicle for the granular SAP powder dispersion.

TABLE 8A

Example composition including a granular SAP powder (GSAPP2, Table 6) in a linear siloxane liquid polymer using a liquid non-soluble surface active agent.

| Component | Weight percent |
|---|---|
| Linear Polydimethyl Siloxane | 66 |
| Granular SAP powder | 31 |
| (x)-sorbitan mono-9-octadecenoate poly(oxy-1,2-ethanediyl) | 3 |

Dispersions of this type are made in a manner previously described herein. In general, the liquid surface active agent is added to the polydimethylsiloxane under high shear wherein a two-phase emulsion is formed. Subsequently, the granular SAP powder is added under mixing conditions to achieve a uniform mixture with a high degree of stability over time. This unexpected behavior suggests that the granular SAP powder stabilized the immiscible liquids and further prevents separation. In some implementations, Equation 1 can describe the dispersion characteristics including potential charge control phenomenon associated with (x)-sorbitan mono-9-octadecenoate poly(oxy-1,2-ethanediyl) in non-aqueous dispersion systems. In some implementations, granular SAP powders can be defined by particle size characteristics. These compositions can be comprised of a plurality of surface active agent and other additives, such as but not limited to water soluble additives. These types of non-hydrocarbon-based dispersion demonstrate similar phase inverting phenomenon as shown in FIG. 2.

One example incorporates compositions according to the non-limiting example in Table 8A with aqueous compositions as shown in Table 8B wherein, as a non-limiting example, an aqueous phase constitutes the second liquid component.

TABLE 8B

Example composition of a non-soluble liquid with respect to non-aqueous compositions described in Table 8A.

| Component | Weight percent |
|---|---|
| Water | 98.7 |
| Propylene glycol | 1.1 |
| Linear acrylate copolymer or surfactant | 0.03 |
| Biocide | 0.17 |

In one example, a liquid dispersion composition 9H comprised of about 6 weight percent of the composition listed in table 8A and about 94 weight percent of the composition listed in Table 8B can be useful as lubricants and water swellable greases. When the components from Table 8A and Table 8B are mixed under shear, the mixture undergoes self-emulsification producing a stable composition suitable for lubrication applications. Surprisingly, these compositions have desirable rheological characteristics, slip characteristics, thermal stability, and resistance to phase separation. The characteristic of slip can be described by ASTM D 1894-95. It has been found that the compositions disclosed herein have superior performance in these dimensions over commercially available water-based lubricants and prior art related to cable installation.

Figure 10:
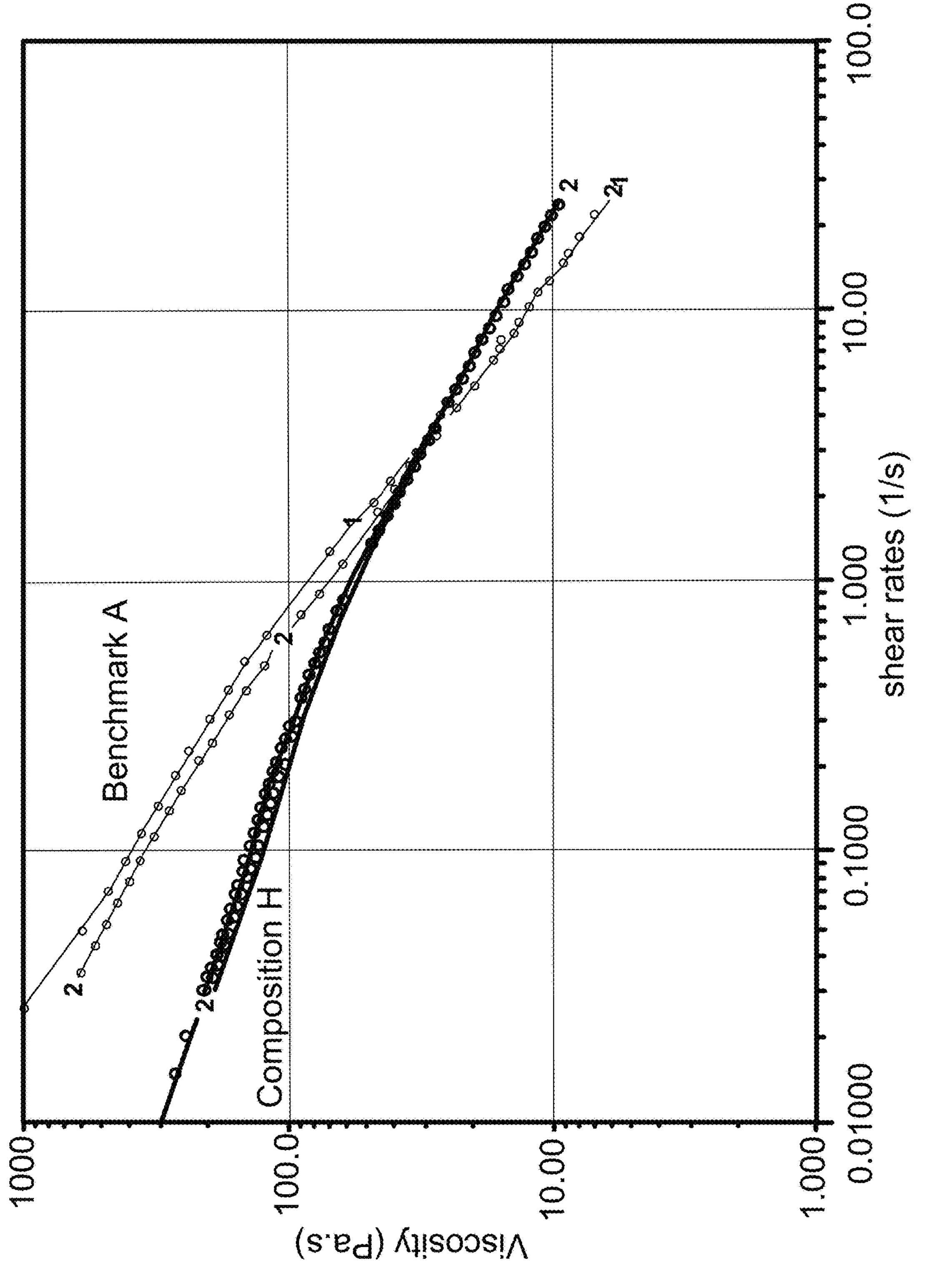
FIG. 10 is a graph showing a comparison of viscosity vs. shear rate for an example liquid dispersion composition 9H and a commercially available composition (Benchmark A).

With respect to cable installation, there is a need to reduce the pulling resistance, including frictional forces, between cables and conduit inner surfaces when new or replacement cables are installed. Specifically, cables are either pulled or conveyed (e.g., pneumatically) through conduits containing a singular cable or a plurality of cables. As such, large frictional forces can be generated when a cable is pulled or conveyed in a confined space within a conduit. Large frictional forces can cause damage and premature failure of existing or newly installed cables. Therefore, lubricants may be applied to the cable during installation to intentionally reduce the forces necessary to pull or convey the cable through a conduit. Ideally a lubricant composition will have rheological properties that ensure the composition will cling or adhere to the cable, reduce initial frictional forces associated with low shear, and maintain a consistent coating on the cables during high shear pulling processes. FIG. 10 shows the rheological comparison of an example liquid dispersion composition, Composition 9H, as a non-limiting example, and an industry benchmark material, Polywater J (Benchmark A). Samples were analyzed on a TA instruments AR 1000-N rheometer equipped with a 40 mm parallel plate spindle and 1500 micron gap, wherein all samples were evaluated at 25 C over a shear rate of 0.02 to about 30 l/s. The viscosities of the samples were measured under continuous flow conditions.

Composition 9H has a shear thinning behavior over the shear rate range as tested wherein the viscosity at 0.02 l/s is about 200 Pa·s and the viscosity at 30 l/s is about 9 Pa·s. In contrast, Benchmark A has a similar shear thinning behavior over the same shear rate regime, however the viscosity at about 0.02 l/s and 30 l/s is about 1000 Pa·s and about 5 Pa·s respectively. This indicates that Composition 9H has a lower initial viscosity under lower shear regimes than Benchmark A suggesting the initial start-up pulling forces in cable installation processes will be lower using the compositions disclosed herein. Lower viscosity can be advantageous as it reduces stresses and other undesirable forces on cables during initial pulling and subsequent start—stop operations, to effectively prevent damage to the cables during installation. At higher shear rates, Composition 9H has a higher relative viscosity than Benchmark A. Higher viscosity at high shear rates indicates that liquid dispersion compositions disclosed herein have superior film forming properties over the commercial Benchmark A. This feature is particularly important during cable pulling installation operations as the lubricating film must maintain sufficient rheological properties to prevent increased frictional forces or proximal surface contact. The rheological properties of Composition 9H can enable higher cable pulling speeds, effectively reducing installation time and complexity.

In some implementations, liquid dispersion compositions disclosed herein can be further optimized and tailored for specific performance requirements and attributes. Without wishing to be bound by theory, it is believed that the unique nature of the swollen hydrogel SAP particles form a 3-dimensional structure that further stabilizes the oil (hydrocarbon-based or silicone-based) and water emulsion, in conjunction with the surface active agents and other additives. As such, the ratio of water to the quantity of the granular SAP powder can be an important determining specification. In some implementations, the quantity of water (i.e., shown in Table 8B as a non-limiting example) in the composition is less than the total, inherent absorption capacity of the granular SAP powder for the liquid dispersion composition.

The components listed in Table 8A and Table 8B can be mixed under shear in any combination of ingredients to produce a liquid dispersion composition suitable for lubrication applications.

In some implementations, a first mixture is prepared that includes a surface active agent, the superabsorbent polymer, and propylene glycol, and a second mixture is prepared that includes water, surfactant, silicon-containing liquid, and optionally one or more additives. The first mixture and the second mixture are combined to prepare the liquid dispersion composition. In some implementations, the liquid dispersion composition includes about 99.0 wt. % to about 99.9 wt. % of the second mixture and about 0.1 wt. % to about 1.0 wt. % of the first mixture.

An example composition 9I is shown in Table 9:

TABLE 9

Example composition 9I including water in the liquid dispersion medium.

| Component | Weight Percentage (%) |
|---|---|
| First Mixture-High Shear Mixer | |
| Polysorbate 80 | 0.17 |
| SAP Fines Powder | 0.36 |
| Propylene Glycol | 0.20 |
| Subtotal-First Mixture | 0.73 |
| Second Mixture-High Shear Homogenizing Mixer | |
| Water | 96.17 |
| Biocide | 0.09 |
| Silicone Surfactant | 0.01 |
| PDMS Silicone Fluid | 3.00 |
| Subtotal-Second Mixture | 99.27 |
| TOTAL | 100.00 |

The first mixture and the second mixture were combined under shear to prepare Example Composition 9I. The components in the first mixture and the second mixture shown in Table 9 can be combined in any like combination of ingredients thereof to achieve desired properties such as target viscosity, lubricity, slip, drag, and flow characteristics.

In some implementations, the combination of ingredients in the first mixture and the second mixture as shown in Table 9 allows for more efficient processing, especially when mixing larger volumes. Without wishing to be bound by theory, it is believed that the combination of ingredients in the first mixture and the second mixture of Table 9 can allow for high shear homogenization of the silicone into water more quickly and efficiently.

Example 10: Evaluation of Thermal Properties of Liquid Dispersion Compositions

Figure 11:
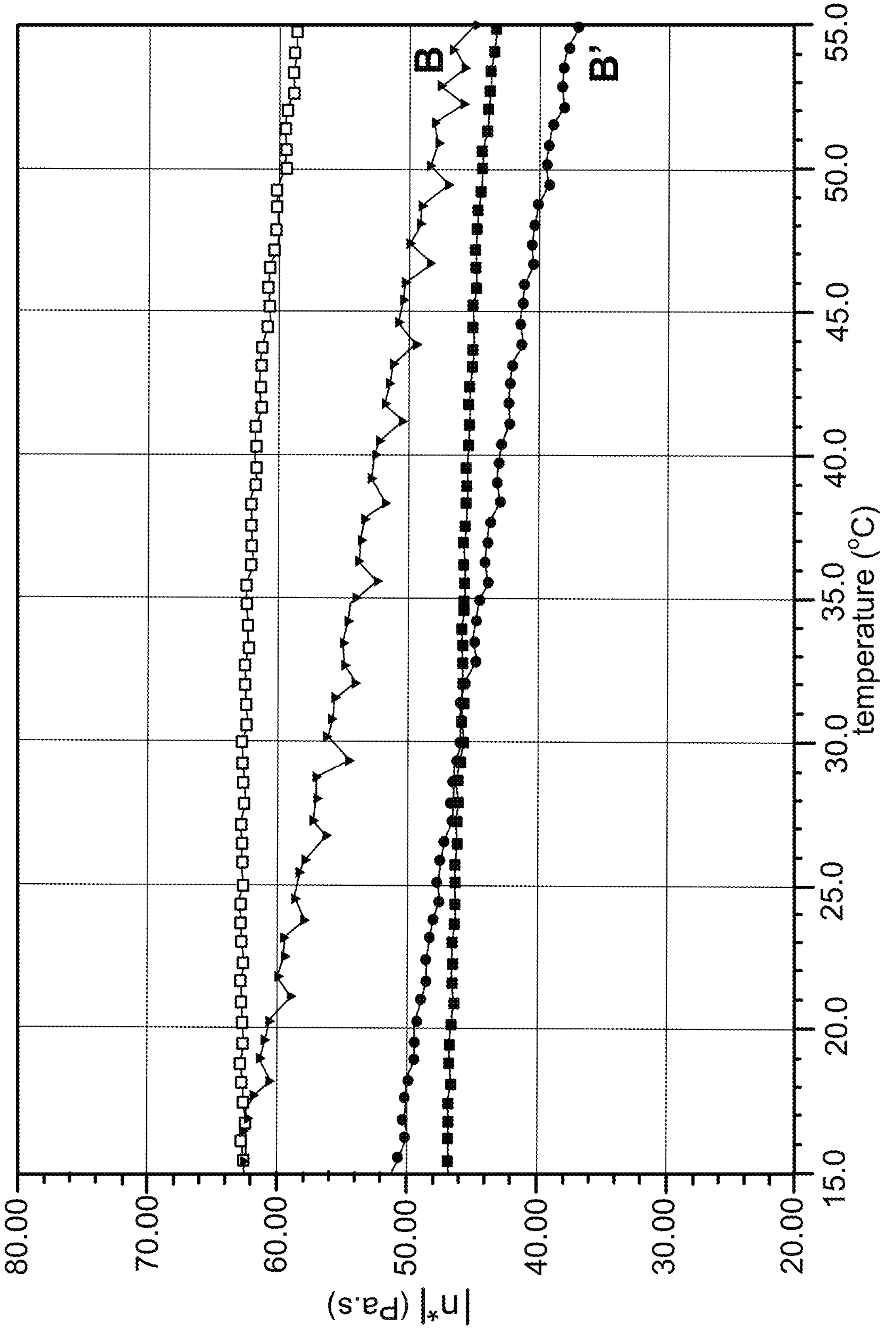
FIG. 11 is a graph showing the thermos-viscous profile of a commercially available composition (Benchmark A), denoted A and A', and an example liquid dispersion composition 9H, denoted B and B', for samples before and after thermal exposure at 55° C. for 155 hours.

In some implementations, a beneficial aspect of the liquid dispersion compositions disclosed herein is related to the thermal properties and stability. It is desirable for compositions suitable for lubrication or water swellable grease applications to have stability over a broad temperature range. Specifically, phenomena such as syneresis, separation, viscosity reduction or other physicochemical effects at elevated temperatures are undesirable. Conversely, resistance to phase separation during freeze-thaw cycling is desirable. In some implementations, liquid dispersion compositions disclosed herein can have superior resistance to thermal cycling, especially at elevated temperatures. FIG. 11 illustrates resistance of the composition 9H, denoted as B (unexposed) and B' (heat-exposed), to thermal degradation compared to the industry Benchmark denoted by A (unexposed) and A' (heat-exposed).

The example liquid dispersion composition 9H and the industry Benchmark were stored at 55 C for 155 hours to evaluate the impact of prolonged heat exposure on rheological properties of samples. Subsequently, all samples were evaluated on a TA instruments rheometer (AR 1000-N) equipped with a 40 mm parallel plate at a 1500-micron gap, at 1 Hz with 1% oscillatory stain, and a 3 C/min temperature scan from 5 to 55 C to determine the complex viscosity of the samples both pre and post thermal exposure. The temperature scan can be useful to evaluate the impact of thermal exposure at elevated temperatures and evaluate the thermal memory effects of the materials to inform stability. The viscosity profile over the test conditions for the Benchmark composition before thermal exposure is shown by curve A and post thermal exposure is shown by curve A'. Likewise, the viscosity profile of example composition 9H before thermal exposure is shown by curve B and post thermal exposure is shown by curve B'.

It can be useful to consider the change in the magnitude of the viscosity at 15 C and 55 C for each set of viscosity curves for the test materials. In doing so, the relative thermal stability of the materials is compared and contrasted so that the impact of thermal treatment on the rheology properties can be assessed. In this regard, the thermal exposure sensitivity of a composition can be determined and compared to the benchmark product. As such, the difference between the pre and post thermally treated sample at both 15 C and 55 C provides a relative comparative metric for thermal stability. For example, the benchmark material has the following complex viscosity values at 15 C for pre and post thermally treatment as denoted by A and A' respectively: pre thermally treated complex viscosity of A at 15 C is 62.5 Pa·s and post thermally treated complex viscosity of A' at 15 C is 46.7 Pa·s for a difference of 15.8 Pa·s. In a similar manner at 55 C, A is 58.8 Pa·s and A' is 43.4 for a difference of 15.4 Pa·s.

In some implementations, it can be useful to compare the relative ratio of the difference in the complex viscosity of each temperature. For example, Ratio A is 15.4/15.8 or 0.98. Similarly for composition 9H, pre thermally treated complex viscosity of B at 15 C is 63.4 Pa·s and post thermal treatment complex viscosity of B' is 51.0 Pa·s for a difference of 12.4 Pa·s. At 55 C, the pre thermal treatment complex viscosity of B is 45.0 Pa·s and the post thermal treatment complex viscosity B' is 37.3 Pa·s for a difference of 7.7. Therefore, the Ratio B is 7.7/12.4 is 0.62. A lower Ratio value is indicative of preferred thermal stability characteristics. Liquid dispersion compositions disclosed herein can have a lower Ratio value than the benchmark product demonstrating further utility and superior performance.

Example 11. Determination of Slip Characteristics of Example Coatings Formed from Liquid Dispersion Compositions An example utility of the liquid dispersion compositions disclosed herein can be determined by measuring the reduction in frictional forces between proximal surfaces separated by a thin layer of the composition. In this manner, compositions disclosed herein can be compared to the benchmark product. In some implementations, it is useful to estimate the reduction in frictional forces between surfaces that are classified as high energy and low energy. Polyethylene terephthalate films can be useful to approximate high energy surfaces while high density polyethylene films can be useful to approximate lower energy surfaces. A coefficient of friction tester instrument (Qualitest MXD-02) was used according to a modified ASTM-D 1894-95 method to determine the force required to slide the proximal surfaces over each other, wherein is placed a 500 g/m$^2$ quantity of the Benchmark material and compositions, described herein using polydimethyl siloxane and paraffinic oils as the granular SAP dispersion medium, were placed between the contact film surfaces (6.25 in$^2$) prior to analysis. The normal force between the contact surface of the film was about 0.1N. The average resistance to sliding force, using five consecutive sliding tests, was determined for all samples applied between the films with high and low energy surfaces. A useful approximation of frictional resistance can be defined as the inverse of resistance also known as slip and further normalized to the performance of the Benchmark material. In this manner, a relative comparison of slip can be made, wherein higher values have greater slip. Table 10 summarized the results from the evaluation of the Benchmark product, compositions comprising polydimethyl siloxane, and compositions containing paraffin oil as the primary dispersion medium of the granular SAP powder.

TABLE 10

Summary of relative Slip characteristics of a benchmark product and example liquid dispersion compositions disclosed herein. Data is normalized with respect to the Benchmark product performance on PET films and denoted as unity.

| Composition | PET Film | HDPE Film |
|---|---|---|
| Benchmark | 1.0 | 1.61 |
| PDMS based compositions | 2.56 | 4.35 |
| Paraffinic Oil based compositions | 2.08 | 4.35 |

The data indicate that compositions disclosed herein have a superior slip characteristic compared to an industry benchmark product across all film types. Without wishing to be bound by theory, it is believed that the nature of the hydrocolloid SAP material in conjunction with the non-aqueous liquid(s), such as but not limited to siloxane and hydrocarbon oils, the surface active agent, and other additives create a unique hydrocolloid stabilized oil in water emulsion that has superior lubricity on high and low energy surfaces.

Example 12. Example Liquid Dispersion Composition

A first liquid included 72 weight percent linear polydimethyl siloxane, 25 weight percent granular SAP powder wherein the $D_v(90)/D_v(10)$ value is about 2.6, surface area is about 230 m$^2$/kg, and absorption is about 320 to 450 g/g in deionized water, and 3 weight percent (x)-sorbitan mono-9-octadecenoate poly(oxy-1,2-ethanediyl); and a second liquid comprised 99.73 weight percent water, 0.16 weight percent propylene glycol, 0.023 weight percent linear acrylate copolymer, and 0.087 weight percent biocide, wherein the liquid dispersion composition included 1.3 weight percent of first liquid and 98.7 weight percent of the second liquid. The liquid dispersion composition had a viscosity of about 750 cP at 25° C. and 1 1/s shear rate.

Example 13. Example Liquid Dispersion Composition

A first liquid component included about 30 wt. % to about 60 wt. % of a liquid plastisol film former, capable of polymerization, and about 40 wt. % to about 70 wt. % granular SAP powder. The granular SAP powder had a $D_v(90)/D_v(10)$ value of about 2.6, a surface area of about 230 $m^2/kg$, and an absorption of about 320 to 450 g/g in deionized water. The second liquid component included 50 to 99 weight percent mineral oil and 1 to 50 weight percent (x)-sorbitan mono-9-octadecenoate poly(oxy-1,2-ethanediyl). The liquid dispersion composition included 50 to 99 weight percent of the first liquid component and 1 to 50 weight percent of the second liquid component. The incorporation of the plastisol film former in the liquid dispersion composition imparted desirable mechanical durability to the films made from the composition. As a non-limiting example, the plastisol film former can be thermally polymerized.

Example 14. Example Liquid Dispersion Composition

A general formulation for a liquid dispersion composition is described in Table 11 as a non-limiting example.

TABLE 11

Formulation component ranges for an example liquid dispersion composition

| Component | Weight percent range |
|---|---|
| Granular SAP powder | 0.1-80 |
| Liquid 1 | 1-99 |
| Liquid 2 | 5-99 |
| Surface active agent | 0.01-50 |
| Functional Additives | 0-50 |
| Film Formers | 0-30 |

Example 15. Liquid Dispersion Composition 15A Including Polyisobutene

Figure 12A:
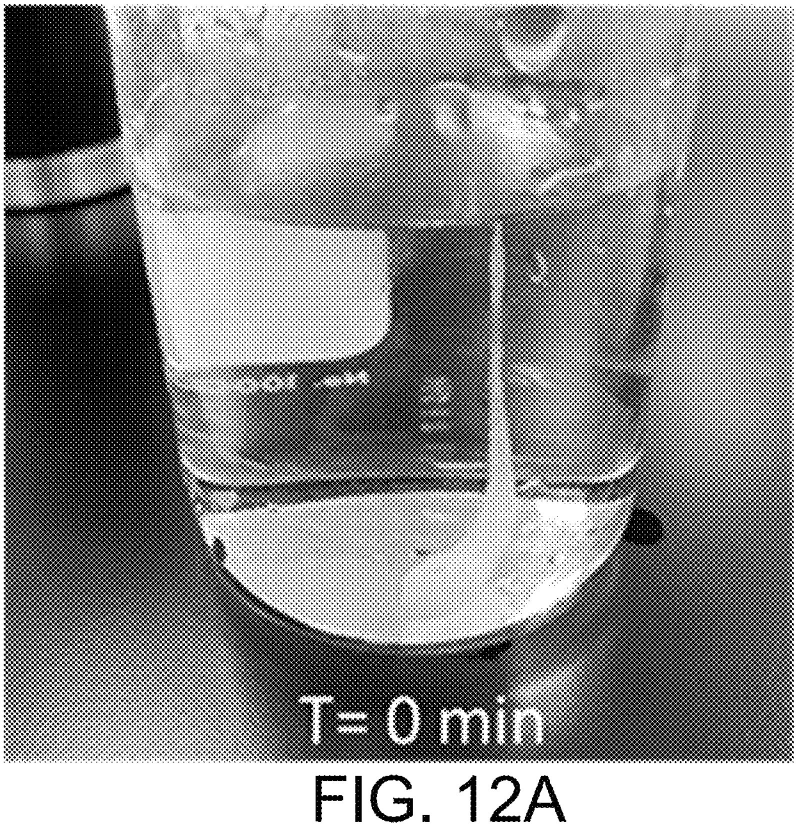
FIG. 12A is an image showing the initial placement of example liquid dispersion composition 15A in tap water.
Figure 12B:
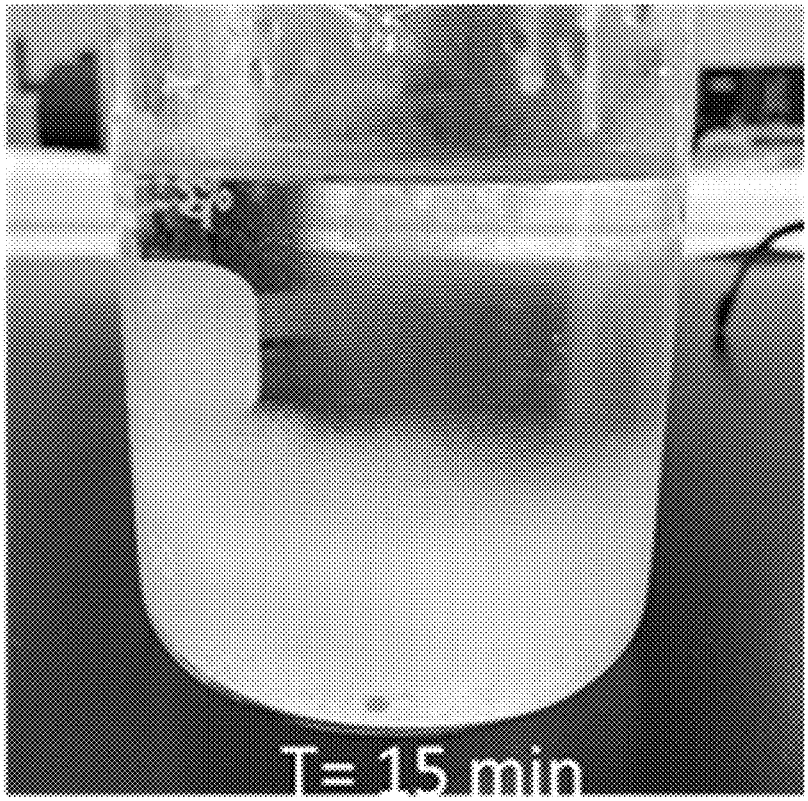
FIG. 12B is an image showing the swelling behavior of composition 15A after 15 minutes in tap water.

A non-limiting example composition 15A included about 59 weight percent polyisobutene hydrocarbon having a viscosity of about 400,000 cP at 25C and shear rate of 1 reciprocal second, about 40 weight percent granular SAP powder having a D(90)/D(10) ratio from about 3 to 8, and about 1 weight percent (x)-sorbitan mono-9-octadecenoate poly(oxy-1,2-ethanediyl). The composition was mixed unit uniform at 100C where in the viscosity of the composition was about 1,100,000 cP at 25C and shear rate of 1 reciprocal second. FIGS. 12A and 12B illustrate the absorption characteristics of composition 15A when exposed to tap water. FIG. 12A shows the initial placement of the composition in tap water and FIG. 12B shows the unexpected rapid absorption and subsequent gel after about 10 minutes. Composition 15A demonstrated the ability to modify the rheological and melt flow properties of a filled SAP polymer composite while achieving desirable water swellable properties useful for water blocking and absorption applications.

Example 16. Example Liquid Dispersion Composition

A first liquid component included about 20 to 95 weight percent of a liquid polydimethyl siloxane polymer of about 500 cSt viscosity (25° C.), about 0.1 to 10 weight percent of a silica additive, and about 4.9 to 70 weight percent of a granular SAP powder. The granular SAP powder had a $D_v(90)/D_v(10)$ value of about 2.6, a surface area of about 230 $m^2/kg$, and an absorption of about 320 to 450 g/g in deionized water. A second liquid component included (x)-sorbitan mono-9-octadecenoate poly(oxy-1,2-ethanediyl). The liquid dispersion composition included about 49 to 99.5 weight percent of the first liquid component and about 0.5 to 51 weight percent of the second liquid component. The composition exhibited excellent substrate wetting, water swelling properties, desirable gel properties, and an absorption capacity of about 100 to about 350 g/g in deionized water.

Example 17. Example Water Dispersible Lubricant Concentrates

The compositions according to Tables 12A and 12B are made in the following manner. A paraffinic oil such as a 90SUS, 100SUS, 325SUS, 500SUS or 2,000SUS white oil or a silicone oil such as polydimethyl siloxane 100 cSt, 325 cSt, 500 cSt, or 1000 cSt is placed in a suitable container wherein a non ionic surfactant such as (x)-sorbitan mono-9-octadecenoate poly(oxy-1,2-ethanediyl), propylene glycol, and an optional additive such as silica or film formers are added under mixing conditions. A granular SAP powder is added to the mixture under high shear to form a dispersion capable of self-emulsification when in contact with water.

TABLE 12A

Compositional ranges for components that comprise the water dispersible lubricant concentrate.

| Component | Composition Range wt % |
|---|---|
| Granular SAP powder | 2-75 |
| Surfactant | 0.5-20 |
| Polyols | 0.5-95 |
| Oil ( hydrocarbon or silicone) | 5-95 |
| Additives | 0-10 |

TABLE 12B

Compositional ranges for components that comprise the water dispersible lubricant concentrate.

| Component | Composition Range wt % |
|---|---|
| Granular SAP powder | 5-75 |
| Surfactant | 0.5-20 |
| Polyol (propylene glycol) | 0.5-95 |
| Oil ( hydrocarbon or silicone) | 5-95 |
| Additives | 0-10 |

Example 18. Absorption of Free Water from Soil Using Liquid Dispersion Compositions The US EPA 9095B Paint Filter Liquids Test method was used as a screening methodology to determine effective ranges for comparison of absorption of free (or excess)

water in analogy to normal soil tests. As soil types vary widely (including combinations of coarse-grained sands and gravels, fine-grained silts and clays, and highly organic/peat), grouped tests were completed with matching soil samples of similar moisture content, (e.g., samples made with wet topsoil or similar soil samples) for free (or excess) water absorption comparisons of the absorptive liquid dispersion compositions at different addition amounts. The Unified Soil Classification System (USCS) or other soil classification systems can also be used for classification of the water-wet soil samples used with the paint filter liquids screening test.

For screening of liquid dispersion compositions at various addition amounts (dosage) in analogy to normal soil tests, composition analysis (about seven parameters for substance analysis) and water-soluble constituents (about twenty parameters for eluate analysis DIN EN 12457-4 in accordance with DIN 38 414, Part 4) were performed and the results compared with the classification requirements of the German Landfill Ordinance Deponieneverordnung-DepV (DepV). The total dissolved solids (TDS) was identified as a parameter for the selection of liquid medium (e.g., propylene glycol) for the liquid dispersions. The liquid medium's contribution to the total composition overall TDS measurement can readily affect the amount of superbsorbent polymer (SAP) that can be ultimately used in the liquid dispersion composition. In some implementations, selection of a suitable liquid medium, with minimal contribution to the TDS measurement, allows for the liquid dispersion composition's TDS to remain at or less than allowable or allocation value range (e.g., DepV DK 0 allocation value for TDS is equal to or less than 400 mg/liter).

Example 19. Example Liquid Dispersion Compositions

The compositions according to Tables 13 and 14 are made in the following manner. The following are placed in a suitable container: propylene glycol (PG), a non-ionic surfactant such as (x)-sorbitan mono-9-octadecenoate poly (oxy-1,2-ethanediyl), paraffinic oil (such as a 90SUS, 100SUS, 325SUS, 500SUS or 2,000SUS white oil) or a silicone oil (such as polydimethyl siloxane 100 cSt, 325 cSt, 500 cSt, or 1000 cSt), and optional additives such as silica, bentonite, other functional additives, or film formers are added under mixing conditions. A granular SAP powder is added to the mixture under high shear to form a dispersion that was found to be capable of self-emulsifying characteristics when in contact with water.

As a non-limiting example, a granular SAP powder such as having a Dv(90)/Dv(10) value of about 2.8, a (Dv(90)−Dv(10))/Dv(50) value of about 1.1, specific surface area of about 94.4, and D[3,2], D[4,3] of about 52 microns and 60 microns respectively loaded at about 60 to 66 percent by weight in about 33 to 39 percent by weight propylene glycol with suitable non-ionic surfactants with high HLB (HLD) and suitable oil additives promoted a rapid and efficient water swelling (water uptake) response of the granular SAP powder when exposed to nascent (excess or free) water.

TABLE 13

Compositional ranges for components that comprise the example liquid dispersion compositions.

| Component | Composition Range wt % |
|---|---|
| Granular SAP powder | 5-80 |
| Surfactant | 0.5-20 |
| Polyol (propylene glycol) | 0.5-90 |
| Oil (hydrocarbon or silicone) | 0-1.0 |
| Additives | 0-10 |

TABLE 14

Compositional ranges for components that comprise the example liquid dispersion compositions.

| Component | Composition Range wt % |
|---|---|
| Granular SAP powder | 60-66 |
| Surfactant | 0.8-1.0 |
| Polyol (propylene glycol) | 32-40 |
| Oil (hydrocarbon or silicone) | 0.1-1.0 |
| Additives | 0-10 |

In some implementations, the partial solubility of a suitable non-ionic surfactant such as (x)-sorbitan mono-9-octadecenoate poly(oxy-1,2-ethanediyl) with a relative energy difference (RED) of about 1 combined with a small amount of a water insoluble and propylene glycol insoluble oil (RED greater than 1), was sufficient to provide an effective self-emulsifying characteristic of the dispersion for an efficient inversion response. In some implementations, exposure of the liquid dispersion composition to nascent (excess or free) water was found to activate the composition to quickly absorb the nascent water.

Example 20. Rheological Properties of Example Liquid Dispersion Compositions Comprising Propylene Glycol In Examples 20 and 21, "liquid dispersion" refers to the use of a suitable surfactant resulting in the dispersion of a granular SAP in a liquid medium with subsequent surfactant wetting characteristics and significant emulsifying capabilities; "liquid mixture" refers to a granular SAP mixed with a liquid medium without the use of a suitable surfactant and without surfactant wetting and emulsifying enhancements. "SAP water uptake efficiency" refers to the ratio of the water uptake (water absorption) of the SAP amount in the composition to the water uptake (water absorption) of an equivalent amount of dry granular SAP powder (normalized as 100%). SAP water uptake efficiency) can be expressed as a percentage whereby less than 100% implies degraded (reduced or hindered) SAP water uptake performance, greater than 100% implies enhanced (improved or assisted) SAP water uptake performance, and 100% implies equivalent (unaffected or similar) SAP water uptake performance compared to dry granular SAP water uptake performance.

Figure 14:
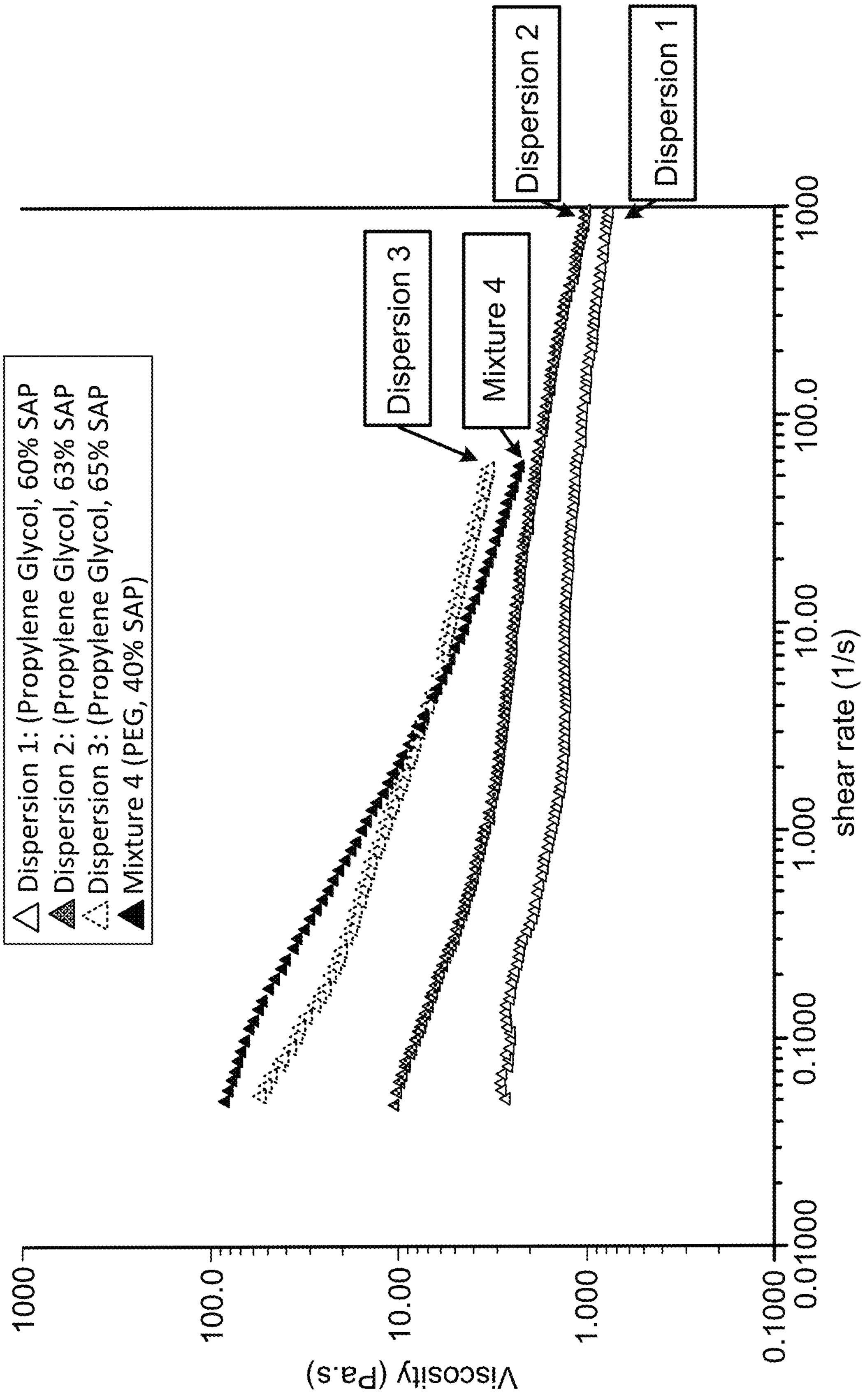
FIG. 14 is a graph showing viscosity shear-rate curves for compositions with different liquid mediums and solids contents.

The rheological properties shown in the viscosity-shear rate flow curves of FIG. 14 show that example liquid dispersion compositions comprising propylene glycol (e.g., compositions of Example 19) are suitable for pumping, brushing, mixing, stirring, drip coating, spraying, and similar deployment methods of the liquid dispersion compositions over a wide range of shear rates. Also included in FIG. 14 is a composition made with 40% SAP by weight and 60 percent polyethylene glycol (PEG) polymeric liquid carrier showing high viscosities at lower shear rates (less than about 1 $s^{-1}$) due to the PEG liquid medium (with only 40% SAP content) when compared to the liquid dispersion compositions comprising propylene glycol with higher SAP content (up to 65% SAP content).

As a non-limiting example, Table 15 shows viscosity at selected shear rates for the liquid dispersion compositions comprising propylene glycol and high SAP loadings (i.e., dispersed with suitable surfactants) in contrast to a lower SAP loaded PEG based liquid mixture (i.e., mixture without suitable surfactant). In Table 15, the significant contribution of the liquid medium type on the viscosity of a particular composition is illustrated and shows the substantially lower viscosity of the compositions comprising propylene glycol (even though at higher SAP content) than the composition comprising PEG (even though at lower SAP content). In some implementations, high viscosity can readily affect or limit the deployment methods that can be used to implement liquid compositions (i.e., requiring more power for mixing, pumping, etc. at higher viscosities).

TABLE 15

Viscosity (Pa-s) at Selected Shear-rates (1/s) for Various Compositions

| Description: Glycol Liquid, Granular SAP Wt % | 0.05 $s^{-1}$ | 0.5 $s^{-1}$ | 5 $s^{-1}$ | 50 $s^{-1}$ | 500 $s^{-1}$ |
|---|---|---|---|---|---|
| Dispersion 1: Propylene Glycol, 60%S AP; w/surf. | 2.78 | 1.86 | 1.32 | 1.14 | 0.85 |
| Dispersion 2: Propylene Glycol, 63% SAP; w/surf. | 10.66 | 4.36 | 2.65 | 1.91 | 1.19 |
| Dispersion 3: Propylene Glycol, 65% SAP; w/surf. | 55.82 | 15.93 | 6.45 | 3.45 | n.d. |
| Mixture 4: Polyethylene Glycol (PEG), 40% SAP | 86.09 | 24.92 | 6.28 | 2.40 | n.d. |

Table 15 shows that including a suitable surfactant (high HLB), especially with a suitable polar medium such as propylene glycol, can readily overcome liquid mixture deficiencies. The implementation of a low viscosity liquid medium such as propylene glycol in combination with a suitable surfactant was found to be sufficient for the liquid dispersion compositions to overcome the deficiencies of liquid mixtures, especially those comprising nonpolar polymeric liquid medium such as PEG mixed with granular SAP (without a suitable surfactant). Without wishing to be bound by any particular theory, liquid mixtures using a nonpolar medium without a suitable surfactant can severely limit (degrade or hinder) the amount of granular SAP that can be used due to high viscosities evident at low to moderate SAP content in the liquid mixtures. Lower amounts (and lower efficiency) of the SAP content in liquid mixtures limits water uptake and results in higher dosage levels needed to absorb nascent (free or excess) water by the liquid mixture. In liquid dispersion compositions, higher water uptake can be achieved with higher amounts (and higher efficiency) of SAP content in liquid dispersion compositions at lower viscosities than the liquid mixture. As described previously in Equation (1), it is believed that suitable (e.g., high HLB) surface active agents can preferentially absorb to the surface of the granular SAP powder, thus reducing the particle-particle interaction that can otherwise give rise to a higher viscosity of the liquid compositions with high SAP content. In some implementations, the addition of a suitable surface active agent improves relatively the water uptake efficiency of both polar and nonpolar liquid mediums (e.g., propylene glycol and PEG).

Example 21. Water Absorption Performance of Example Liquid Dispersion Compositions Comprising Propylene Glycol Without wishing to be bound by theory, it is believed that water absorption performance can be related to the diffusion of water through the liquid medium due primarily to the surfactant response when present in the liquid compositions upon contact with nascent (excess or free) water by the granular superabsorbent polymers (granular SAP). For example, emulsion characteristics can include a quick emulsion inversion response. In some implementations, water absorption performance appears to be significantly impacted and improved by the presence of a surfactant having a high HLB (HLD). In some implementations, the inclusion of a suitable surfactant (with emulsifying characteristics) in the liquid dispersion composition provides significant improvement of the water swell (water uptake) performance of the liquid dispersion compositions.

Table 16 shows normalized data from a cylindrical swell cup and plunger test apparatus of known diameter that measures swell height and calculated volume of an absorbent coating composition per time based on a suitable test solution (e.g., deionized or DI water) of known density. The results in Table 16 are given in gram of water absorption (uptake) per gram of SAP content in the sample composition (normalized by dry granular SAP100% as unity). The results show that a SAP/PEG liquid mixture without a suitable surfactant yields a lower DI water uptake (DI water absorption) performance than SAP/Propylene Glycol liquid dispersion compositions having a suitable surfactant. The SAP/PEG mixture has a lower granular SAP water uptake efficiency at 1 minute, at 3 minutes and at maximum water uptake (at longer times) in comparison to the higher granular SAP water uptake efficiency for the SAP/Propylene Glycol liquid dispersion compositions with a suitable surfactant.

TABLE 16

Apparent SAP Water Uptake Efficiency in DI Water

| Sample ID | SAP Content | At 1 minute | At 3 minutes | At Max Uptake |
|---|---|---|---|---|
| SAP100% | 100.0% | 100% | 100% | 100% |
| PG, SAP65%, surf. | 65.2% | 82% | 116% | 104% |
| PG, SAP63%, surf. | 63.0% | 116% | 136% | 107% |
| PG, SAP60%, surf. | 60.0% | 133% | 151% | 111% |
| PG, SAP58%, surf. | 58.0% | 70% | 98% | 102% |
| PEG, SAP40% | 40.0% | 12% | 24% | 53% |

The SAP water uptake efficiency of the liquid dispersions appeared to be unaffected and possibly enhanced (i.e., greater than 100% of SAP content basis), especially during initial water uptake (at 1 minute and at 3 minutes) by the Propylene Glycol with suitable surfactant. However, the SAP water uptake efficiency of the liquid mixture appeared to be somewhat degraded (i.e., less than 100% of SAP content basis) in DI water uptake performance by the polyethylene glycol (PEG) polymer liquid medium. Without wishing to be bound by theory, the polar propylene glycol, with high osmostic pressure and significant hydrogen bonding potential with water, when combined with one or more suitable high HLB surfactants likely contributes to quick wetting and high gel bed permeability for rapid phase inversion of the liquid dispersion compositions and the enhanced SAP water uptake efficiency upon exposure to water shown in Table 16.

The twenty-seven analytical DepV parameters were studied, and total dissolved solids (TDS) was found to be an important DepV parameter for achieving the DK 0 classification of the German Landfill Ordinance (DepV). The relationship between SAP content and maximum total dissolved solids (TDS) expected to be contributed solely by the SAP content was found and described by the following Equation (4) which follows a power law (with a coefficient of 5321.1 and exponent of 0.6451).

$$TDS_{SAP}=5321.1(SAP\text{wt }\%)^{0.6451} \quad \text{Equation (4)}$$

Other power law relationships were found and described between SAP content and expected average TDS (coefficient of 4420.6 & exponent of 0.6277) and between SAP content and expected minimum TDS (coefficient of 3430.8 & exponent of 0.5968). The relationship described in Equation 4 gives a conservative analytical model for the SAP content at about 1.81% by weight (a SAPwt % value of 0.0181) being expected to contribute a maximum TDS about 400 mg/liter as a non-limiting example. Note that 400 mg/liter is equal to the DK 0 allocation value in its entirety (here being attributed completely and solely to the SAP content at about 1.81% by weight).

Figure 15:
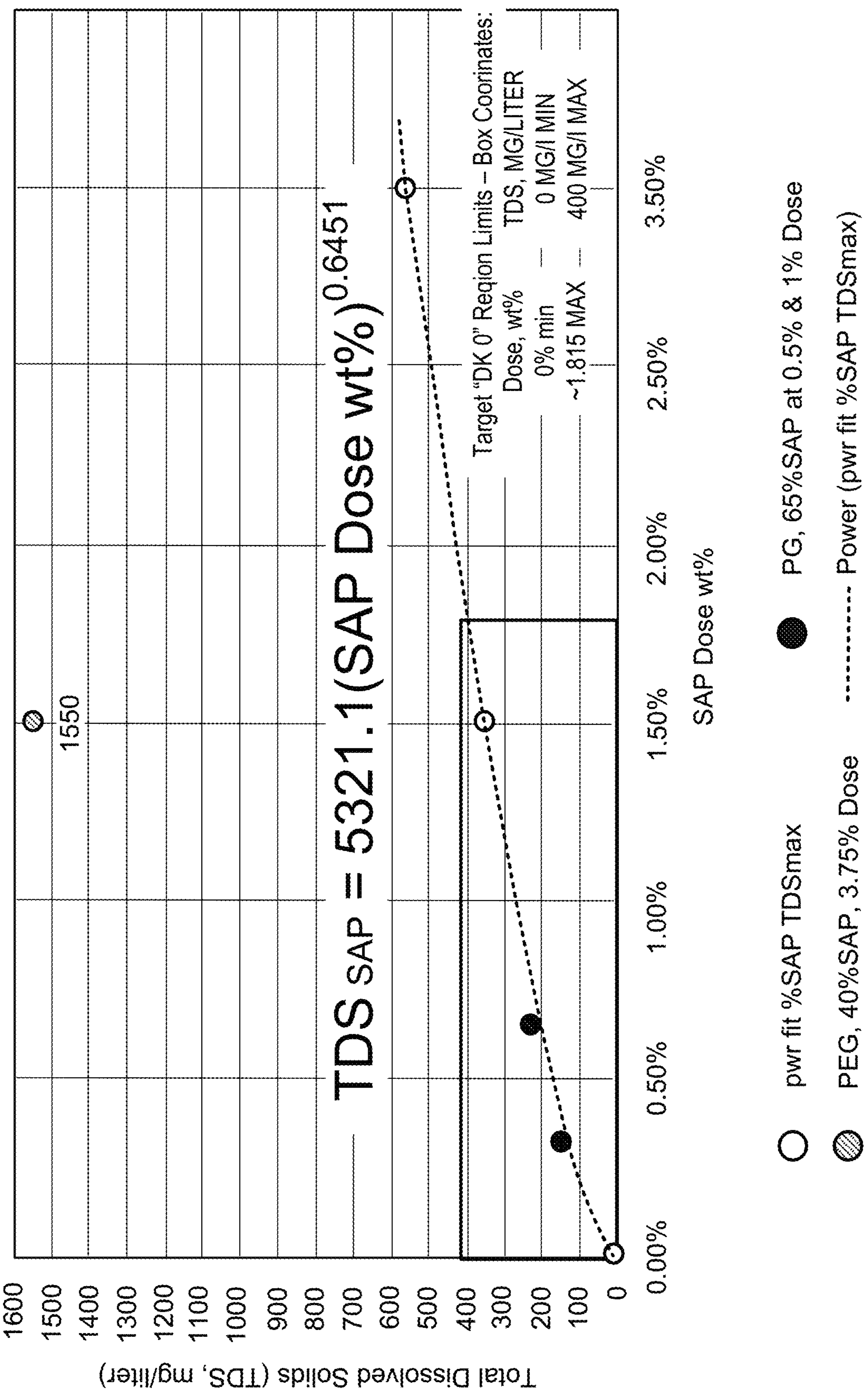
FIG. 15 is a graph showing SAP dose wt. % versus total dissolved solids for sample compositions comprising propylene glycol or polyethylene glycol.

In some implementations, liquid components having a low TDS contribution to the overall TDS allow for the whole liquid dispersion composition's TDS to not surpass the targeted allowable (DK 0 allocation value) of 400 mg/liter as a non-limiting example. Accurate TDS measurements can be acquired by thoroughly mixing and blending the components in the dry blends or the liquid dispersion compositions together just prior to the TDS testing. In some implementations, candidate liquid mediums, such as those comprising propylene glycol, yielded essentially negligible TDS contributions to the overall TDS. In some implementations, liquid polymer solutions such as polyethylene glycol (PEG) yield significantly higher TDS contributions. Without wishing to be bound by theory, TDS contributions may arise from the higher molecular weight and broader MW distribution as PEG is a multi-unit nonpolar polymer liquid whereas propylene glycol is a small, single polar molecule (i.e., a double alcohol). Macrogols (such as PEG) and propylene glycol are synthetic substances that have dissimilar chemical structures. FIG. 15 shows the plot of Equation (4) and the total TDS values measured for 100% dry granular SAP at about 1.5% and 3% effective SAP dose rates, 40% SAP in PEG liquid mixture at about 1.5% effective SAP dose rate, and 65% SAP in propylene glycol liquid dispersion at about 0.33% and 0.65% effective SAP dose rates. Also, a TDS target for the "DK 0" TDS of less than or equal to 400 mg/L is depicted as described by Equation (4), as a non-limiting example, for the maximum expected TDS value of 400 mg/L at about 1.81% calculated effective SAP dose rate. In some embodiments, when the TDS contribution from a suitable liquid medium is negligible, the SAP content can be increased to provide improved water uptake characteristics of the liquid dispersion composition. As such, a "DK 0" target region can be plotted, illustrated in FIG. 15 with rectangular box coordinates of 0% and 1.81% SAP Dose wt. % and 0 and 400 mg/L TDS values, inclusive. The TDS values for the two liquid dispersion compositions are shown at 150 mg/L and 230 mg/L (at less than 400 mg/L or inside the "DK 0" target box) whereas the TDS value for the liquid mixture composition is shown at 1550 mg/L (at more than 400 mg/L or outside the "DK 0" target box).

In some implementations, a liquid component provides a total TDS value for the liquid dispersion composition that is similar to the TDS value for SAP alone as described in Equation 4 (i.e., the liquid component does not add significantly to the total TDS value for its liquid dispersion composition).

Example 22. Liquid Dispersion Compositions

Example liquid dispersion compositions are provided in Tables 17-21 that can provide an absorbent coating, for example, for a plastic trash bag. The example compositions in Tables 17-21 were prepared by adding all liquid components and mixing well, followed by adding silica and the superabsorbent polymer (SAP) during mixing. High shear force was used to disperse the powder in the liquid evenly.

TABLE 17

Example Liquid Dispersion Composition 22A

| Component | Weight Percentage (%) |
|---|---|
| SAP | 59.0 |
| 100 SUS white mineral oil | 37.75 |
| Polysorbate 80 (Tween 80) | 2.25 |
| Silica | 1.0 |

TABLE 18

Example Liquid Dispersion Composition 22B

| Component | Weight Percentage (%) |
|---|---|
| SAP | 59.0 |
| 100 SUS white oil | 27.9 |
| 325 SUS white oil | 3.1 |
| Polysorbate 80 | 3.0 |
| Polysorbate 20 | 0.5 |
| PEG 200 | 6.0 |
| Silica | 0.5 |

TABLE 19

Example Liquid Dispersion Composition 22C

| Component | Weight Percentage (%) |
|---|---|
| SAP | 59.0 |
| 100 SUS white oil | 27.9 |
| 325 SUS white oil | 3.1 |
| Polysorbate 80 | 3.0 |
| Polysorbate 20 | 0.5 |
| PEG 300 | 2.0 |
| PEG 600 | 4.0 |
| Silica | 0.5 |

TABLE 20

| Example Liquid Dispersion Composition 22D | |
|---|---|
| Component | Weight Percentage (%) |
| SAP | 59.0 |
| 100 SUS white oil | 33.12 |
| 325 SUS white oil | 3.68 |
| Polysorbate 80 | 3.5 |
| Polysorbate 20 | 0.7 |

TABLE 21

| Example Liquid Dispersion Composition 22E | |
|---|---|
| Component | Weight Percentage (%) |
| SAP | 59.0 |
| 100 SUS white oil | 26.55 |
| 325 SUS white oil | 2.95 |
| Polysorbate 80 | 2.5 |
| Polysorbate 20 | 0.5 |
| PEG 300 | 8.0 |
| Silica | 0.5 |

In some implementations, the SAP in Tables 17-21 refers to AQUA KEEP 10SH-NFC (Kobo Products, Inc.), which is a very fine spherical SAP. In some implementations, the silica in Tables 17-21 is precipitated silica, e.g., Sipernat® 22LS.

Example 23. Determination of Viscous Drag Characteristics of Example Lubricants Formed from Liquid Dispersion Compositions Applied torque force (micro N-m) versus velocity range (from 0.01 to 1.0 radians/second) was measured, for two example compositions (Examples 23 M and 23H) of the present disclosure and four reference products, at 25° C. on a TA Instruments AR 1000-N shear rheometer using 40 mm diameter parallel plate geometry and a 1.2 mm sample height.

Figure 16:
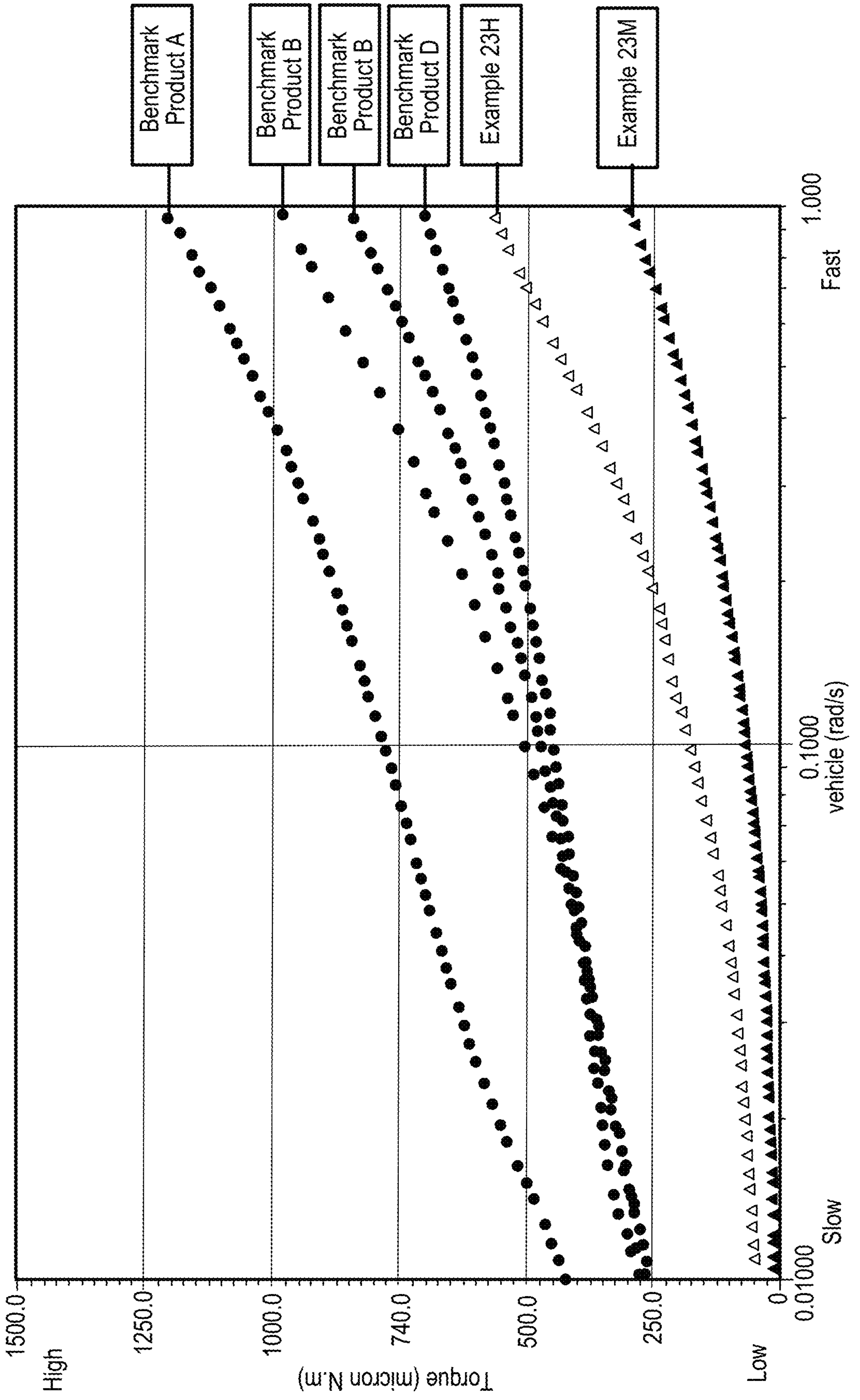
FIG. 16 is graph showing applied torque vs. velocity for two liquid dispersion lubricant compositions (Examples 23 M & 23 H) and four benchmark products (reference only).

FIG. 16 shows a significantly lower applied torque force (lower effective viscous drag) versus velocity for two liquid dispersion lubricant compositions dispersed in water, Examples 23 M (medium viscosity) and 23 H (high viscosity), than for four Benchmark Products A-D (for reference only). Benchmark Products A-D are available commercial products that are widely used in the cable installation marketplace.

Each reference, including all patent, patent applications, and publications, cited in the present application is incorporated herein by reference in its entirety.

What is claimed is:

1. A liquid dispersion composition comprising a granular superabsorbent polymer dispersed in a liquid medium, wherein:

the granular superabsorbent polymer is present in the composition from about 10% to about 80% by weight; and the liquid medium comprises at least two liquid components, wherein at least one of the liquid components is insoluble with the other liquid components, and the liquid medium comprises a first liquid component and a second liquid component.

2. The liquid dispersion composition of claim 1, wherein the granular superabsorbent polymer comprises an acrylate polymer.

3. The liquid dispersion composition of any one of claim 1, wherein the insolubility of the at least one liquid component with the other liquid components is determined by Hansen solubility parameters, wherein the relative energy difference (RED) of the at least one liquid component and the other liquid components is equal to or greater than 1.

4. The liquid dispersion composition of claim 1, wherein the first liquid component comprises a silicon-containing liquid, a hydrocarbon liquid, or a fluorocarbon liquid.

5. The liquid dispersion composition of claim 4, wherein the silicon-containing liquid comprises a silicone, organosilicone, silane, siloxane, or organosilane.

6. The liquid dispersion composition of claim 4, wherein the hydrocarbon liquid is paraffinic oil or polyisobutene.

7. The liquid dispersion composition of claim 1, wherein the second liquid component comprises a surface active agent, a polyol, an ester, an alkylene glycol, water, an alcohol, or a combination thereof.

8. The liquid dispersion composition of claim 1, wherein the liquid dispersion composition comprises one or more surface active agents.

9. The liquid dispersion composition of claim 8, wherein the liquid dispersion composition comprises at least one surface active agent that is different from the first liquid component and the second liquid component.

10. The liquid dispersion composition of claim 9, wherein the at least one surface active agent that is different from the first liquid component or the second liquid component is present in the composition from about 0.01% to about 50% by weight, about 0.1% to about 10% by weight, about 0.1% to about 5% by weight, or about 0.5% to about 2% by weight.

11. The liquid dispersion composition of claim 8, wherein at least one of the one or more surface active agents is a polysorbate.

12. The liquid dispersion composition of claim 1, further comprising one or more additives.

13. The liquid dispersion composition of claim 12, wherein the one or more additives comprise polyethylene glycol.

14. The liquid dispersion composition of claim 1, wherein the liquid dispersion composition has a water absorption capacity of at least about 10 grams of water per gram of liquid dispersion composition, at least about 20 grams of water per gram of liquid dispersion composition, or at least about 50 grams of water per gram of liquid dispersion composition.

15. The liquid dispersion composition of claim 1, wherein the liquid dispersion composition forms an oil-in-oil emulsion, suspension, oil-in-water emulsion, water-in-oil emulsion, or a combination thereof.

16. The liquid dispersion composition of claim 15, wherein the liquid dispersion composition forms a multiphase emulsion.

17. The liquid dispersion composition of claim 1, wherein the granular superabsorbent polymer is present in the composition from about 30% to about 70% by weight, about 40% to about 65% by weight, or about 40% to about 50% by weight.

18. The liquid dispersion composition of claim 1, wherein the first liquid component is present in the composition from about 0.1% to about 99% by weight, about 1% to about 99% by weight, about 1% to about 10% by weight, about 10% to about 80% by weight, about 20% to about 60% by weight, about 25% to about 45% by weight, or about 50% to about 60% by weight.

19. The liquid dispersion composition of claim 1, wherein the second liquid component is present in the composition from about 0.1% to about 99% by weight, about 1% to about 99% by weight, about 5% to about 99% by weight, about 75% to about 99% by weight, about 0.1% to about 10% by weight, or about 0.5% to about 5% by weight.

20. The liquid dispersion composition of claim 1, comprising:

about 40 wt. % to about 80 wt. % of the granular superabsorbent polymer;

about 1 wt. % to about 99 wt. % of the first liquid component, wherein the first liquid component comprises a nonpolar liquid component;

about 5 wt. % to about 99 wt. % of the second liquid component, wherein the second liquid component comprises a polar liquid component;

about 0.01 wt. % to about 50 wt. % of the at least one surface active agent that is different from the first liquid component or the second liquid component.

21. The liquid dispersion composition of claim 1, comprising:

about 30 wt. % to about 70 wt. % of the granular superabsorbent polymer;

about 5 wt. % to about 95 wt. % of the first liquid component;

about 0.5 wt. % to about 95 wt. % of the second liquid component, wherein the second liquid component comprises a polyol; and about 0.5 wt. % to about 20 wt. % of the at least one surface active agent that is different from the first liquid component or the second liquid component.

22. The liquid dispersion composition of claim 1, wherein the liquid dispersion composition is enclosed within one or more containers.

23. A liquid dispersion composition comprising:

about 25 wt. % to about 75 wt. % of a granular superabsorbent polymer, wherein the granular superabsorbent polymer comprises an acrylate polymer;

about 0.5 wt. % to about 90 wt. % of a polyol; and about 0.2 wt. % to about 20 wt. % of one or more surface active agents.

24. A method of preparing an absorbent coating comprising:

providing a liquid dispersion composition comprising a granular superabsorbent polymer dispersed in a liquid medium, wherein:

the granular superabsorbent polymer is present in the composition from about 10% to about 80% by weight; and the liquid medium comprises two or more liquid components, wherein at least one of the liquid components is insoluble with the other liquid components; and applying the liquid dispersion composition to a substrate.

25. An absorbent coating formed by the method of claim 24.

26. A substrate coated with a liquid dispersion composition comprising a granular superabsorbent polymer dispersed in a liquid medium, wherein:

the granular superabsorbent polymer is present in the composition from about 10% to about 80% by weight; and the liquid medium comprises two or more liquid components, wherein at least one of the liquid components is insoluble with the other liquid components.

27. A liquid dispersion composition comprising a granular superabsorbent polymer dispersed in a liquid medium, wherein:

the granular superabsorbent polymer is present in the composition from about 30% to about 95% by weight; and the liquid medium comprises at least two liquid components, wherein at least one of the liquid components is insoluble with the other liquid components, and the liquid medium comprises a first liquid component and a second liquid component.

28. The liquid dispersion composition of claim 27, comprising:

about 30 wt. % to about 95 wt. % of the granular superabsorbent polymer;

about 20 wt. % to about 60 wt. % of the first liquid component, wherein the first liquid component comprises a hydrocarbon liquid; and about 0.1 wt. % to about 10 wt. % of the second liquid component, wherein the second liquid component comprises a surface active agent.

29. The liquid dispersion composition of claim 27, comprising:

about 30 wt. % to about 90 wt. % of the granular superabsorbent polymer;

about 10 wt. % to about 60 wt. % of the first liquid component, wherein the first liquid component comprises a nonpolar liquid component;

about 1 wt. % to about 30 wt. % of the second liquid component, wherein the second liquid component comprises a surface active agent.

* * * * *